(12) United States Patent
Spivey

(10) Patent No.: US 7,590,580 B2
(45) Date of Patent: Sep. 15, 2009

(54) COMPUTER-IMPLEMENTED PROCESS AND MECHANISM FOR IMPLEMENTING AN EMPLOYEE STOCK OWNERSHIP PLAN

(75) Inventor: Loehr H. Spivey, Broken Arrow, OK (US)

(73) Assignee: Intrepid Holding Corporation, Broken Arrow, OK (US)

( * ) Notice: Subject to any disclaimer, the term of this patent is extended or adjusted under 35 U.S.C. 154(b) by 1018 days.

(21) Appl. No.: 10/444,259

(22) Filed: May 23, 2003

(65) Prior Publication Data

US 2004/0122759 A1    Jun. 24, 2004

Related U.S. Application Data

(63) Continuation-in-part of application No. 09/132,008, filed on Aug. 10, 1998, now Pat. No. 6,571,219, and a continuation-in-part of application No. 08/212,705, filed on Mar. 15, 1994, now abandoned.

(51) Int. Cl.
*G06Q 40/00* (2006.01)
(52) U.S. Cl. .............................. 705/36; 705/38; 705/37; 705/35
(58) Field of Classification Search .................. 705/34, 705/35–38
See application file for complete search history.

(56) References Cited

U.S. PATENT DOCUMENTS

| | | | | |
|---|---|---|---|---|
| 5,508,731 | A | * | 4/1996 | Kohorn ......................... 725/24 |
| 6,026,388 | A | * | 2/2000 | Liddy et al. .................... 707/1 |
| 6,235,176 | B1 | * | 5/2001 | Schoen et al. .................. 705/4 |
| 6,269,347 | B1 | * | 7/2001 | Berger .......................... 705/38 |

OTHER PUBLICATIONS

USAir Deal Looks Possible, Analysts Say Labor: The carrier and pilots are far apart but willing to talk about pay and a union plan to swap wage cuts for ownership.; [Home Edition] Los Angeles Times (pre-1997 Fulltext). Los Angeles, Calif.: Aug. 15, 1994, p. 3.*

* cited by examiner

*Primary Examiner*—Frantzy Poinvil
*Assistant Examiner*—Clement Graham
(74) *Attorney, Agent, or Firm*—Peter K. Trzyna, Esq.

(57) ABSTRACT

A method for implementing an employee stock ownership plan by monitoring performance of an equity-issuing commercial entity purchasing a predetermined percentage of a commodity used by said commercial entity, and transferring, under binding call options, an equity interest in said commercial entity, computer-tracking at least one of contributions and deductible dividends in transit to the employee stock ownership plan; and monitoring securitized advances made by a commodity trust to the commercial entity to enable said commercial entity to purchase said commodity.

25 Claims, 8 Drawing Sheets

COMPUTER-IMPLEMENTED PROCESS AND MECHANISM FOR IMPLEMENTING AN EMPLOYEE STOCK OWNERSHIP PLAN

CLAIM OF PRIORITY

The present patent application is a continuation-in-part patent application claiming priority from application Ser. No. 08/212,705, filed 15 Mar. 1994, now abandoned, and Ser. No. 09/132,008 filed Aug. 10, 1998, issuing as U.S. Pat. No. 6,571,219, and both are incorporated by reference.

I. BACKGROUND OF THE INVENTION

B. Field of the Invention

The present invention relates to an improved system and mechanism for implementing an employee stock ownership plan involving a commercial entity, while, at the same time, substantially reducing the operating costs of that same commercial entity. The mechanism of the present invention includes apparatus, methods, and data structures pertaining to data processing with digital electrical computer adapted to carry out the accounting, modeling, financial computing and communications related thereto. In particular, the present invention provides an improved employee stock ownership plan, while, at the same time, providing a funding process for a commercial entity having ongoing commodity requirements.

C. Known Prior Art

An employee stock ownership plan (ESOP) as defined by the Employee Retirement Income Security Act (ERISA) is a stock bonus plan or a combination stock bonus and money purchase plan designed to invest primarily in the employer's equity securities. Employee stock ownership plans provide advantages both to commercial entities and to their employees. one advantage to the employees is that they acquire an equity ownership interest in the company. An advantage to the commercial entity is the ability to obtain equity financing from internal sources.

An employee stock ownership plan may desire to purchase a large amount of securities from a key shareholder or, perhaps, from the corporation itself. Typically, the employee stock ownership plan has insufficient assets to pay for these purchases, so it must borrow funds from an institutional lender. This type of concept traditionally constitutes the basis for "leveraged" employee stock ownership plan transactions.

In recent years, the use of employee stock ownership plans has declined and been criticized, primarily due to exploitation through excessive debt leveraging and other abuses. The practice of buying a company, taking on debt and encumbering the employee stock ownership plan with highly leveraged tax-advantaged debt was regularly practiced.

Congressional efforts have attempted to reduce this perceived misuse of employee stock ownership plans. For instance, recent changes to ERISA require that, for tax-advantaged sales to an employee stock ownership plan, an entity must hold stock for three years prior to any sale to an employee stock ownership plan. Further, immediately following the sale of any stock to a plan, the employee stock ownership plan must now own at least thirty percent (30%) of the company, and the proceeds from the sale of stock must be reinvested in a qualifying U.S. security within fifteen (15) months. Additionally, an employee stock ownership plan must own at least fifty percent (50%) plus one (1) share of the stock in a company in order to engage in tax-advantaged borrowing.

As a result, the use of employee stock ownership plans has diminished because the employee stock ownership plan must have controlling interest in the company in order to borrow on a tax-advantaged basis. Also, new restrictions on the use of borrowed funds now exist. Further, there are now restrictions on the amount of pre-tax profits that can be paid into an employee stock ownership plan.

II. SUMMARY OF THE INVENTION

A. Objects of the Invention

A principal object and purpose of the present invention is to create a system which facilitates providing employees with equity in the company, as part of an employee stock ownership plan, preferably with minimal to no leverage through debt. At the same time, the present invention facilitates compliance with all recent legislative, judicial, and regulatory mandates.

It is a further principal object and purpose of the present invention to provide an improved employee stock ownership plan, combined with a commodity funding mechanism (i.e., machine, as in a computer system), for a commercial entity.

It is a further object and purpose of the present invention to provide an employee retirement plan utilizing an employee stock ownership plan and the commodity funding mechanism.

It is still another object of the present invention to provide a multiplicity of cooperating digital electrical computer systems and communications systems for carrying out a corresponding reduction in the commodity price to the company and provision of incremental ownership of the commercial entity by its employees over a predetermined time period.

II. SUMMARY OF THE INVENTION

These and other objects of the present invention, as would be appreciated in overcoming the limitations of the prior art by the instant mechanism, are accomplished by cooperating digital electrical computer systems, one of which handles computing for principally four (4) primary entities, another for each commodity supplier or suppliers, as well as one for respective financial institutions such as a bank, and insurance provider, etc.

One entity can be labeled a "commercial entity," such as a corporation or partnership, which may have equity interests that are issued to shareholders, partners or other equity owners. The present invention applies particularly well to commercial entities involving manufacturing or services which utilize one or more commodities on a regular, ongoing basis.

A second entity can be termed a "commodity trust", which is formed to hold assets for the investor entity. An investor entity may be an individual, a partnership, a corporation or any combination thereof.

A third entity can be termed an "Employee Stock Ownership Plan" (ESOP) formed, in accordance with Internal Revenue Code provisions, as a nominal employee stock ownership plan. The initial commercial entity equity holding by the ESOP shall be small. The ESOP is incrementally funded by a contribution of pre-tax and/or post-tax earnings by the commercial entity.

A fourth entity can be termed an "investor entity". Over a predetermined period of time, the ESOP will purchase from the investor entity in the commodity trust all shares of the commercial entity equity released from the commodity trust as earned by the investor entity by making commodity purchase payments.

As an overview, the assets or investments held by the commodity trust will include cash or other reserves sufficient to provide funds to cover a predetermined share of the cost of the commodity requirements of the commercial entity for a predetermined period of time. The commodity trust will initially hold in trust a substantial amount of the equity of the commercial entity. The commodity trust agrees to pay for a predetermined percentage of the commodity requirements of the commercial entity for a predetermined period of time. The commercial entity places periodic orders for the commodity with the trust and remits payment for the predetermined percentage of the total purchase price to the commodity trust. The commodity trust then supplements the payment advanced by the commercial entity with the predetermined amount necessary to fill the order and the commercial entity thereupon makes payment in full to the commodity supplier(s).

The commodity trust continually funds its share of the purchases the ongoing commodity requirements of the commercial entity from commodity suppliers as stated above for the predetermined life of the mechanism of the invention.

The commodity trust will release the commercial entity equity on a prorata basis as earned, to the investor entity, in proportion to the expenditure of funds by the trust during specific time periods. The ESOP then exercises a binding call on and purchases all of the released commercial entity equity from the investor entity, at the publicly traded price, or at a price determined periodically and subject to independent outside valuation and fairness opinions as required by law.

The investor entity agrees to sell to the ESOP pursuant to a binding call, all of the commercial entity equity earned and released from the trust over the life of the mechanism of the invention. When all assets in the trust are exhausted, the useful life of the trust will cease.

More particularly, the present invention is directed to mechanism-implemented (i.e., computer implemented) aspects of an approach to efficiently carrying out the complex and long-term transactions in the commodity funding approach. This includes providing respective digital electrical computer systems for each of the entities (or equivalents like having fewer machines run more than one program) to carry out the commodity funding and ESOP purchase transactions.

These and other objects can be implemented by means including a computer system for monitoring the monthly profit and loss indexed performance of an equity-issuing commercial entity and for purchasing a predetermined percentage of one or more commodities used by said commercial entity, and transferring, under binding call options, an equity interest in said commercial entity from an investor entity and all other shareholders to an employee stock ownership plan entity funded by said commercial entity, comprising:

a programmed digital electrical computer comprising a processor, an input device, an output device, and a memory, the processor being controlled by a program including a. means for storing pre-determined (monthly profit and loss indexed) performance criteria for said commercial entity including management, operations, and commodity ordering performance criteria, and maintaining an account designated for commodity purchase transactions;

b. means for monitoring said commercial entity's actual ongoing profit and loss indexed performance data, including management, operations, document-generation, and commodity ordering performance data; and c. means for periodically comparing said monitored performance data against said pre-determined criteria to determine whether to authorize the electronic release of funds from said designated account for commodity purchases in response to said monitored commodity ordering activity data;

d. means for periodically comparing said actual performance of said commercial entity with said predetermined performance criteria and determining whether to transfer a predetermined quantum or equity in said commercial entity to said investor entity; and e. means for permitting said employee-owned stock ownership plan entity to periodically exercise binding call options on equity transferred to the investor entity as a result of the purchases made.

Implementation can also be viewed as including a digital electrical computer system for monitoring the performance of an equity-issuing commercial entity and for purchasing a predetermined percentage of one or more commodities used by said commercial entity through an independent entity, and transferring an equity interest in said commercial entity from an investor entity to said independent entity for subsequent transfer in accordance with pre-determined conditions to said investor entity under a binding call option by an employee stock ownership plan entity funded by said commercial entity, comprising:

a programmed digital electrical computer comprising a processor, an input device, an output device, and a memory, the processor being controlled by a program including a. means for storing pre-determined monthly profit and loss performance criteria for said commercial entity including management, operations, and commodity ordering performance criteria, and maintaining an account designated for commodity purchase transactions;

b. means for monitoring said commercial entity's actual profit and loss performance data, including management, operations, and commodity ordering performance data;

c. means for said independent entity to periodically compare said monitored performance data against said predetermined criteria to determine whether to authorize the electronic release of funds from said designated account for commodity purchases in response to said monitored commodity ordering activity;

d. means for periodically comparing said actual performance of said commercial entity with said predetermined criteria to determine whether to transfer a predetermined quantum of equity in said commercial entity to said investor entity; and e. means for permitting said employee-owned stock ownership plan entity to periodically exercise binding call options on equity transferred to the investor entity.

In either case, the program is adapted to such that; (1) said monitoring of said commercial entity's actual commodity ordering performance data is performed electronically; (2) said monitoring of said commercial entity's actual performance data is performed electronically; (3) said periodic comparison of said actual performance of said commercial entity with said predetermined performance criteria to determine whether to transfer a predetermined quantum of equity in said commercial entity to said investor entity, is performed electronically; and/or (4) said means for permitting said employee-owned stock ownership plan entity to periodically exercised binding call options on equity transferred to the investor entity, comprises electronic transaction processing.

Either of the above-mentioned systems can preferably be made by further including:

a. means for storing pre-determined risk assessment criteria for said commercial entity;

b. means for monitoring said commercial entity's actual risk assessment data; and c. means for periodically comparing and analyzing said actual risk assessment data with said predetermined risk assessment criteria to generate an indication of whether actual risk has exceeded, said pre-determined criteria and to generate an indication thereof.

Still more preferably, either system is made by further comprising a. means for storing pre-determined risk assessment criteria for said commercial entity;

b. means for monitoring said commercial entity's actual risk assessment data; and c. means for periodically electronically comparing and analyzing said actual risk assessment data with said predetermined risk assessment criteria to generate an indication of whether actual risk has exceeded said pre-determined criteria and to generate an indication thereof.

The present invention also contemplates data structures, including computed necessary intermediates, and methods such as a computer-implemented method for monitoring the performance of an equity-issuing commercial entity and for purchasing a predetermined, percentage of one or more commodities used by said commercial entity, and transferring, under binding call options, an equity interest in said commercial entity, and transferring, under binding call options, an equity interest in said commercial entity from an investor entity to an employee stock ownership plan entity funded by said commercial entity, the method comprising:

a. storing pre-determined performance criteria for said commercial entity including management, operations, and commodity ordering performance criteria, and maintaining an account designated for commodity purchase transactions;

b. monitoring said commercial entity's actual performance data, including management, operations, and commodity ordering performance data;

c. periodically electronically comparing said monitored performance data against said pre-determined criteria to determine whether to authorize the electronic release of funds from a designated account for commodity purchases in response to said monitored commodity ordering activity data;

d. periodically comparing said actual performance of said commercial entity with said predetermined performance criteria and determining whether to transfer a predetermined quantum of equity in said commercial entity to said investor entity; and e. permitting said employee-owned stock ownership plan entity to periodically exercise binding call options on equity transferred to the investor entity.

More preferably, the invention can be viewed as a computer-implemented method for monitoring the performance of an equity-issuing commercial entity and for purchasing a predetermined percentage of one or more commodities used by said commercial entity through an independent entity, and transferring an equity interest in said commercial entity from an investor entity to said independent entity for subsequent transfer in accordance with pre-determined conditions to said investor entity under a binding call option by an employee stock ownership plan entity funded by said commercial entity, the method comprising:

a. storing pre-determined performance criteria for said commercial entity including management, operations, and commodity ordering performance criteria, and maintaining an account designated for commodity purchase transactions;

b. monitoring said commercial entity's actual performance data, including management, operations, and commodity ordering performance data;

c. said independent entity periodically electronically comparing said monitored performance data against said pre-determined criteria to determine whether to authorize the electronic release of funds from said designated account for commodity purchases in response to said monitored commodity ordering activity.

d. periodically comparing said actual performance of said commercial entity with said predetermined criteria to determine whether to transfer a predetermined quantum of equity in said commercial entity to said investor entity; and e. permitting said employee-owned stock ownership plan entity to periodically exercise binding call options on equity transferred to the investor entity.

In either case, the method is preferably carried out such that (1) said monitoring of said commercial entity's actual commodity ordering performance data is performed electronically; (2) said monitoring of said commercial entity's actual performance data is performed electronically; and/or (3) said means for permitting said employee-owned stock ownership plan entity to periodically exercise binding call options on equity transferred to the investor entity, comprises electronic transaction processing.

Also in either case, the method can be carried out as further comprising a. storing pre-determined risk assessment criteria;

b. monitoring said commercial entity's actual risk assessment data; and c. periodically comparing and analyzing said actual risk assessment data with said predetermined risk assessment criteria to generate an indication of whether actual risk has exceeded said pre-determined criteria and to generate an indication thereof.

Further, in either case, the method can be carried out as further comprising a. means for storing pre-determined risk assessment criteria for said commercial entity;

b. means for monitoring said commercial entity's actual risk assessment data; and c. means for periodically electronically comparing and analyzing said actual risk assessment data with said predetermined risk assessment criteria to generate an indication of whether actual risk has exceeded said pre-determined criteria and to generate an indication thereof.

Yet another way of viewing the present invention is a computer-implemented method for monitoring the performance of an equity-issuing commercial entity and for purchasing a predetermined percentage of one or more commodities used by said commercial entity through an independent entity, and transferring an equity interest in said commercial entity from an investor entity to said independent entity for subsequent transfer in accordance with pre-determined conditions to said investor entity under a binding call option by an employee stock ownership plan entity funded by said commercial entity, the method comprising:

a. storing pre-determined performance criteria, including management, financial, and operating data, data representing ERISA-imposed limitations on funds and equity transfers, data representing commodity ordering information, data representing equity available for transfer via said method, and predefined criteria for the transfer and release of said equity;

b. maintaining at least one account designated for carrying out said method through which equity and funds are transferred;

c. transferring funds from said investor entity to said designated account and transferring equity in said commercial entity from said commercial entity to said designated account in accordance with predefined stored conditions;

d. periodically storing information regarding actual financial and operating performance of said commercial entity;

e. storing commodity ordering information for requesting a commodity purchase:

f. comparing and analyzing said actual financial and operating performance data to said commercial entity and said predetermined performance criteria to determine whether to fund a pending commodity order transaction, to determine whether performance is satisfactory or unsatisfactory, and to indicate whether investor's funds are at risk whether funds should be returned to investors or whether commodity funding should be suspended;

g. based on the results of step f, conditionally initiating commodity purchase and electronically transferring funds from said designated account to the purchasing account for the benefit of the commodity supplier for the purchase of said commodity for delivery to said commercial entity if said evaluation of the performance of said commercial entity is satisfactory;

h. evaluating said actual operating and financial performance data and said predefined performance criteria, including ERISA-imposed conditions and limits and indicating amount of pre-tax contributions, and indicating the amount of equity to be released for transfer to investor equity;

i. storing information indicating funding levels for pre-tax payroll contributions, pre-tax dividends, and post-tax contributions authorized for transfer to said employee stock ownership plan;

j. periodically transferring equity from said investor entity to said employee stock ownership plan in accordance with said predefined criteria for the transfer and release of said equity and transferring funds from said employee-owned stock purchase program to said investor entity; and k. repeating the steps of the method until all of said authorized equity has been transferred to said employee stock ownership plan.

The methods outlined above can be further carried out such that (1) said predetermined performance criteria are periodically adjusted; (2) said pre-determined performance criteria are stored electronically; (3) said transfer of funds from said investor entity to said designated account is performed electronically; (4) said transfer of equity in said commercial entity from said commercial entity to said designated account is performed electronically; (5) said periodic storage of information regarding actual financial and operating performance of said commercial entity is performed electronically; (6) said comparison and analysis of said actual financial and operating performance data and said stored performance criteria, are performed electronically; (7) said storage of commodity ordering information is performed electronically; (8) said commodity purchase transaction is performed electronically; (9) said evaluation of said actual operating and financial performance data and said predefined performance criteria and indicating the amount of equity to be released for transfer to investor equity, is performed electronically; (10) said storage of information indicating funding levels for pre-tax payroll contributions, pre-tax dividends, and post-tax contributions authorized for transfer to said employee stock ownership plan, is performed electronically; (11) periodic equity transfer from said investor entity to said employee stock ownership plan, is performed electronically; and/or (12) said periodic transfer of funds from said employee-owned stock purchase program to said investor entity, is performed electronically.

Still further, the invention can be preferably viewed as including a computer-implemented method of monitoring the performance of an equity-issuing commercial entity and for purchasing a predetermined percentage of one or more commodities used by said commercial entity through an independent entity, and transferring an equity interest in said commercial entity from an investor entity to said independent entity for subsequent transfer in accordance with pre-determined conditions to said investor entity under a binding call option by an employee stock ownership plan entity funded by said commercial entity, the method comprising:

a. electronically storing pre-determined performance criteria, including management, financial, and operating data, data representing ERISA-imposed limitations on funds and equity transfers, data representing commodity ordering information, data representing equity available for transfer via said method, and predefined criteria for the transfer and release of said equity.

b. maintaining at least one account designated for carrying out said method through which equity and funds are transferred;

c. electronically transferring funds from said investor entity to said designated account and transferring equity in said commercial entity from said commercial entity to said designated account in accordance with predefined stored conditions;

d. periodically electronically storing information regarding actual financial and operating performance of said commercial entity;

e. electronically storing commodity ordering information for requesting a commodity purchase;

f. electronically comparing and analyzing said actual financial and operating performance data of said commercial entity and said pre-determined performance criteria to determine whether to fund a pending commodity order transaction, to determine whether performance is satisfactory or unsatisfactory, and to indicate whether investor's funds are at risk, whether funds should be returned to investors or whether commodity funding should be suspended;

g. based on the results of step f, conditionally initiating commodity purchase and electronically transferring funds from said designated account to the commodity supplier for the purchase of said commodity for delivery to said commercial entity if said evaluation of the performance of said commercial entity is satisfactory;

h. electronically evaluating said actual operating and financial performance data and said predefined performance criteria, including ERISA-imposed conditions and limits and indicating amount of pre-tax payroll contributions, pre-tax dividends, and post-tax contributions, and indicating the amount of equity to be released to transfer to investor equity;

i. electronically storing information indicating funding levels for pre-tax payroll contributions, pre-tax dividends, and post-tax contributions authorized for transfer to said employee stock ownership plan;

j. periodically transferring equity from said investor entity to said employee stock ownership plan in accordance with said predefined criteria for the transfer and release of said equity and transferring funds from said employee stock ownership plan to said investor entity; and k. repeating the steps of the method until all of said authorized equity has been transferred to said employee owned stock purchase plan.

MOTHERAs with any of the foregoing methods, each can be carried out such that (1) said monitoring of said actual performance data is performed by said independent entity; and/or (2) said comparison of said actual performance data of said commercial entity with said predetermined criteria to determine whether to transfer a predetermined quantum of equity in said commercial entity, is performed by said independent entity. Each method can also include a. storing pre-determined risk assessment criteria for said commercial entity;

b. monitoring said commercial entity's actual risk assessment data; and c. periodically comparing and analyzing said actual risk assessment data with said predetermined risk assessment criteria to generate an indication of whether actual management and operations risk to said investor entity has exceeded said pre-determined criteria and to generate an indication thereof. Preferably each also includes preventing, in response to operator input, said electronic transfer of funds.

Likewise, each said digital electrical computer system can be controlled by a program including a. means for storing pre-determined risk assessment criteria for said commercial entity;

b. means for monitoring said commercial entity's actual risk assessment data; and c. means for periodically comparing and analyzing said actual risk assessment data with said predetermined risk assessment criteria to generate an indication of whether actual management and operations risk to said investor entity has exceeded said pre-determined criteria and to generate an indication thereof.

Likewise, each said digital electrical computer system can include program means for preventing, in response to operator input, said electronic transfer of funds.

III. BRIEF DESCRIPTION OF THE DRAWINGS

IV. DETAILED DESCRIPTION OF THE PREFERRED EMBODIMENT

Figure 1:
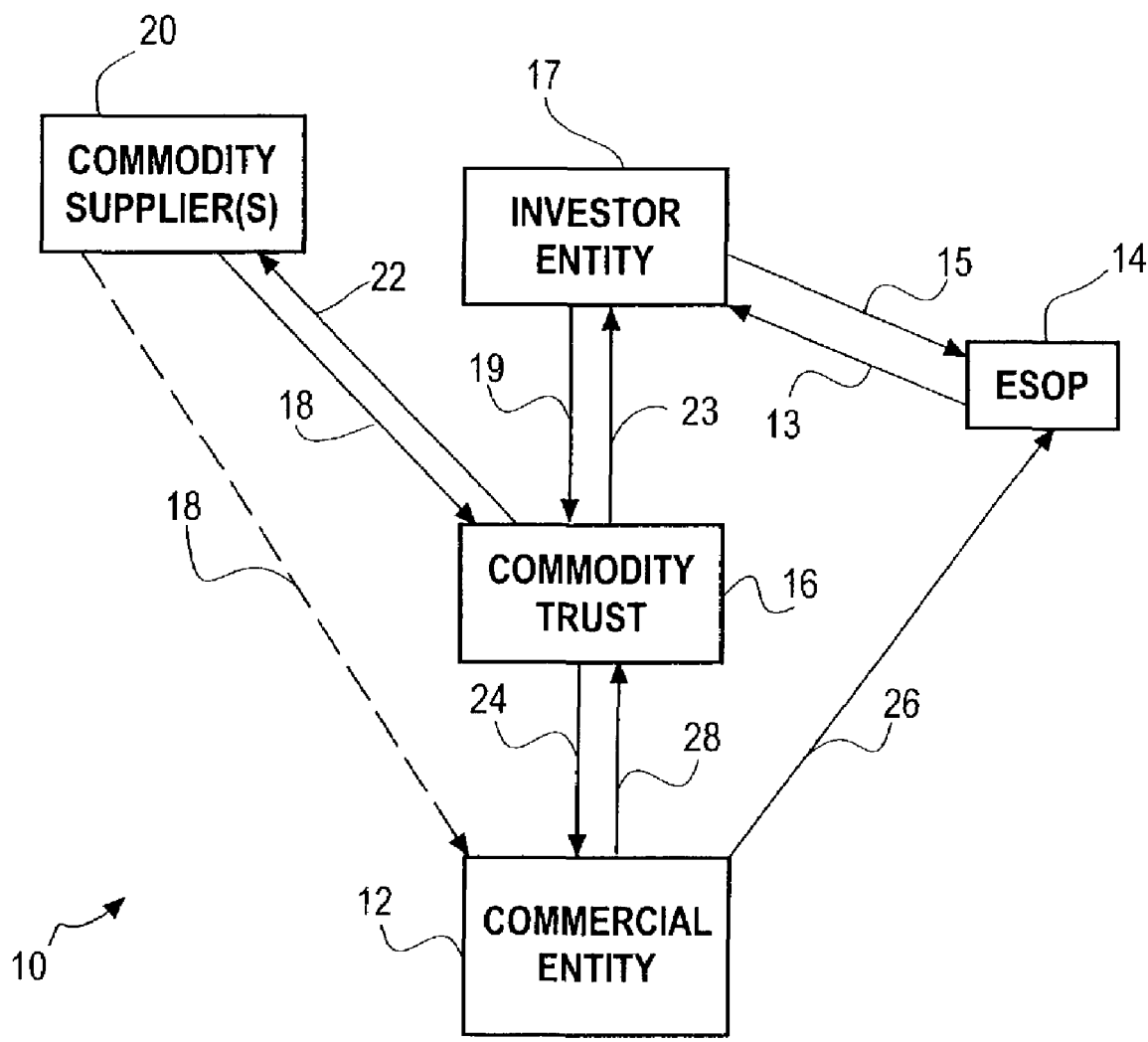
FIG. 1 is a simplified diagram of the primary entities of the commodity funding system of the present invention along with their interrelation.

Referring to the drawings in detail, FIG. 1 illustrates a simplified diagram of the four (4) primary entities, along with the commodity suppliers), required in order to implement the system of the present invention (shown at box 10).

A commercial entity (shown at box 12) may be any corporation, partnership or other commercial entity having equity interests that may be held by shareholders, partners or other equity owners (such as shares of stock). The commercial entity is involved in manufacturing or services which consistently utilize one or more commodities on an ongoing basis. An example of this would be an airline requiring substantial amounts of fuel on a regular basis for ongoing operations.

The commercial entity issues shares of stock or similar equity interests representing ownership in the company. While the explanation of the system illustrated herein describes a start-up operation, it is equally applicable to an existing and ongoing business.

An employee stock ownership plan (shown at box 14) is formed and operated in accordance with the ERISA. The employee stock ownership plan of the present invention has a number of particular attributes. The employee stock ownership plan is formed as a nominal employee stock ownership plan; that is, the initial commercial entity equity holding by the employee stock ownership plan is small (as an example, five percent (5%)). The employee stock ownership plan invests by acquiring stock (or other equity) of the commercial entity. The employee stock ownership plan is incrementally funded by the contribution of all legally allowable pre-tax and post-tax profits and percentage of payroll contributions of the commercial entity (shown by arrow 26). Over a predetermined period of time (as fully described below in pseudo-code and referred to as TIME2), the employee stock ownership plan will purchase from the investor entity all shares of the commercial entity released from the commodity trust as earned. Arrows 13 and 15 represent the incremental purchase of equity (such as stock) by the employee stock ownership plan and the payment for that equity by the employee stock ownership plan.

The commodity trust (shown at box 16) has a number of characteristics. The trust will hold assets (shown by arrow 19) for an investor entity (shown at box 17). This investor entity may be an individual, a partnership, a corporation or any combination thereof. The assets or investments held will include cash or other reserves sufficient to provide funds to cover a predetermined percentage (100%-COMPCT) of the predetermined cost of the commodity requirements of the commercial entity for predetermined periods of time (TIME1 and TIME3).

Additionally, the commodity trust will be granted and hold in trust a substantial equity interest in the commercial entity.

The commodity trust will agree to defray a predetermined percentage (100%-COMPCT) of the commodity requirement costs of the commercial entity for a predetermined period of time and may have the actual commodities transferred directly to the commercial entity on a transaction by transaction basis.

The commercial entity periodically places orders with the commodity trust and concurrently remits the required payment for the COMPCT percentage of the purchase price to the commodity trust (shown by arrow 28). The commodity trust then supplements the payment by the commercial entity. This supplement is the predetermined amount necessary to make payment in full to the commodity suppliers). Delivery of the commodity may flow either directly to the commercial entity or through the commodity trust.

As seen in FIG. 1, the commodity trust purchases the ongoing commodity requirements (shown by arrow 18) from commodity suppliers) (shown at box 20) and agrees to pay the full negotiated cost for the commodity (shown by arrow 22). The full negotiated cost is the price negotiated between the commodity suppliers) and the commodity trust on behalf of the commercial entity. The commodity is thereafter transferred to the commercial entity (shown by arrow 24).

The commodity trust will undertake and agree in advance to release from trust the commercial entity equity to the investor entity (shown by arrow 23) on a prorata basis as earned. This earned equity is defined as VALU(n) (set forth in detail below). The employee stock ownership plan then exercises the binding call on and purchases the commercial entity equity (shown by arrow 13) from the investor entity at a price determined each purchase period, subject to independent outside valuation and fairness opinions, or if Publicly traded for the then publicly traded price of the commercial entity equity.

The investor entity agrees in advance to sell, over a period of time defined as TIME2 (set forth below), all of the commercial entity equity released from the trust and earned by the investor entity, pursuant to a binding call on that equity by the employee stock ownership plan. After this period of time, or when all assets in the trust are exhausted, the useful life of the trust will cease and the system of the invention is terminated.

Prior to implementation of the steps of the invention, several variables must be defined.

TIME1 is the time period from the inception of the mechanism," of the invention until the first scheduled purchase of equity by the employee stock ownership plan from the investor entity. In the example herein, a time frame of forty-eight (48) months is used.

TIME2 is the time period during which the employee stock ownership plan will make purchases of the commercial entity equity from the investor entity. This time period is variable and is dependent upon the mutually determined objectives of the four (4) participating entities. In the example, a time period of seven (7) years is used.

TIME3 are the incremental periods beginning after TIME1 and ending at the termination of the commodity trust. The example uses seven (7) incremental periods of one (1) year each.

The Performance Review Period is the evaluation period used to determine if all of the entities involved in the implementation of the invention are meeting their performance criteria. The performance review period may be weekly, monthly, quarterly, etc., and may vary depending upon the specific nature of the implementation. For purposes of the example, the performance review period is monthly.

STKCT is the percentage of equity (as a percentage of the total number of authorized shares) of the commercial entity placed in the commodity trust by the commercial entity at the inception of the trust. STKCT will be of sufficient value to project an attractive rate of return for the investor entity. The example utilizes a forty-nine percent (49%) interest in the commercial entity equity.

COMPCT is the percentage of the cost of the commodities paid by the commercial entity. COMPCT is computed to maximize the rate of return for the investor entity, as well as to benefit the commercial entity by substantially reducing the commodity cost for the life of the mechanism.

The value (100%-COMPCT) is the balance of the cost of the commodities acquired and funded by the commodity trust on behalf of the commercial entity.

STK(N) is the predetermined percentage of the total equity of the commercial entity to be purchased from the investor entity by the employee stock ownership plan each purchase period. STK(N) may vary from purchase period to purchase period as determined and specified at the onset of the implementation of the invention. In the example, STK(L) through STK(4) equals twelve and eighty-eight one hundredths percent (12.88%), and each of STK(5) through STK(II) equal five and sixteen one hundredths percent (5.16%).

VALU(N) is the value of that percentage of the equity of the commercial entity released from the commodity trust to the investor entity during a performance period. This value is determined by the following equation:

$$VALU(N) = (CASH(n)/BASE)*(*STK(n))$$
where:
$n$ = TIME1 or TIME3 (as applicable)
CASH(N) = Amount of liquid assets (cash) spent by the commodity trust on behalf of the commercial entity for purchase of commodities during the performance review period.
BASE = Amount of liquid assets (cash) invested in the commodity trust by the investor entity for TIME1 or TIME3 as applicable.
STK(N) is defined earlier.

Figure 2A:
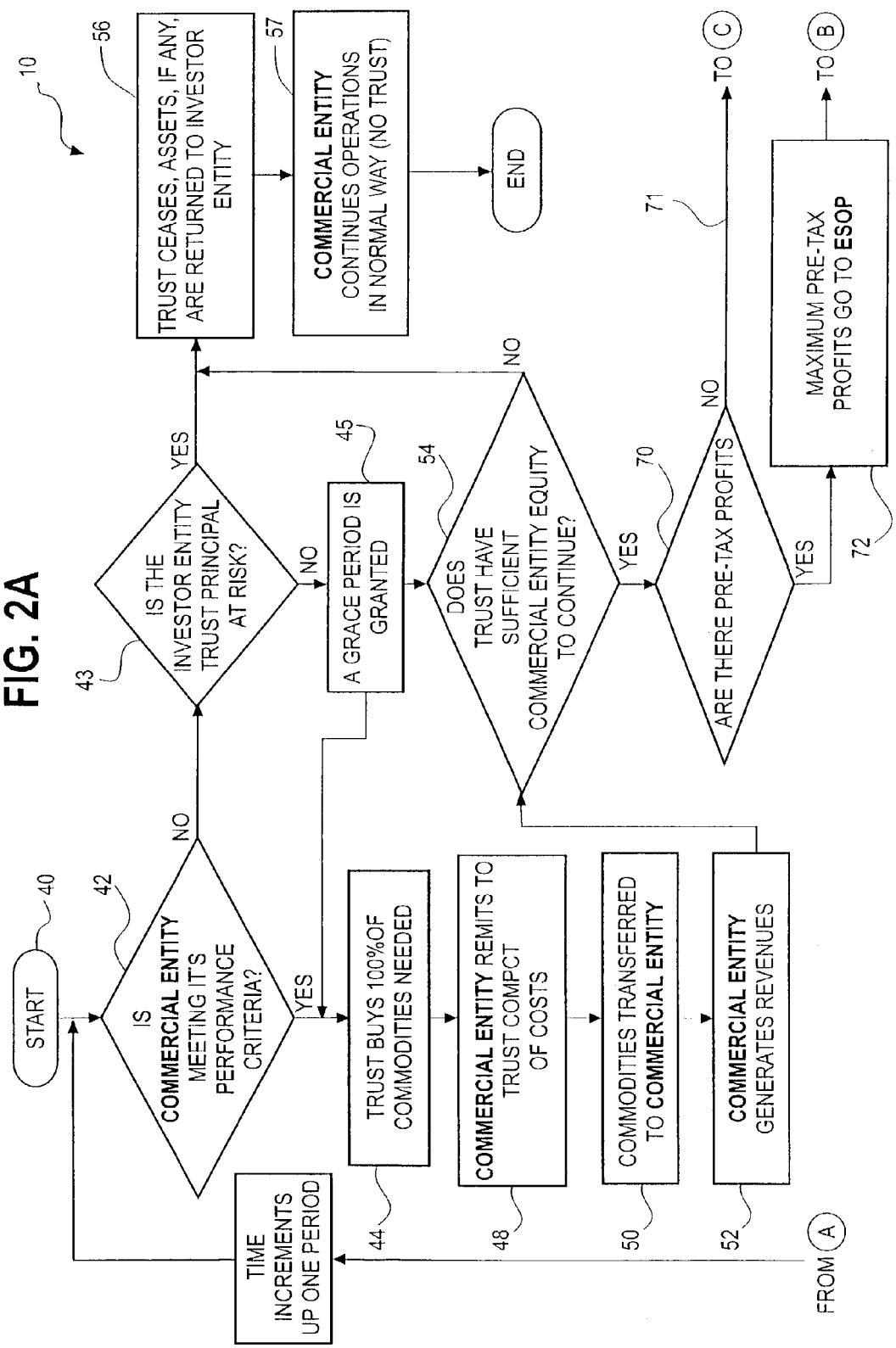
FIGS. 2a and 2b are simplified flow charts of the steps of the commodity funding computer system of the present invention.
Figure 2B:
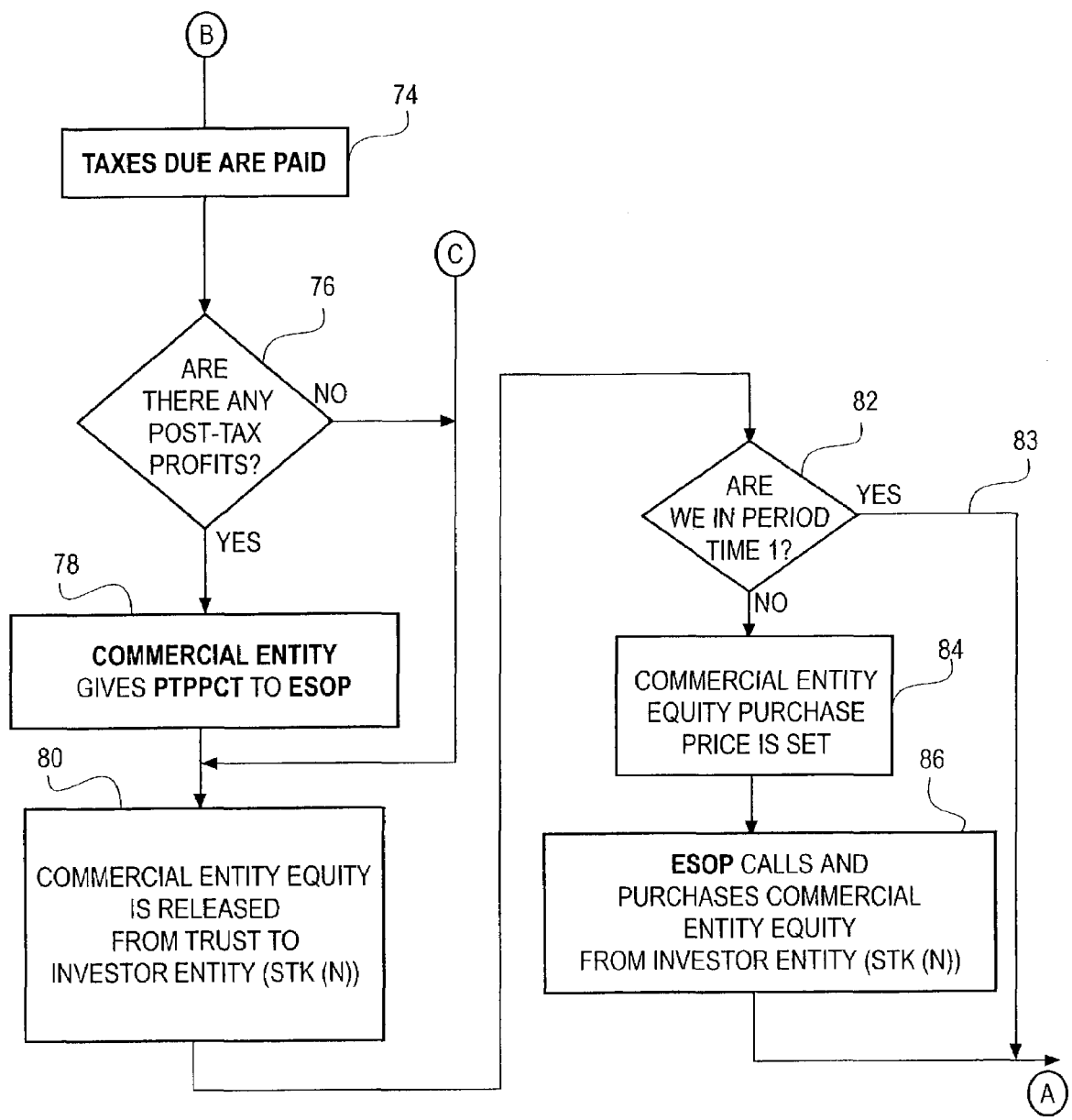

FIGS. 2a and 2b illustrate a simplified schematic flow diagram of one embodiment of the mechanism of the invention (i.e., logic for computer-implemented data manipulation).

Initially, the entities (previously described in FIG. 1) will be created with the provisions and restrictions as set forth above (represented by box titled "Start" 40 in FIG. 2a).

Financial forecasting or modeling is required to define the variables as set forth above. A nominal amount of the equity interest (such as stock) of the commercial entity is issued to the employee stock ownership plan. The commercial entity agrees and undertakes to secure all of its commodity requirements exclusively from the commodity trust, as its sole provider of these commodities, for the life of the mechanism of the invention.

Steps of the mechanism will be repeated at periodic time intervals referred to as System Cycles. At the beginning of each system cycle and during each performance review period, an analysis will be made to see if the commercial entity is meeting its performance criteria (shown at box 42). If the commercial entity is not meeting the performance criteria and the investor equity trust principal is not at risk (shown at box 43), a grace period is granted equal to one performance period (shown at box 45). If the performance criteria is not being met and the investor entity trust principal is at risk, the trust may cease at the election of the investor entity (shown at box 56).

The commercial entity requests commodities for one performance review period and the commodity trust buys commodities for one performance review period (shown at box 44). The commodity trust will purchase all of the commodities necessary for the commercial entity to perform operations for the performance review period.

The commercial entity concurrently demands the commodity trust to pay a percentage (100%-COMPCT) of the negotiated cost of the commodities.

The commercial entity will remit to the commodity trust its share (COMPCT) of the negotiated commodity cost (shown at box 48). The commodity or commodities are thereafter transferred to the commercial entity (shown at box 50). The commercial entity will then generate revenues utilizing the referenced commodities (shown at box 52).

For the mechanism of the present invention to continue, the trust must hold sufficient equity of the commercial entity as illustrated (shown at box 54).

If the trust has released all commercial entity equity to the investor entity, the trust will cease to operate and any remaining assets held by the trust will be distributed to the grantors pursuant to the trust agreement (shown at box 56).

The commercial entity may then continue operations in traditional fashion without the commodity trust and without the mechanism of the present invention (shown at box 57). It will thus be seen that if the present invention ceases to function in its intended manner, the commercial entity will continue to operate.

If there are any pre-tax profits (shown at box 70), pursuant to law the maximum allowable pre-tax profits of the commercial entity are contributed to the employee stock ownership plan (shown at box 72). If there are no pre-tax profits, the intervening steps are bypassed (shown by arrow 71).

Taxes due are to be paid by the commercial entity as illustrated on FIG. 2b (shown at box 74). The commercial entity then contributes all post-tax profits (PTPPCT) to the employee stock ownership plan (shown at box 78). The employee stock ownership plan will use these funds to purchase stock from the investor entity.

A prorata percentage of the commercial entity equity held by the commodity trust is released to the investor entity as earned. This percentage is defined as STK(N) (shown at box 80).

If it is prior to the end of TIME1 (shown at box 82), the process begins again (shown by arrow 83). From the end of TIME1 through TIME2, the following steps are taken and procedures are followed during each TIME3 period. The price to be paid for the commercial entity equity is determined at the end of TIME1 and periodically on a transaction by transaction basis during TIME3. This price may be the publicly traded price of the equity or may be computed on a multiple of earnings basis, subject to independent outside valuation and fairness opinions as required by law (shown at box 84).

The employee stock ownership plan then exercises the binding call on, and purchases all earned commercial entity equity released from the trust, from the investor entity (shown at box 86).

The above series of action steps form an integrated relationship for the four (4) parties. The result is that each party must meet certain performance criteria for the total process to function. These criteria are:

the commodity trust must pay its predetermined share of the commodity costs it acquires on behalf of the commercial entity;

the employee stock ownership plan must exercise its binding calls and purchase all earned and released commercial entity equity from the investor entity;

the investor entity must sell all commercial entity equity earned and released from the commodity trust, to the employee stock ownership plan pursuant to all binding calls on such stock by the employee stock ownership plan; and the commercial entity must meet performance criteria and contribute its pre-tax and post-tax profits and percentage of payroll contributions to the employee stock ownership plan.

Figure 3:
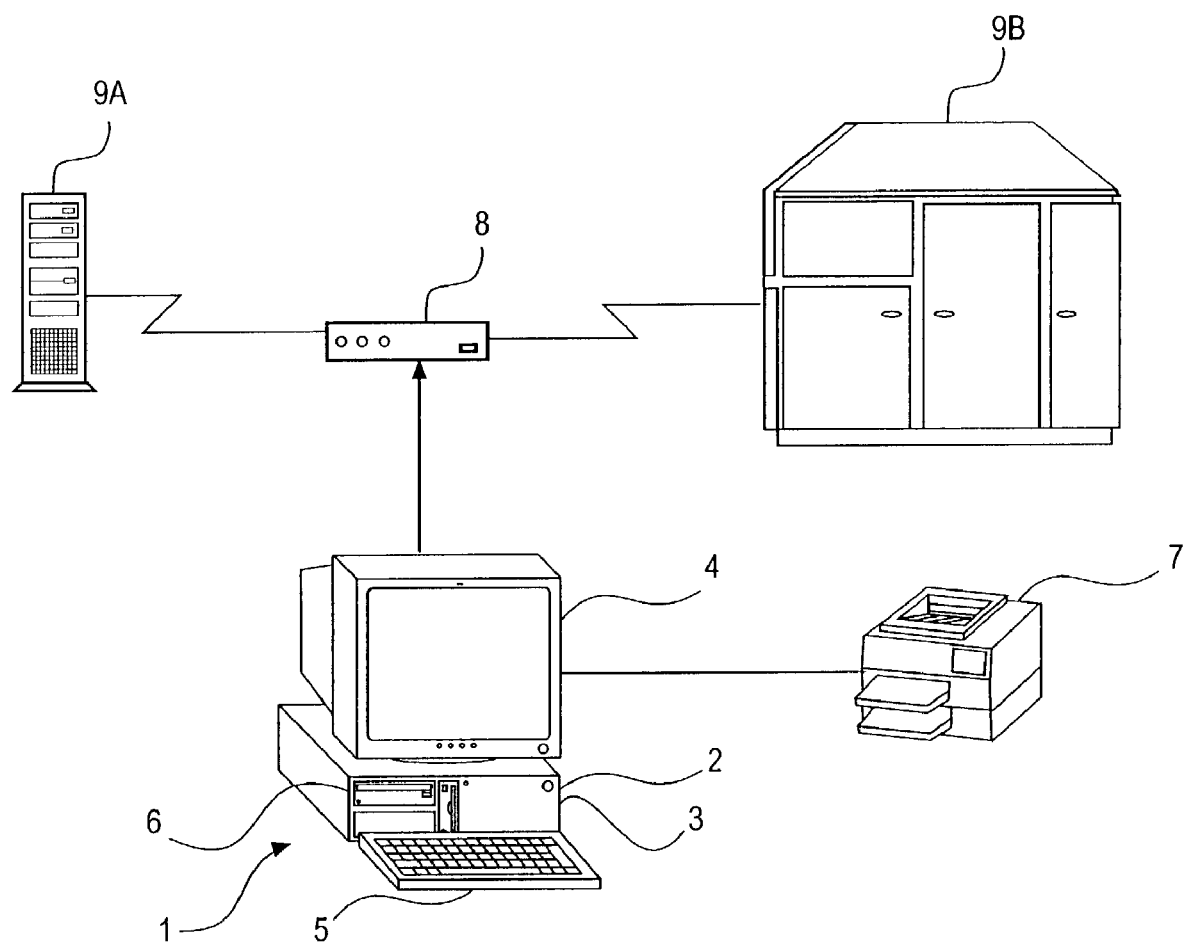
FIG. 3 is a diagram of the interrelated computer systems and communications of the present invention.

With more particular regard to the computer is a diagram of the interrelated computer systems and communications of the present invention, consider FIG. 3. FIG. 3 shows a generic case of a computer system for the plurality of entities including the commercial entity, which can communicate with the computer systems of other related institutions. There is a local digital electrical computer system 1 (e.g., an IBM-compatible PC), controlled by a processor 2 (e.g., a Pentium processor). Processor 2 is programmed by program 3, which forms circuitry in the processor—i.e., programs the processor 2. Local computer system 1 also includes a display device such as a monitor 5 (e.g., a Trinatron monitor) and an input device, such as a keyboard (e.g., a Dell QuietKey keyboard). The keyboard is for receiving input information and converting the information into electrical signals, and the monitor 5 is for displaying output electrical signals. The local computer system 1 also includes a memory 6, such as a 50 megabyte hard drive, along with disk drives for floppy and optical discs for selectively retrieving or, where appropriate, storing the program 3 and data structures produced in operation of the invention. The local computer system 1 additionally includes a printing device 7, such as a Hewlet Packard Laser Jet 6P for converting output signals into printed documents. A modem 8, such as a Hayes modem, is used to facilitate communication between local computer system 1 and an other computer systems 9a or 9b. For example, viewing the local computer system 1 as being for the commercial entity, the first other computer system 9a can represent a computer system for the commodity supplier(s) 20 and second other computer system 9b can represent a computer system for a financial institution, bank, lender, insurance provider, or the like.

Of particular importance in the communication of the interrelated computer systems of the present invention are the data gathering\exchange functions between the systems, as well as electronic funds transfers from the financial institution computer (internally) to the commodity trust account, and then from the commodity trust account to the commercial entity purchasing account, and then either internally or externally from the commercial entity purchasing account to the account of the commodity supplier(s).

Figure 4:
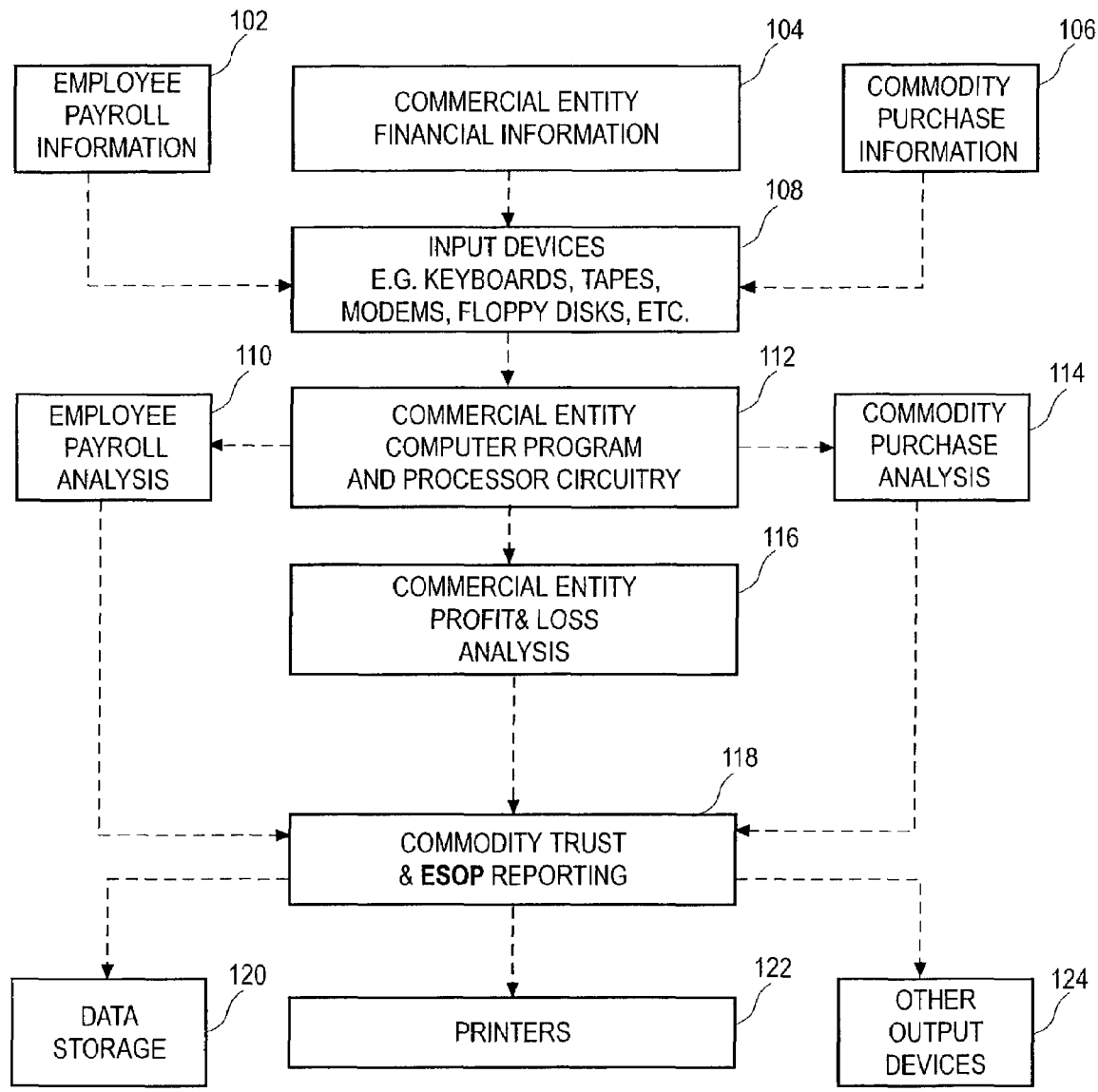
FIG. 4 is a more focused diagram of the commercial entity computer system in accordance with the present invention.

Turning now to FIG. 4, there is shown a more focused diagram of the commercial entity local computer system 1 in accordance with the present invention. Boxes 102 through 124 provide a general overview of how to use the computer system 1 and the flow of information and data, particularly from the vantage point of the commercial entity 12.

Employee payroll information 102, financial information 104, and commodity purchase information 106, each of which is discussed subsequently herein, is input and converted into electrical signals conveyed to the local computer system 1 at block 108. At block 112, the computer program 3 is engaged to program processor 2 to manipulate and transform the input digital electrical signals to produce output digital electrical signals. The manipulating and transforming can include carrying out a payroll analysis at block 110, a commodity purchase analysis at block 114, and a commercial entity profit and loss analysis at block 116. Any of the foregoing analyses, as well as the input data, can be displayed at the monitor 4, stored in the memory 6, printed at printer 7, and/or communicated by modem 8—either before or after being handled in commodity trust & ESOP reporting block 118 (which is directed to generating documentation utilizing any of the foregoing).

Figure 5A:
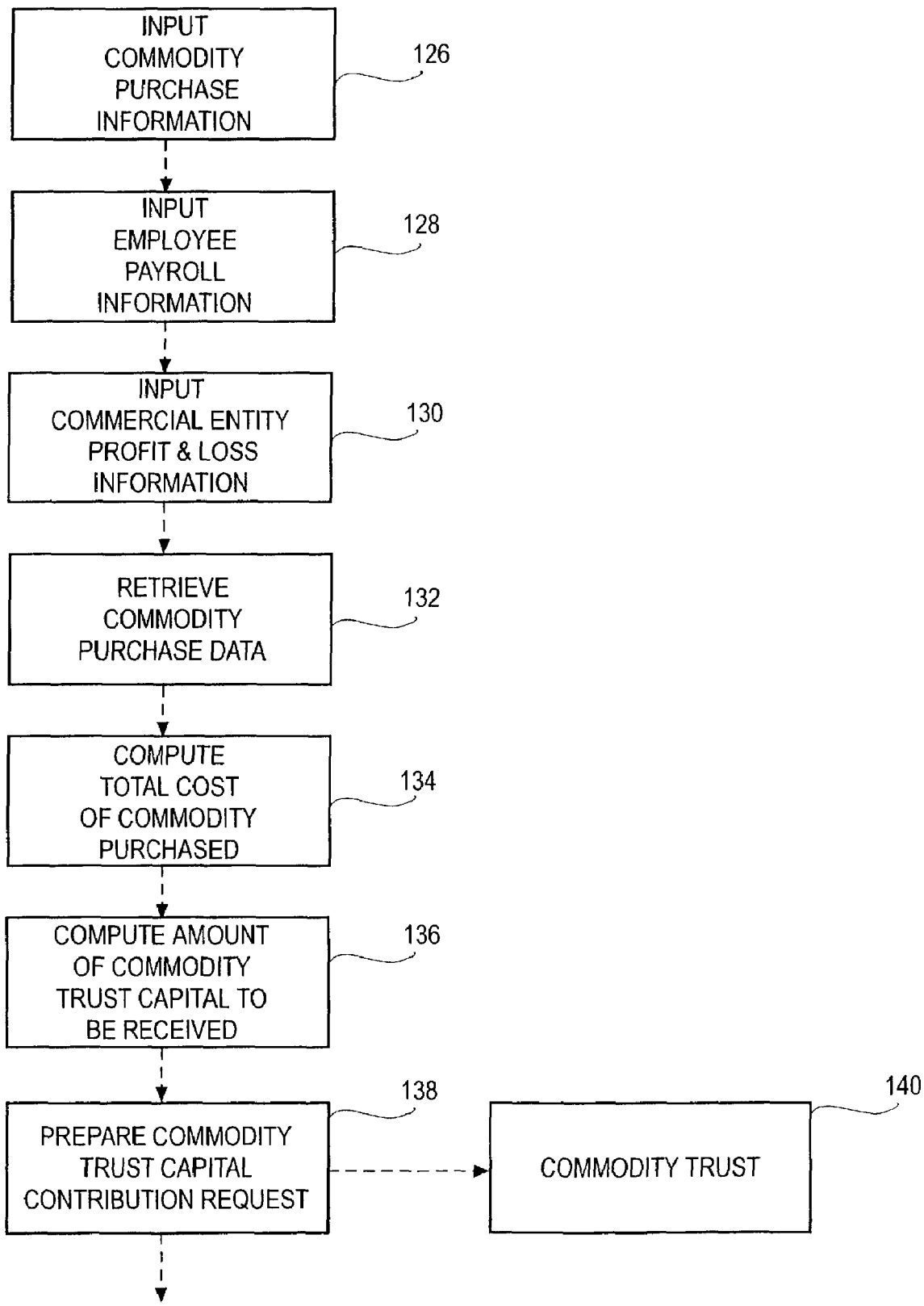
FIGS. 5A-5C are flow charts for the present invention.
Figure 5B:
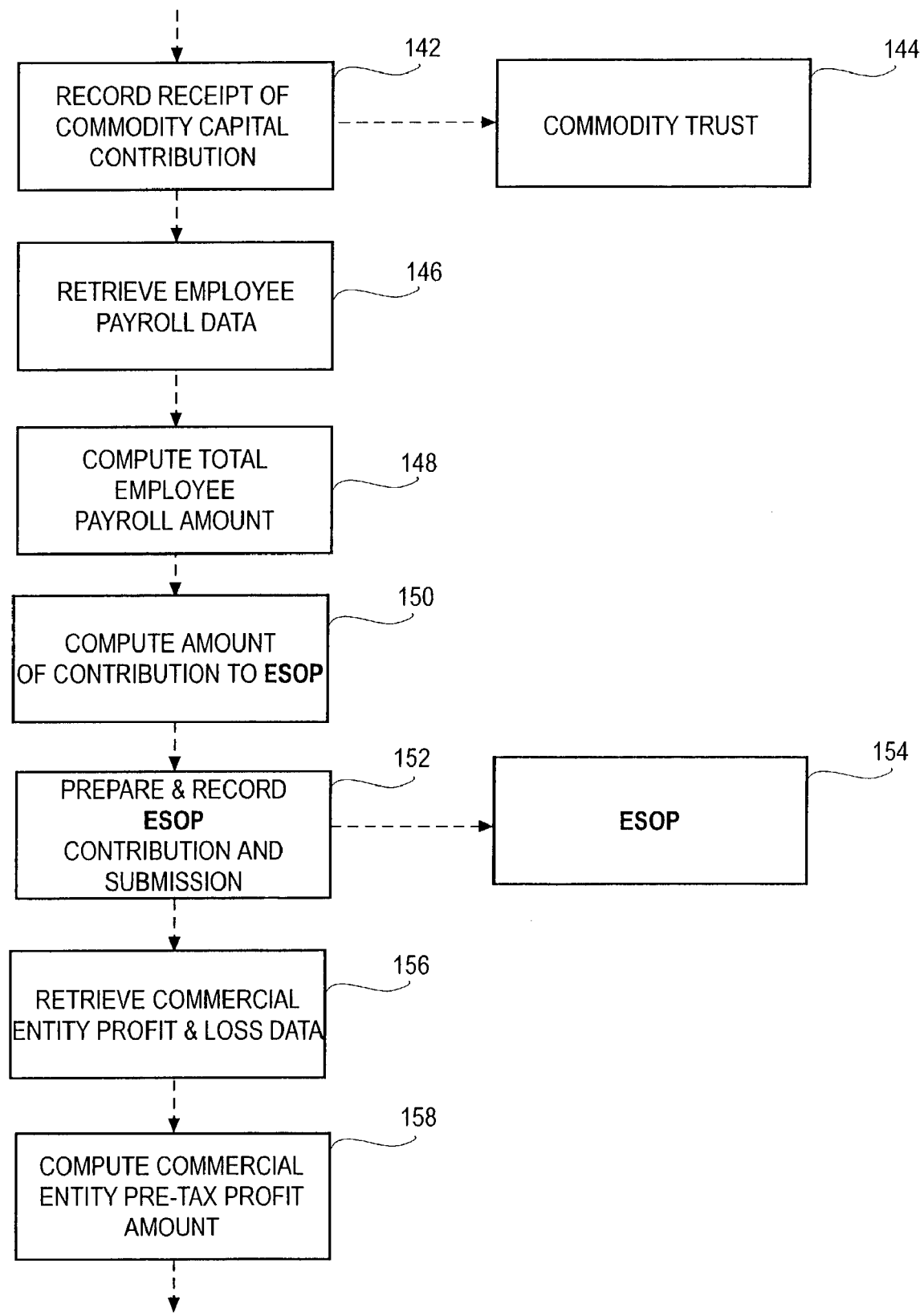
Figure 5C:
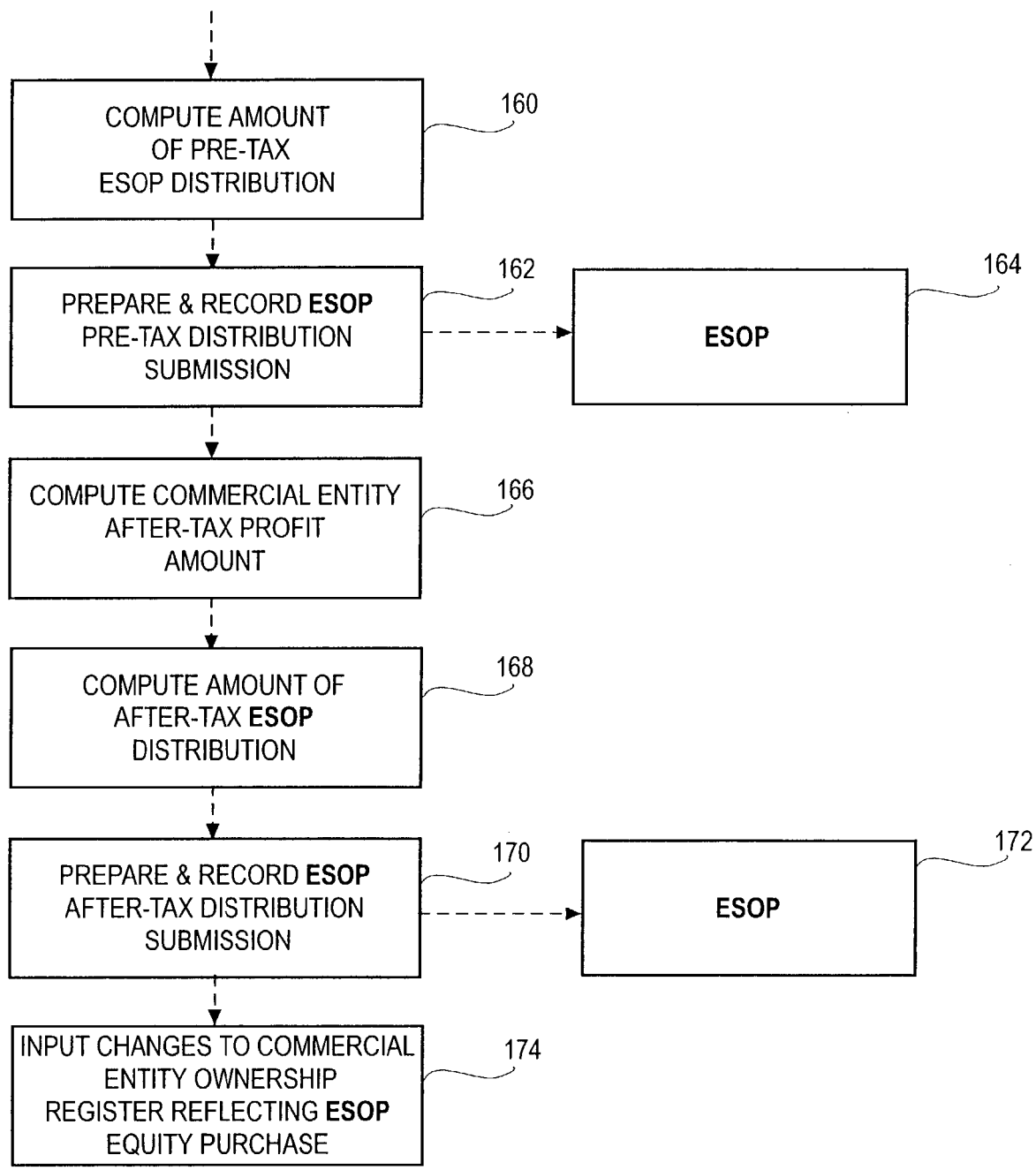

FIGS. 5A-5C are more detailed flow charts for illustrating the present invention. Block 126 Information relating to the purchase of the commodity is to represent input into the computer. This information can include such data as the vendor, date, price and quantity of the commodity, terms of payment, etc. Block 128 is for Information relating to the commercial entity's employee payroll, which is input into the computer. This information can include such data as the employees name, social security number, and other personal details, position, hours worked, compensation rate, total compensation, etc. In Block 130, information relating to the commercial entity's financial operations is input into the computer. This information can include revenue, expenses, cash receipts and disbursements, changes in ownership and other memo entries, etc. In Block 132 data relating to the purchase of the commodity, is retrieved from the computer. The pertinent data is the quantity and price of commodity purchased. Block 134 illustrates that the total cost of the commodity is computed. Price multiplied by, quantity equals total commodity cost. In Block 136, the amount and price of the stock of the commercial entity to be purchased by the commodity trust is computed. The amount of the capital contribution is equal to a predetermined percentage of the total amount of the commodity purchases. Next, in Block 138, document-generation is illustrated by a report summarizing the purchase of the commodity and request for the capital contribution is prepared. In Block 140, the commodity purchase report and capital request prepared in Block 138 is sent to the commodity trust. Block 142 represents that the receipt of the capital contribution from the commodity trust is recorded to memory. In Block 144, the commercial entity's ownership register is updated to reflect the capital contribution made by the commodity trust. In Block 146, data relating to the commercial entity's employee payroll is retrieved from the computer. The pertinent data is the amount of time worked and the remuneration. Block 148 shows that the total cost of the commercial entity's payroll is computed. Time worked multiplied by remuneration equals total payroll cost. In Block 126, information relating to the purchase of the commodity is input into the computer. This information can include such data as the vendor, date, price and quantity of the commodity, terms of payment, etc. This can be in conjunction with, or independently of, the commercial entity's general accounting software. Block 128 represents that information relating to the commercial entity's employee payroll is input into the computer. This information can include such data as the employees name, social security number and other personal details, position, hours worked, compensation rate, total compensation, etc. Preferably this information is obtained automatically from the commercial entity's general accounting software. In Block 130, information relating to the commercial entity's financial operations is input into the computer. This information can include revenue, expenses, cash receipts and disbursements, changes in ownership and other memo entries, etc. Block 132 shows that the data relating to the purchase of the commodity is retrieved from the computer. The pertinent data is the quantity and price of commodity purchased. In Block 134, the total cost of the commodity is computed. Price times quantity equals total cost. Next, in Block 136, the amount and price of the stock of the commercial entity to be purchased by the commodity trust is computed. The amount of the capital contribution is equal to a predetermined percentage of the total amount of the commodity purchases. Next, Block 138 represents further document-generation with a report summarizing the purchase of the commodity, and preparation for a request for the capital contribution. In Block 140, the commodity purchase report and capital request prepared in Block 138 is sent to the commodity trust. Block 150 illustrates that the total amount of the commercial entity's contribution to the ESOP is computed. Payroll cost multiplied by contribution percentage equals contribution. In Block 152, the commercial entity's distribution of funds to the ESOP is recorded to memory. Next, Block 154 shows the commercial entity distribution of funds is sent to the ESOP. In Block 156, data relating to the commercial entity's income statement is retrieved from the computer. The pertinent data is the amounts of revenue and expenses. Block 158 illustrates that the commercial entity's pre-tax profit is computed. In Block 160, the amount of the commercial pre-tax contribution to the ESOP is computed. Then, in Block 162, the commercial entity's distribution of pre-tax funds to the ESOP is recorded to memory. Next, Block 164 represents that the commercial entity's distribution of pre-tax funds is sent to the ESOP, preferably by electronic communication over a network, which can include a secure communication over a network gateway. In Block 166, the commercial entity's after-tax profit is computed. Next, in Block 168, the amount of the commercial entity's after-tax contribution to the ESOP is computed. Block 170 shows that the commercial entity's distribution of after-tax funds to the ESOP is recorded to memory, and Block 172 shows the commercial entity's distribution of after-tax funds is sent to the ESOP by the network discussed above. In Block 174, an entry is made to the commercial entity's books and records reflecting the sale of a percentage of the original ownership to the ESOP. This is a memo entry to the commercial entity's ownership register for no financial transaction with the commercial entity is involved.

Preferably, the commercial entity 12 computer system can handle the following operations, especially in cooperation with other entity computer system 9a and other institution computer 9b, each of which handle the corresponding data processing necessary to effectuate the complete transaction, along with computing for its own local needs:

1. Capitalize commodity trust and fund trust bank account.
2. Capitalize commercial entity and commercial entity operating bank accounts.
3. Establish ESOP and ESOP bank account.
4. Implement general accounting system.
5. Calculate total commodity purchases for X period of time.
6. Transfer an amount equal to X % of total commodity purchases from commodity trust bank account to commercial entity operating bank account.
7. Calculate total employee payroll for X period of time.
8. Transfer an amount equal to X % of total employee payroll from commercial entity operating bank account to ESOP bank account.
9. Calculate commercial entity profit for the year.
10. Transfer an amount equal to X % of commercial entity profit from the commercial entity operating account to ESOP bank account.
11. In year four and every year thereafter, sell X % of the commercial entity stock to the ESOP.

Even more particularly, the computer operations can be represented by Excel spreadsheet formulas provided in the following specimens (represented for an airline as a sample commercial entity 12, as discussed further below).

Specimen 1
Projected Balance Sheet
PROJECTED BALANCE SHEET
X % GROWTH X % FUEL PARTICIPATION

| in $ 000 | YEAR X |
|---|---|
| Assets | |
| Cash | =IF('PROJECTED INCOME AND CASH FLOW'!D$57<0, 0, 'PROJECTED INCOME AND CASH FLOW'!D$57) |
| Accounts Receivable | =−SUM('PROJECTED INCOME AND CASH FLOW'$D$43) |
| Stock Loans Receivable | =+'PROJECTED INCOME AND CASH FLOW'!$D48−SUM('PROJECTED INCOME AND CASH FLOW'!$D$50:D$50) |
| Deposits & Other Assets | =−'PROJECTED INCOME AND CASH FLOW'!$D$51 |
| Fixed Assets | =−'PROJECTED INCOME AND CASH FLOW'!$D$52 |
| Depreciation & Amortization | =−'PROJECTED INCOME AND CASH FLOW'!$D53 |
| Total Assets | = SUM(B7:B12) |

-continued

Specimen 1
Projected Balance Sheet
PROJECTED BALANCE SHEET
X % GROWTH X % FUEL PARTICIPATION

| in $ 000 | YEAR X |
|---|---|
| Liabilities & Equity | |
| Accounts Payable | = +'PROJECTED INCOME AND CASH FLOW'!$D$54 |
| Loans Payable | = SUM('PROJECTED INCOME AND CASH FLOW'!$D$44:D$44) + SUM('PROJECTED INCOME AND CASH FLOW'!$D$45:D$45) |
| Capital | = SUM('PROJECTED INCOME AND CASH FLOW'!$D$46:$D$48) |
| Retained Earnings | = SUM('PROJECTED INCOME AND CASH FLOW'!$D$42:D$42) + 'PROJECTED INCOME AND CASH FLOW'!D$55 |
| Total Liabilities & Equity | =SUM(B16:B19) |

Specimen 2
Projected Fuel Savings Sheet
PROJECTED FUEL SAVINGS
X % GROWTH X % FUEL PARTICIPATION

| In $ 000 | YEAR X |
|---|---|
| Handling Cost | 0.03 |
| Total | = SUM(C12:C13) |
| Fuel Purchases | = +'[TUL_3.xls]CASH FLOW AND INCOME STATEMENT'!B50 |
| Fuel by Component | |
| Fuel Cost | = C18/C14*C12 |
| Handling Cost | = C18/C14*C13 |
| Total | = SUM(C21:C22) |
| Savings by Year | = C21/2 |
| Cumulative Savings | = SUM(C26) |

Specimen 2
Projected Fuel Savings Sheet
PROJECTED FUEL SAVINGS
X % GROWTH X % FUEL PARTICIPATION

| In $ 000 | YEAR X |
|---|---|
| Gallons (000) | |
| Boeing 737 | = +'[TUL_3.xls]CASH FLOW AND INCOME STATEMENT'!B26 |
| Total | = SUM(C8:C9) |
| Price Per Gallon | = +'[TUL_3.xls]EXPENSES FORECAST'!$CF$43-C13 |

Specimen 3
Fuel Trust for Participation for Stock
FUEL TRUST PARTICIPATION FOR STOCK
X % GROWTH X % FUEL PARTICIPATION

| In $ 000 | | YEAR X |
|---|---|---|
| ESOP Purchases @ | = +'ESOP STOCK PURCHASES'!$C$9 | = +'ESOP STOCK PURCHASES'!$E$9 |
| Fuel for Stock @ 50% | | = +'PROJECTED FUEL SAVINGS'!$F$28 |
| Profit on Stock | | = +C8–C10 |

Specimen 4
ESOP Purchase Schedule
ESOP PURCHASE SCHEDULE
5% GROWTH 50% FUEL PARTICIPATION

| In $ 000 | Beginning Ownership | Equity Value | 25% Purchases |
|---|---|---|---|
| Fuel Trust Investors | 25% | =+C9*D14 | =+D14*E6*(C9/SUM(C9:C12)) |
| Equity Investors | 10% | =+C10*D14 | =+D14*E6*(C10/SUM(C9:C12)) |
| Airline Investors | =1-C13-C12-C10-C9 | =+C11*D14 | =+D14*E6*(C11/SUM(C9:C12)) |
| ESOP Education | 5% | =+C12*D14 | =+D14*E6*(C12/SUM(C9:C12)) |
| ESOP | 5% | =+C13*D14 | 0 |
| Total | =SUM(C9:C13) | =ROUND('PROJECTED INCOME AND CASH FLOW'!$G$35*$T$1, –2*, | =SUM(E9:E13) |

Specimen 5
Projected ESOP Income and Cash Flow Statement
PROJECTED ESOP INCOME & CASH FLOW STATEMENT
X % GROWTH X % FUEL PARTICIPATION

| In $ 000 | YEAR X |
|---|---|
| Beginning Cash Balance | — |
| Sources of Funds | |
| Corporate Payroll Contributions | =+'PROJECTED INCOME AND CASH FLOW'!D37 |
| Interest Reimbursement | ='PROJECTED INCOME AND CASH FLOW'ID38 |
| Stockholder Stock Loans | =IF(−(+D7+D10+D11+D13+D14+D15−D19−D20−D24−D26)>=0.+(+D7+D10+D11+D13+D14+D15−D19−D20−D2 |
| Pre-Tax Dividend Income | =−'PROJECTED INCOME AND CASH FLOW'ID39 |
| After Tax Dividend Income | =+'PROJECTED INCOME AND CASH FLOW'!D$55 |
| Total Sources of Funds | =SUM(D10:D15) |
| Uses of Funds | |
| Stock Purchases | |
| Administration@ 2% | =(+D10+D11)*$B20 |
| Initial Stock Purchase | =+'PROJECTED INCOME AND CASH FLOW'!D50 |
| Interest On Initial Stock Purchase | =+'PROJECTED INCOME AND CASH FLOW' ID33 |
| Loan Repayment Over 10 Years Stockholder Stock Loans | |
| Interest Expense @6% | |
| Stockholder Stock Loans | — |
| Total Uses of Funds | =SUM(D19:D26) |
| Ending Cash Balance | =+D7+D16−D27 |

Specimen 6
Projected Fuel Trust Rate of Return
PROJECTED FUEL TRUST RATE OF RETURN X% GROWTH X% FUEL PARTICIPATION

| In $ 000 | Stock Share | Beginning Balance | Less: Fuel Cost | Add: Int@ 6.00% | Add: Stock Purchases | Ending Balance |
|---|---|---|---|---|---|---|
| Beginning of Trust | 25% | −+PROJECTED FUEL SAVINGS$F$20 | | | −+C7−07−E7+F7 | +C7 |
| Year X | | −+G7  C21/2 | −+(C8−(D8 −0.5))−$E$$ | | −+C8−D8+F8 | −+E8+F8 |
| Year 2 | | −+G8−+PROJECTED FUEL SAVINGS$D$20 | −+(C9−(D9−0.5))$E$$ | | −+C8−D8+F9 | −+E9+F9 |
| Year 3 | | −+G9−+PROJECTED FUEL SAVINGS$D$20 | −+(C10−(D10−0.5))$E$$ | | −+C8−D8+F10 | −+E10+F10 |
| Year 4 | | −+G10−+PROJECTED FUEL SAVINGS$D$20 | −+(C11−(D11−0.5))$E$$ | RETURN ON FUEL PARTICIPATION$C$$ | −+C11−D11−E11−F11 | −+E11+F11 |
| Year 5 | | −+G11−+PROJECTED FUEL SAVINGS$D$20 | −+(C12−(D12−0.5))$E$$ | RETURN ON FUEL PARTICIPATION$C$$ | −+C12−D12−E12−F12 | −+D12+E12+F12 |
| Year 6 | | −+G12−+PROJECTED FUEL SAVINGS$D$20 | −+(C13−(D13−0.5))$E$$ | RETURN ON FUEL PARTICIPATION$C$$ | −+C13−D13−E13−F13 | −+D13+E13+F13 |
| Year 7 | | −+G13−+PROJECTED FUEL SAVINGS$D$20 | −+(C14−(D14−0.5))$E$$ | RETURN ON FUEL PARTICIPATION$C$$ | −+C14−D14−E14−F14 | −+D14+E14+F14 |
| Year 8 | | −+G14−+PROJECTED FUEL SAVINGS$D$20 | −+(C15−(D15−0.5))$E$$ | RETURN ON FUEL PARTICIPATION$C$$ | −+C15−D15−E15−F15 | −+D15+E15+F15 |
| Year 9 | | −+G15−+PROJECTED FUEL SAVINGS$D$20 | −+(C16−(D16−0.5))$E$$ | RETURN ON FUEL PARTICIPATION$C$$ | −+C16−D16−E16−F16 | −+D16+E16+F16 |
| Year 10 | | −+G16−+PROJECTED FUEL SAVINGS$D$20 | −+(C17−(D17−0.5))$E$$ | RETURN ON FUEL PARTICIPATION$C$$ | −+C17−D17−E17−F17 | −+D17+E17+F17 |
| Year 11 | | −+G17−+PROJECTED FUEL SAVINGS$D$20 | −+(C18−(D18−0.5))$E$$ | RETURN ON FUEL PARTICIPATION$C$$ | −+C18−D18−E18−F12 | −+D18+E18+F18 |
| Net to Trust Interest Rate of Return | | −+G7−<SUM(D8−D18) | <SUM(E8−E18) | <SUM(F8−F18) | −+C20−D20−E20−F20 −+$$(H7$−H10,$$ | <SUM(1−10$(10) −SUM0−(7H)−(8.0.1) |

Specimen 7
Projected Income & Cash Flow Statement
PROJECTED INCOME & CASH FLOW STATEMENT
X % GROWTH X % FUEL PARTICIPATION

| In $ 000 | YEAR X |
|---|---|
| Revenue | |
| Passenger | =+'[TUL_3.xls]CASH FLOW AND INCOME STATEMENT'!B40 |
| Cargo | =+'[TUL_3.xls]CASH FLOW AND INCOME STATEMENT'!B41 |
| Other | =+'[TUL_3.xls]CASH FLOW AND INCOME STATEMENT'!B43 |
| Total Revenue | =SUM[D7:D9] |
| Expenses | |
| Payroll | =+'[TUL_3.xls]CASH FLOW AND INCOME STATEMENT'!B47 |
| Benefits & Taxes | =+'[TUL_3.xls]CASH FLOW AND INCOME STATEMENT'!B48 |
| Flight Operations | =+'[TUL_3.xls]CASH FLOW AND INCOME STATEMENT'!B49 |
| Fuel | =+'[TUL_3.xls]CASH FLOW AND INCOME STATEMENT'!B50 |
| Maintenance | =+'[TUL_3.xls]CASH FLOW AND INCOME STATEMENT'!B51 |
| Aircraft Rental | =+'[TUL_3.xls]CASH FLOW AND INCOME STATEMENT'!B52 |
| Inflight | =+'[TUL_3.xls]CASH FLOW AND INCOME STATEMENT'!B53 |
| Customer Service | =+'[TUL_3.xls]CASH FLOW AND INCOME STATEMENT'!B54 |
| Reservations | =+'[TUL_3.xls]CASH FLOW AND INCOME STATEMENT'!B55 |
| Marketing | =+'[TUL_3.xls]CASH FLOW AND INCOME STATEMENT'!B56 |
| Administration | =+'[TUL_3.xls]CASH FLOW AND INCOME STATEMENT'!B57 |
| Total Expenses | =SUM[D12:D22] |
| Operating Profit | =+D10−D23 |
| Less: Expenses paid by others | |
| Fuel Trust Contribution | =+'PROJECTED FUEL SAVINGS'!$C$26 |
| State Quality Jobs Credit 5.00% | =+$C$27*D12 |
| State Jobs Training Program | =+'[TUL_3.xls]EXPENSES FORECAST1$BU$166 |
| Net Operating Profit | =SUM(D24:D28) |
| B & I Loan Interest Expense @ 9.5% | =+AE249 |
| Pre-Start Expenditures (Net) | =−'[TUL_3.xls]PRE-START EXPENSES'!$H$142+'[TUL_3.xls]PRE-START EXPENSES'!$H$147 |
| Depreciation/ Amortization | =SUM[D52]*0.1429 |
| ESOP Loan Interest Income @ 6.0% | =+D48*C33 |
| Pre-Contribution Earnings | =SUM[D29:D34] |
| Fuel Trust Contribution | =+'PROJECTED FUEL SAVINGS'!$C$26 |
| ESOP P/R Contribution 25.0% | =+[D12*$C37] |
| ESOP Interest Deduction | =+'ESOP CASH FLOW STATEMENT'!D$22 |
| ESOP Principal Deduction | =+'ESOP CASH FLOW STATEMENT'1D$21 |
| Taxable Income | =SUM[D35:D39] |
| Income Taxes @ 38.0% | =IF(SUM($D40:D40)>0, +SUM($D40:D40)*$C41−SUM(C41:$D41).0) |
| Net After Tax Income | =+D40+D41 |
| Accounts Receivable | =[+D10/12/2] |
| Fuel Trust Contribution | =+'PROJECTED FUEL SAVINGS'!$C$26 |

EXAMPLE

To generally illustrate the present invention, consider a start-up airline as an example. (Of course, the present invention is not limited to any particular economic sector, but an airline provides a suitable example of a commercial entity in its institutional and commercial environment, with all the attendant computer operations.) For the purposes of this disclosure, consider a hypothetical "New Air" airline. A specific example of implementation of this invention follows:

Assume that New Air is headquarterd in Tulsa, Okla., and will introduce scheduled, daily, nonstop air travel service between Tulsa and Oklahoma City to the East and West Coasts, as well as to Las Vegas and New Orleans. New Air's scheduled passenger service operation will match the lowest available fare of any scheduled airline to all of New Air's destinations.

New Air will add a market city every other month for the first five months, with three flights per day to and from each of the initial three cities, with the flights averaging 3½ hours in length. This will make possible out-and-back travel on the same day from Oklahoma to the East and West Coast markets. In the seventh month of commercial service, New Air will add two daily flights to San Francisco and one daily flight to Las Vegas. Scheduled service to New Orleans will be folded in with the first cities served, as early as possible.

Scheduled route service out of Tulsa and Oklahoma City to New Orleans Lakefront Airport with a 15-minute turn (stop) will be added, with continuing service to another 15-minute turn (stop) in Jackson, Miss. and then on nonstop, to Washington D.C.'s National (now Ronald Reagan) Airport, and back (return flight).

New Air will have nine schedule-dedicated, hush-kitted Boeing 737-200 (Advanced) aircraft, with one maintenance spare, for a total of ten aircraft.

To take advantage of the many cost savings afforded an established air carrier, including millions in potential insurance savings, and to avoid other costs and delays associated with the certification of a new carrier, New Air will purchase a first local airline (Local Express), along with its Federal Aviation Administration Part 121 certificate and Department of Transportation Part 401 certificate, which grant unrestricted scheduled and charter authority to carry persons, property, and mail for interstate and overseas operations covering all of the U.S. and possessions, as well as operations anywhere in the world. Additionally, Local Express holds supplemental certificates and authorities from the U.S. and host countries covering operations to Canada, Mexico, and the Caribbean.

The purchase of Local Express includes all issued and outstanding stock of the corporation, free and clear of all liabilities, and interests. Local Express has established a ten-year history of safe operations. Presently Local Express has two older 737 aircraft, all ground and support equipment, a complete spare parts inventory, employs just under 100 people, and enjoys an excellent relationship with the Federal Aviation Administration. Local Express, following a name change, will be the vehicle through which New Air will operate its scheduled passenger service, as well as the two charter subsidiaries, Local Express and Second Local Express. New Air will ultimately utilize a fleet of used, late-model, very low-time, Boeing 737-200 (Advanced) aircraft, the existing Local Express certificates and authorities, and the existing Local Express Op Specs, expanded to include additional destinations in the Eastern United States.

The Local Express Op Specs include 124 cities (primarily in the western two-thirds of the U.S.) to which Local Express routinely operates on a scheduled basis. This is a greater number of U.S. cities than is served by any other scheduled carrier. It would cost well in excess of $10,000, with proving runs and all other required costs, to add a city to a new carrier's Operation Specifications. The enhancement value to the Local Express operating certificates resulting from the extraordinary number of approved, scheduled cities on the Op Specs is in excess of $1,240,000.

In spite of the fact that Local Express is now over ten years old, its average fully burdened labor cost is still only slightly over $35,000 per year, per employee, with only two aircraft supporting the full cost of infrastructure. The average labor cost for a start-up charter carrier like Local Express would be a little over $33,000 today. Local Express has about 49 employees per aircraft, a high number because of infrastructure. Local Express is fully capable of operating five aircraft with slightly fewer than 40 employees per aircraft at the same $35,000 average cost per employee, thereby becoming an even greater model of efficiency, better utilizing infrastructure, facilities, ground and support equipment, as well as an exceptionally complete spare parts inventory.

Local Express has been operating 6,200 revenue hours per year for the last five years of its ten-year history. Total operating cost with no debt and everything paid for is $2,600 per block hour. Annual operating profit, at closing, with current contracts going forward is $4.3 million. The seller of Local Express has contracted to pay $3,000 per hour for 275 to 360 block hours per month and $3,200 per block hour for all hours less than 275 per month. All hours over 360 per month are at $3,400 per block hour. The seller will require 420 hours per month for October, November and December. Other customers are paying more than $3,500 per block hour for track charter programs. Ad hoc charters are billed $3,550 to more than $4,500 per hour. All customer revenue is required to be placed in escrow prior to any flight operations by Local Express, as is the industry standard.

As a subsidiary of New Air, Local Express will continue to operate just as it always has with its two 737s, earning an operating profit of $4.3 million on approximate $20 million of revenue, until such time as the third aircraft is added. A third aircraft will be added to the Local Express fleet as soon as New Air closes on the above-mentioned purchase.

New Air is also in the process of forming a wholly owned subsidiary, a Second Local Express to be operated by New Air conditioned on an exclusivity agreement and minimum revenue guarantees, all charter service for approximately one hundred conventions in New Orleans annually, as well as for Mardi Gras, and other events.

Second Local Express will utilize five 737-200s, as they are delivered. These aircraft will service the Mardi Gras, Sugar Bowl, Super Bowl, convention and package tour needs of New Orleans, its Visitors and Convention Bureau, and the Convention Center, bringing passengers from all over the U.S., Mexico and Canada on a track charter program basis. Hourly charter rates will be paid in advance, in escrow, assuring full capacity revenues. These same aircraft will also be utilized as charter aircraft for package tour destinations such as Walt Disney World, Mexico, and the Caribbean.

Second Local Express has entered into an arrangement, through a mutual Letter of Intent, with the Orleans Levee District for the exclusive rights to provide scheduled air service utilizing the New Orleans Lakefront Airport, ten minutes from downtown New Orleans. Lakefront Airport is fully staffed, with its own fully equipped independent fire department and sixty-member police force (some members of which carry credentials from the U.S. Customs Service and can clear international flights).

The existing Oklahoma market is substantially more than adequate to ensure success with regard to New Air's scheduled service. In 1996 more than 800 people a day flew from Oklahoma to each coast and that number is even higher now. In the first year of scheduled service operations, New Air will create up to 600 new jobs in Oklahoma, and over 57 new jobs in the out-stations being served. Secondary job creation should provide an additional 200 jobs in Oklahoma as well. In addition, Second Local Express will employ another 185 people in Louisiana. Local Express currently employs 97 people, and will, after ramping up to a total of five aircraft, employ just under 200.

The single largest expense of any airline is its labor costs. Due to the start-up nature of New Air, scheduled service labor costs will be approximately half those of the major carriers. New Air's fully burdened labor cost, including Local Express and Second Local Express, will be less than $35,000 per employee.

The second largest single expense of an airline is fuel. With the older airlines, this cost averages approximately 12% to 16% of their total revenue. Were it not for the invention herein, New Air's fuel cost for its scheduled service operation would be approximately 17%. The reason for this is that, as a start-up, our other major costs, such as labor, aircraft leasing, and catering, are disproportionately low. Licensing and utilizing the present invention in conjunction with an incremental ESOP will reduce the cost of fuel to New Air by 50% over 11 years while creating employee ownership through the ESOP at no cost to our employees. As wholly owned subsidiaries operated by New Air, Local Express and Second Local Express will both enjoy the full financial benefit of the present invention.

New Air projects to grow by 20% a year compounded for the next eleven years. New Air's payroll in Oklahoma will exceed $15,000,000 in the first year. Second Local Express charter operations and New Air scheduled service operations combined will generate approximately 200 new jobs in New Orleans with an annual payroll in excess of $7,000,000. Local Express will generate approximately 90 new jobs with additional payroll of approximately $3,104,000.

Local Express charter operations will expand from two aircraft and 97 people, to three aircraft and almost 127 immediately upon closing. Local Express will expand further by adding a fourth and fifth aircraft and almost 30 people per aircraft as rapidly as firm; long-term track program charter contracts can be developed to facilitate such expansion. Ultimately, within 18 months, Local Express is planned to have five late model Boeing 737-200 (Advanced) aircraft and just under 200 people.

New Air plans to launch this fall with a total capitalization of in excess of $117,875,000 including the full, four year funding for the Fuel Trust. Of this amount, $15,000,000 will be hard equity (cash) in return for 15% of the Company's common stock. All other shareholders, save and except the Fuel Trust Investor(s), who will acquire 25% of the Company's common stock, in trust, incrementally, over time, as such fuel and stock purchases are made, in return for indirect payment of half of the fuel bill for 11 years, will subordinate to an annual rate of return for the three ($5 million each) equity investors of thirty percent, as a floor. The Fuel Trust Investor(s) will receive 30 basis points above the appropriate current market price for investment grade paper carrying a rating of either A, AA, or AAA (Moody's and/or S&P), as a floor, and ceiling, until the equity investors exceed their required thirty percent (30%) floor rate of return. In essence, the equity investors would have the equivalent of a preferred stock by virtue of subordination agreements with all other shareholders in lieu of a defined (preferred) class of stock, which would be prohibited in view of the ESOP. An ESOP under law must hold a class of stock equal or superior to any other issued by the Company.

New Air, the parent company, is an Oklahoma corporation, formed Jan. 22, 1996, and is authorized to issue 10 million shares of common stock. The members of New Air's Board of Directors collectively own 403,000 shares or 4.03% of the company and another 898,000 shares or 8.98% is owned by a small group of other accredited investors. All in all, New Air will be owned, pursuant to an offering at par value, by over 250 founding shareholders, the largest of which will own less than 5% of the company. Of the more than 250 future owners of the company, over 100 are millionaires (of which 67 live in Oklahoma). Over $4 million have so far been invested in New Air (Local Express/Second Local Express)'s business plan and operations development.

The three $5,000,000 equity investors that acquire 5% each of New Air should be extremely comfortable with their positions. The first priority is to ensure the most rapid return possible, with the least amount of risk, well ahead of any other stockholder, save and except the Fuel Trust Investor. The Fuel Trust Investor will be a pension fund (or funds) that buys equity for enough to pay for half the fuel for 11 years in order to reduce costs and enhance profits, while enjoying a modest investment grade return, as a floor, until the equity investors see a 30% floor rate of return. From then on, both the Fuel Trust investor and the equity investors participate in the upside pro rata and pari pasu.

To be safe, one can pragmatically project (even without anticipating) a $10 million loss for the passenger operation the first year of scheduled passenger service during the ramp-up process. Profits from Local Express and Second Local Express will offset this. For that pragmatic reason the first ESOP stock purchase is extended out to the 48th month of operations. This also allows compliance with the IRS 1042 three-year holding requirement, enabling all qualified equity investors to capture a permanent Federal and State income tax deferment on all gains resulting from the ESOP purchase, pro rata and pari passu, of 25% of those investor's shares in the 48th month, and 10% annually thereafter over the next seven years in seven equal installments of 10% each.

For the first 48 months, all pretax profits (dividends) and 20½ months of employer payroll contributions (equal to 25% of gross payroll for a leveraged ESOP, annually, limited by Rule 415 promulgated under the Internal Revenue Code) will accumulate in a trust suspense account. These funds will be subject only to the security deed interest necessary to secure the Fuel Trust Investor's spent cash, investment grade rating and very modest corresponding investment grade floor rate of return.

This minimum return results from the most pragmatic projections possible, embracing a scenario in which the aircraft fly less than half full for the first year and enjoy half-price fuel (fuel otherwise would represent 17% of all New Air costs) and less than half-price start-up labor costs (labor represents 30% to 40% of all airlines' costs). New Air's fully burdened labor costs as a start-up, although $3,000 above scale at entry, are still much less than $35,000 per employee compared to the major airlines' average costs of over $65,000 per employee.

The equity investors will, as described above, have minimally recovered all of their initial investment plus a modest (30%) return (with a tax deferment on the gain) as a floor in the 48th month. If economic performance does much better than this "worst case" scenario, as expected, the equity investors will make correspondingly much more in the 48th month. The real beauty lies in the fact that the investors will have only sold 25% of their stock in the first, 48th month purchase by the ESOP, to become whole and make a profit. They will still own 75% of their stock, which the ESOP will then buy in seven equal installments annually over the next seven years. Again, all other shareholders will continue to subordinate to the equity investors (30%) rate of return for the full eleven years. However, as the airline grows by the projected, carefully controlled, annual rate of 20%, the minimum targeted return in a continued "worst case" scenario projects additional tax deferred earnings for the three $5 million equity investors of a total of $140,000,000 (instead of the $31.5 million minimum return covered by the continued subordination by all other shareholders as outlined above) tied to a floor for the continued operation of the Fuel Trust in the most pragmatic set of circumstances imagined over the next seven years.

It was very important to accomplish two things:

(1.) Protect the Fuel Trust Investor by way of a secure enough transaction to carry an investment grade rating (Moody's or S&P) A, AA or AAA in order to pay half the fuel cost for 11 years with the cheapest money possible, a nontaxable income stream created by the on-going sale of equity on a performance driven basis. This is accomplished through the sale of the Fuel Trust equity (25% of the airline) incrementally, in trust, fully secured by the suspense account, and totally performance-driven, month to month, by carefully tracked monthly P&L's.

(2.) To set up three $5 million dollar equity investors to benefit first from the above, ahead of all other shareholders, through subordination by all other shareholders, with a minimum 30% rate of return, as a floor, and an unlimited upside.

New Air will convey 5% of its shares (the only dividend-bearing preferred class of stock, convertible to common) to an ESOP prior to commencement of revenue service. In the 48th month the ESOP will acquire an additional 25% of the company from all other shareholders, pro rata and pari passu, for a price equal to ten times twelve months most recent trailing earnings (EBIT) per share at the time of purchase, bringing its total ownership to the 30% necessary to trigger the 1042 tax deferment. From then on, for the next seven years, the ESOP will acquire 10% of the company annually on the same basis. At the end of eleven years the ESOP will own 100% of the airline, having acquired all other shares from all other shareholders. The ESOP will have used all of the earnings of the airline and the rule 415 limited contributions, conveyed on a highly tax-advantaged basis, to purchase all other shares from all other shareholders (without costing the ESOP or the employees anything but high productivity).

By utilizing an incremental ESOP, which will acquire all of the outstanding equity of the airline over an 11-year period, as an exit strategy, all shareholders otherwise eligible for capital gains treatment, in New Air, will be eligible for a Federal and State income tax deferment on the gain from the sale of their equity (shares) to the ESOP for an amount equal to ten times twelve months most recent EBIT per share, taking advantage of a targeted twenty percent (20%), carefully controlled annual growth rate. The tax-deferred returns created by this method are many times greater than would be the case with an IPO.

This income tax deferment, available under Section 1042 of the Internal Revenue Code, is subject to specific conditions. If an ESOP purchases at least 30% of the outstanding stock of a privately held company and the selling shareholder(s): (1) are not "C" corporations, (2) have owned their stock for at least three years, and (3) are otherwise eligible for capital gains treatment, the selling shareholder(s) can defer virtually indefinitely the taxes on their gain. To obtain this tax benefit, the selling shareholder(s) must reinvest the proceeds in a "qualified replacement property" within a 15-month window beginning three months prior to the sale and ending 12 months after the sale. Such a Section 1042 transaction, which derives its name from the section of the Code that governs its availability, is often referred to as a "1042 rollover."

Upon completion of all financing, 100% of New Air will be owned as follows:

50% by management and seed investors who have already put in $4 million for development.

25% by the Fuel Trust, to be purchased by the Fuel Trust Investor, in trust, for half the fuel cost over 11 years, carrying an investment grade rating (A, AA or AAA). The Fuel Trust enables the airline to indirectly pay half its fuel cost (an airline's second highest cost after labor) with equity.

15% cash equity (to ideally be held by three groups at $5 million each) which carries a 30% rate of return as a floor, to which all other shareholders, except the Fuel Trust, subordinate.

5% the only dividend bearing preferred stock, owned by a leveraged ESOP (the purchase of which is financed by New Air for the ESOP). All dividends paid to the ESOP will be held in a suspense (trust) account, which is used to fully secure the monies spent by the Fuel Trust until the stock purchase date in order to obtain an investment grade rating and insure sufficient cash for the ESOP to buy out all other shareholders, as planned.

5% owned by the Education Endowment Fund for higher education for the benefit of the employees and their dependants, funded by pro rata and pari pasu ESOP purchases as described, over the full 11 years.

Any commitment to provide any funding, as described, would, of course, also be conditioned upon the following:

New Air bringing to the closing an acceptable commitment for a 70% U.S. Government Guaranteed Business and Industry Loan, for $10 million, in the form of a ten-year term loan to be secured by an assignment of the Quality Jobs Act commitment from the State of Oklahoma of 4.58% of New Air's gross Oklahoma payroll for ten years. This commitment will be paid quarterly, in cash, and is backed irrevocably by the full faith and AA rated credit of the State of Oklahoma. The 10-year total cannot exceed $21,576,684, unless adjusted upward, based on re-evaluation and approval by the State of Oklahoma.

A similar B & I loan commitment, for $10,000,000 for Local Express in its home town and state.

A commitment from pension (or other) funds to fully fund the Fuel Trust for the full 11 year period, as earlier described.

Subject to formal, open meeting approval as required by Oklahoma law, commitments from the Owasso Economic Development Authority ("OEDA"), of Owasso, Okla. (a community adjacent to Tulsa International Airport) to provide the following:

A tract consisting of up to 40 acres on Mingo Road, six miles from Tulsa International Airport, on the west side of Owasso, directly across from a new, $5 million dollar, eighteen-hole golf course on the third highest point of land in Tulsa County, with a view of the Tulsa skyline—Free.

OEDA will construct, or cause to be constructed, on the above property, parking lots, roadways, curb and gutter, storm drainage and lighting—Free.

OEDA will make available up to $5 million for the construction of New Air's headquarters campus, to consist of a headquarters building, a reservation center and a spare parts warehouse. OEDA will lease these facilities to New Air on a break-even lease at well below the prime lending rate for 15 years, upon the conclusion of which lease, OEDA will deed the buildings, free and clear to New Air for the sum of ($10.00), thereby avoiding all ad valorem taxes.

Written commitments from the States of Oklahoma and/or Louisiana to provide or pay for all training and related expenses (approximately $2 million).

The satisfactory completion of all financing as described herein, for a total of not less than $117 million for New Air (Local Express/Second Local Express) (including the Fuel Trust) as well as all financing for any aircraft and any improvements thereto, or alternatively, a satisfactory leasing arrangement, in writing, for all such aircraft as may be required.

A thorough review and analysis of the completed New Air business plan, revised to reflect the most current data available for all markets therein, is used to set the performance criteria for the computing. Such endeavor will also address the addition of the Local Express and Second Local Express charter service required to satisfy the needs of the hotel and casino industry in Nevada as well as the New Orleans Convention Bureau, for all conventions and Mardi Gras, as well as all scheduled routes to and from New Orleans Lakefront Airport, conditioned only upon financing. All such work is to be performed at New Air's expense by a mutually agreed upon independent third party. The contract for and the final results of such thorough review and analysis must be acceptable to all parties.

Acceptable review of executed contracts with complete management teams and slates of directors for New Air, Local Express and Second Local Express. New Air (including Local Express and Second Local Express) will have the following initial capital structure when all financing is complete.

| | |
|---|---:|
| Three 5% equity tranches (cash) | $ 15,000,000 |
| B & I term loan proceeds (cash) | 20,000,000 |
| Fuel Trust (½ of all fuel costs for first 4 years) | 74,625,000 |
| OEDA (land and improvements) | 6,200,000 |
| State training funds | 2,000,000 |
| Total | $117,825,000 |

New Air (Local Express and Second Local Express) revenue stream would be available to secure additional bank credit lines through a lock box account to supplement the above.

The above does not reflect a $21,576,684 commitment from the State of Oklahoma Quality Jobs Program, or any additional potential funding offered by the State of Louisiana's Economic Development Corporation or income derived from U.S. Mail to which New Air will be entitled under law by flying the most direct (nonstop) routes.

The three $5 million dollar equity tranches will trigger all other initial financing ($102,825,000) which have been arranged. As New Air's wholly owned subsidiary, Local Express holds valid FAA-121 and DOT-401 certificates and is already flying and has been for ten years.

The start-up airline, which utilizes a significant amount of fuel for its operations, implements the invention by digital computer operations. An analysis of the projected revenues and expenses of the airline shows that a commodity trust payment participation of fifty percent (50%) of the predetermined fuel costs and a growth rate of twenty percent (20%) provides a viable rate of return for the investor entity and an optimized profit structure for the airline given a selected and specified equity position held in trust. The airline enters into a long-term (eleven (11) year) contract with a commodity trust created to provide half the cost of fuel to the airline at fifty percent (50%) of the full negotiated price due the fuel suppliers).

To accomplish this, the airline issues ten million (10,000,000) shares of stock. Initially five percent (5%) (five hundred thousand (500,000) shares) is issued to the employee stock ownership plan to create the employee stock ownership plan. The commodity trust is issued twenty-five percent (25%) (two million five hundred thousand (2,500,000) shares) which will be held in trust for the investor entity. The purpose of the trust holding the shares is to secure performance by the commodity trust/investor entity over the life of the mechanism of the invention, subject only to the commercial entity surpassing the predetermined performance criteria. The remaining seventy percent (70%) (four hundred sixty thousand (460,000) shares) of the stock is issued to others in exchange for capital, operational funding and other requirements of the airline.

The initial business plan for the airline estimates that the first year of positive earnings will be in year two (2). It is agreed and specified that the employee stock ownership plan may execute the first binding call on and purchase all released stock at the end of the forty-eighth (48th) month (TIMEL) of revenue operations in order to facilitate maximum tax and profit benefit for the shareholders. The business plan indicates that the airline will require approximately sixty million dollars ($74,625,000) to purchase all fuel utilized during the first forty-eight (48) months of operation on a hedged basis.

The ESOP will begin purchasing stock from the investor entity at the end of the forty-eighth (48th) month. The employee stock ownership plan must acquire enough equity so that it owns a minimum of thirty percent (30%) of the commercial entity at the conclusion of the forty-eighth (48th) month (TIMEL) in order for the sellers to capture the IRS Section 1042 exemption. The employee stock ownership plan will exercise its binding call purchasing all shares released from the commodity trust to and earned by the investor entity (six hundred twenty-five thousand eight hundred (625,000) shares) as well as shares from all other shareholders (one million eight hundred and seventy five thousand (1,875,000) shares) on a prorata and pari passu (at an equal 5 rate or pace) basis. Following this transaction, the employee stock ownership plan will hold thirty percent (30%) (three million (3,000,000) shares) of the total outstanding equity of the airline.

Thereafter, the ESOP plan will annually exercise its binding call on and purchase ten percent (10%) of the outstanding equity of the airline prorata and pari passu from the investor entity and all other shareholders.

The commodity trust is formed with two million five hundred thousand (2,500,000) shares of equity stock in and from the airline and seventy four million six hundred and twenty five thousand dollars ($74,625,000) from the investor entity. The commodity trust agrees, on behalf of the commercial entity, to fund half of all fuel required from the fuel suppliers) and purchase equity for fifty percent (50%) of said fuel costs for the eleven (11) year life of the mechanism. The investor entity agrees to sell all earned and released airline equity stock to the employee stock ownership plan, pursuant to binding calls on such stock by the employee stock ownership plan, and to replenish the trust with sufficient funds to pay for fifty percent (50%) of the fuel costs for the subsequent incremental (TIME3) periods.

The commodity trust agrees to fund on behalf of the airline all fuel required for operations for the life of the mechanism of the invention. The airline agrees to remit fifty percent (50%) (COMPCT) of said fuel cost to the fuel purchasing account as its predetermined share of said fuel costs concurrently with each demand for fuel. The airline begins operations, establishes routes, and generates revenues. During the first year the airline does not anticipate an operating profit; however, from the second year on operating profits are anticipated. Each year, the airline contributes the maximum legally allowable pre-tax and post-tax profits as well as the maximum legally allowable percentage of payroll contributions to the employee stock ownership plan.

During each period (TIME1 and TIME3), the commodity trust will periodically release the earned stock it holds to the investor entity based upon the funds expenditure formula (VALU(n)) For example, if during the first year of operation, the commodity trust spends ten million dollars ($10,000,000) for fuel on behalf of the airline, then VALU(N) will be calculated as:

$$VALU(N) = (($10\ mil)/($74,625,000) * (13.4\%)) = 0.8375\%\ (83,750\ shares)$$

At the end of forty-eight (48) months (TIMEL) the employee stock ownership plan exercises its binding call utilizing the funds contributed and dividended by the airline and purchases all stock earned by and released to the investor entity from the commodity trust. The employee stock ownership plan also purchases equity prorata and pari passu from all other shareholders. Equity purchases from these other shareholders may be in cash or notes payable and are subordinated in all cases to purchases by the employee stock ownership plan from the investor entity.

The commodity trust continues to fund half of all fuel requirements for the airline, throughout the life of the mechanism operations, on this basis.

Funds remaining in the commodity trust in excess of the fuel cost requirements of the current incremental period post facto may be distributed to the investor entity, subject to the trust agreement.

At the end of the eleventh (11th) year, there will be no airline equity remaining in the commodity trust. Hence, the life of the commodity trust will be exhausted. At this point, the trust is dissolved, the anticipated airline ownership by the employee stock ownership plan is complete, and this application of the invention is terminated.

Optimally, the employee stock ownership plan acquires all ten million (10,000,000) shares of the airline stock within the eleven years at which time the airline is totally owned by the employee stock ownership plan (employees).

As illustrated below, New Air can overcome troublesome problems that plague older airlines by utilizing the present invention.

Providing a suitable institutional environment includes creating a commodity funding trust (in the case of an airline, a fuel trust) as an investment vehicle for institutional investors. This investment is completely insured against risk or loss and carries an investment grade rating. The commodity trust is structured to have equity shares.

Providing a suitable institutional environment also includes creating a fuel trust investor entity, which buys 25% of New Air's equity (shares) for enough funds to cover half the cost of a key commodity (in the case of New Air, fuel) on an ongoing basis over a predetermined number of payment periods and years.

Providing a suitable institutional environment further includes creating an ESOP to purchase the equity shares incrementally and over time, held by the commodity trust, over a parallel period, utilizing earnings contributed to the ESOP by the New Air, on a tax-advantaged basis, with superlative rates of return on equity as a floor, and no corporate debt.

The effect is the transfer of New Air ownership to an ESOP without debt, wage concessions or leverage, with the sale of equity on a performance-driven basis for enough to pay half the cost of jet fuel (currently between 12% and 16% of gross revenues for a scheduled carrier) over the entire life of the funding process.

One feature of the present invention—computerized accounting and modeling operations—indicate that the fuel trust investor entity(ies) is currently projected to earn at least a 10.39% IRR over an 11-year period, while purchasing equity, in trust, for amounts sufficient to cover half of all of New Air's fuel costs (conditioned only upon carefully tracked monthly P&L performance).

This fuel trust investment can be fully insured against risk or loss, with a 7% estimated IRR as a floor, net of premium and hedging costs. The insurability of this investment against loss will compel pension funds to invest, in total compliance with the prudent man rule, with an unparalleled investment grade single A (A), double A (AA) or triple A (AAA) fully insured rate of return as a floor.

Accordingly, by utilizing the financing method outlined above, carried out by the mechanism of the present invention, New Air will enjoy a total capital base of over $117,875,000 (not including $4,000,000 in founding shareholder equity), over five times the amount of start-up capital recommended by all experts. Thus, New Air will avoid one of the largest single threat facing a start-up airline (or any other company), that of under-capitalization.

The present invention carries out the data processing and communications underpinning a steady stream of non-taxable income for the airline through the incremental sale of the equity, through the initial purchase of equity (25% of the company) in trust, with the caveat that the proceeds of said purchases can only be used to buy half the airline's jet fuel, providing the airline meets or surpasses minimum targeted performance objectives on a carefully tracked monthly P&L basis. The fuel trust investor entity then sells its equity to the ESOP, incrementally, at a profit, over 11 years.

| ESOP Purchase Chart | | |
|---|---|---|
| Year | ESOP % Equity | Fuel Trust & New Air Stockholders % Equity |
| Start | 5 | 95 |
| 4 | 30 | 70 |
| 5 | 40 | 60 |
| 6 | 50 | 50 |
| 7 | 60 | 40 |
| 8 | 70 | 30 |
| 9 | 80 | 20 |
| 10 | 90 | 10 |
| 11 | 0 | 100 |

| Representative New Air Savings Over Particular Scheduled Operations | |
|---|---|
| Year One | $ 6,009,000 |
| Year Two | $ 7,085,000 |
| Year Three | $ 8,181,000 |
| Year Four | $ 9,571,000 |
| Year Five | $ 11,250,000 |
| Year Six | $ 13,500,000 |
| Year Seven | $ 16,201,000 |
| Year Eight | $ 19,441,000 |
| Year Nine | $ 23,329,000 |
| Year Ten | $ 27,995,000 |
| Year Eleven | $ 33,594,000 |
| TOTAL | $176,156,000 |
| (Based on 20% annual growth.) | |

Accordingly, the use of a fuel trust and the present invention greatly enhances profits by reducing fuel cost; therefore reducing the scheduled airline's break-even load factor and risk. The mechanism of the present invention also creates and implements automated and semi-automated data processing for ESOP ownership over an 11-year period in return for equity in the form of 25% of the New Air's stock, which is purchased in trust at the commencement of scheduled revenue service and paid for over 11 years pursuant to performance driven criteria, which aids in efficiently obtaining full insurance through an insurance carrier entity or entities carrying an investment grade rating (single A, double A, or triple A).

Computer operations in accordance with the present invention (see particularly the foregoing specimens) can lead to the following output specimens.

Specimen 8
PROJECTED BALANCE SHEET
20% GROWTH 50% FUEL PARTICIPATION

| In $ 000 | YEAR 1 | YEAR 2 | YEAR 3 | YEAR 4 | YEAR 5 | YEAR 6 | YEAR 7 | YEAR 8 | YEAR 9 | YEAR 10 | YEAR 11 |
|---|---|---|---|---|---|---|---|---|---|---|---|
| Assets | | | | | | | | | | | |
| Cash | 3,040 | 18,550 | 33,732 | 44,452 | 55,591 | 69,203 | 85,632 | 105,344 | 129,136 | 157,763 | 193,246 |
| Accounts Receivable | 2,951 | 4,575 | 5,524 | 6,692 | 8,110 | 9,926 | 12,149 | 14,869 | 18,199 | 22,275 | 27,264 |
| Stock Loans Receivable | 3,188 | 2,125 | 1,063 | 0 | 0 | 0 | 0 | 0 | 0 | 0 | 0 |

-continued

Specimen 8
PROJECTED BALANCE SHEET
20% GROWTH 50% FUEL PARTICIPATION

| In $ 000 | YEAR 1 | YEAR 2 | YEAR 3 | YEAR 4 | YEAR 5 | YEAR 6 | YEAR 7 | YEAR 8 | YEAR 9 | YEAR 10 | YEAR 11 |
|---|---|---|---|---|---|---|---|---|---|---|---|
| Deposits & Other Assets | 3,000 | 3,000 | 3,000 | 3,000 | 3,000 | 3,000 | 3,000 | 3,000 | 3,000 | 3,000 | 3,000 |
| Fixed Assets | 2,000 | 2,000 | 2,000 | 2,000 | 2,000 | 2,000 | 2,000 | 2,000 | 2,000 | 2,000 | 2,000 |
| Depreciation & Amortization | (286) | (776) | (1,125) | (1,375) | (1,554) | (1,732) | (1,911) | (2,000) | (2,000) | (2,000) | (2,000) |
| Total Assets | 13,893 | 29,475 | 44,193 | 54,768 | 67,147 | 82,397 | 100,870 | 123,213 | 150,335 | 183,038 | 223,510 |
| Liabilities & Equity | | | | | | | | | | | |
| Accounts Payable | 3,184 | 4,183 | 4,885 | 5,829 | 6,877 | 8,330 | 10,047 | 12,083 | 14,635 | 17,655 | 21,307 |
| Loans Payable | 9,000 | 8,000 | 7,000 | 6,000 | 5,000 | 4,000 | 3,000 | 2,000 | 1,000 | 0 | 0 |
| Capital | 15,186 | 23,118 | 32,308 | 42,939 | 55,270 | 70,067 | 87,823 | 109,131 | 134,700 | 165,383 | 202,202 |
| Retained Earnings | (13,477) | (5,826) | 0 | 0 | 0 | 0 | 0 | 0 | 0 | 0 | 0 |
| Total Liabilities & Equity | 13,893 | 29,475 | 44,193 | 54,768 | 67,147 | 82,397 | 100,870 | 123,213 | 150,335 | 183,038 | 223,510 |

Specimen 9
PROJECTED ESOP INCOME & CASH FLOW STATEMENT
15% GROWTH 50% FUEL PARTICIPATION

| In $ 000 | YR 1 | YR 2 | YR 3 | YR 4 | YR 5 | YR 6 | YR 7 | YR 8 | YR 9 | YR 10 | YR 11 | TOTAL |
|---|---|---|---|---|---|---|---|---|---|---|---|---|
| Beginning Cash Balance | 0 | 3,181 | 7,123 | 12,091 | 0 | 0 | 0 | 0 | 0 | 0 | 0 | 0 |
| Sources of Funds | | | | | | | | | | | | |
| Corporate Payroll Contributions | 3,254 | 3,833 | 4,451 | 5,095 | 5,848 | 6,927 | 8,205 | 9,719 | 11,512 | 13,636 | 16,152 | 88,633 |
| Interest Reimbursement | 404 | 303 | 202 | 101 | 3,008 | 4,148 | 5,511 | 7,146 | 9,116 | 11,489 | 14,310 | 55,737 |
| Stockholder Stock Loans | 0 | 0 | 0 | 50,126 | 24,023 | 30,128 | 37,686 | 47,021 | 58,451 | 71,757 | 86,155 | 405,347 |
| Pre-Tax Dividend Income | 1,063 | 1,063 | 1,063 | 1,063 | 5,013 | 7,415 | 10,428 | 14,196 | 18,898 | 24,743 | 31,919 | 116,863 |
| After Tax Dividend Income | 0 | 0 | 183 | 9,192 | 8,114 | 9,565 | 11,616 | 14,416 | 18,017 | 21,525 | 23,190 | 115,816 |
| Interest Income @ 6% | 0 | 191 | 427 | 725 | 0 | 0 | 0 | 0 | 0 | 0 | 0 | 1,344 |
| Total Sources of Funds | 4,721 | 5,390 | 6,326 | 66,302 | 46,005 | 58,183 | 73,445 | 92,499 | 115,994 | 143,150 | 171,726 | 783,739 |
| Uses of Funds | | | | | | | | | | | | |
| Stock Purchases | 0 | 0 | 0 | 77,125 | 37,808 | 46,398 | 57,232 | 70,819 | 87,567 | 106,415 | 124,888 | 608,252 |
| Administration @ 2% | 73 | 83 | 93 | 104 | 177 | 222 | 274 | 337 | 413 | 503 | 609 | 2,887 |
| Initial Stock Purchase | 1,063 | 1,063 | 1,063 | 1,063 | | | | | | | | 4,250 |
| Interest On Initial Stock Purchase | 404 | 303 | 202 | 101 | | | | | | | | 1,009 |
| Loan Repayment Over 10 Yrs Stockholder Stock Loans | | | | | 5,013 | 7,415 | 10,428 | 14,196 | 18,898 | 24,743 | 31,919 | 112,613 |
| Interest Expense @ 6% Stockholder Stock Loans | | | | | 3,008 | 4,148 | 5,511 | 7,146 | 9,116 | 11,489 | 14,310 | 54,728 |
| Total Uses of Funds | 1,539 | 1,448 | 1,357 | 78,392 | 46,005 | 58,183 | 73,445 | 92,499 | 115,994 | 143,150 | 171,726 | 783,739 |
| Ending Cash Balance | 3,181 | 7,123 | 12,09 | 0 | 0 | 0 | 0 | 0 | 0 | 0 | 0 | 0 |

Specimen 11
PROJECTED FUEL SAVINGS
20% GROWTH 50% FUEL PARTICIPATION

| In $ 000 | YEAR 1 | YEAR 2 | YEAR 3 | YEAR 4 | YEAR 5 | YEAR 6 |
|---|---|---|---|---|---|---|
| Gallons (000) | | | | | | |
| Boeing 737 | | 20,601 | 23,871 | 27,612 | 32,028 | 38,434 |
| Total | 15,419 | 20,601 | 23,871 | 27,612 | 32,028 | 38,434 |
| Price Per Gallon | $0.7700 | $0.7700 | $0.7700 | $0.7700 | $0.7700 | $0.7700 |
| Handling Cost | $0.0300 | $0.0300 | $0.0300 | $0.0300 | $0.0300 | $0.0300 |
| Total | $0.8000 | $0.8000 | $0.8000 | $0.8000 | $0.8000 | $0.8000 |
| Fuel Purchases | 12,335 | 16,481 | 19,097 | 22,090 | 25,622 | 30,747 |

-continued

Specimen 11
PROJECTED FUEL SAVINGS
20% GROWTH 50% FUEL PARTICIPATION

|  |  |  |  |  |  |  |
|---|---|---|---|---|---|---|
| Fuel by Component Fuel Cost | 11,873 | 15,863 | 18,381 | 21,261 | 24,662 | 29,594 |
| Handling Cost | 463 | 618 | 716 | 828 | 961 | 1,153 |
| Total | 12,335 | 16,481 | 19,097 | 22,090 | 25,622 | 30,747 |
| Savings by Year | 5,936 | 7,931 | 9,190 | 10,631 | 12,331 | 14,797 |
| Cumulative savings | 5,936 | 13,868 | 23,058 | 33,689 | 46,020 | 60,817 |

| In $ 000 | YEAR 7 | YEAR 8 | YEAR 9 | YEAR 10 | YEAR 11 | TOTAL |
|---|---|---|---|---|---|---|
| Gallons (000) |  |  |  |  |  |  |
| Boeing 737 | 46,120 | 55,345 | 66,413 | 79,696 | 95,635 | 501,175 |
| Total | 46,120 | 55,345 | 66,413 | 79,696 | 95,635 | 501,175 |
| Price Per Gallon | $0.7700 | $0.7700 | $0.7700 | $0.7700 | $0.7700 |  |
| Handling Cost | $0.0300 | $0.0300 | $0.0300 | $0.0300 | $0.0300 |  |
| Total | $0.8000 | $0.8000 | $0.8000 | $0.8000 | $0.8000 |  |
| Fuel Purchases | 36,896 | 44,276 | 53,131 | 63,757 | 76,508 | 400,940 |
| Fuel by Component Fuel Cost | 35,513 | 42,615 | 51,138 | 61,366 | 73,639 | 385,905 |
| Handling Cost | 1,384 | 1,660 | 1,992 | 2,391 | 2,869 | 15,035 |
| Total | 36,896 | 44,276 | 53,131 | 63,757 | 76,508 | 400,940 |
| Savings by Year | 17,756 | 21,308 | 25,569 | 30,683 | 36,820 | 192,952 |
| Cumulative savings | 78,573 | 99,881 | 125,450 | 156,133 | 192,952 |  |

Specimen 12
PROJECTED ESOP INCOME & CASH FLOW STATEMENT
20% GROWTH 50% FUEL PARTICIPATION

| In $ 000 | YEAR 1 | YEAR 2 | YEAR 3 | YEAR 4 | YEAR 5 | YEAR 6 | YEAR 7 | YEAR 8 | YEAR 9 | YEAR 10 | YEAR 11 | TOTAL |
|---|---|---|---|---|---|---|---|---|---|---|---|---|
| Beginning Cash Balance | 0 | 3,181 | 7,123 | 12,494 | 0 | 0 | 0 | 0 | 0 | 0 | 0 | 0 |
| Sources of Funds |  |  |  |  |  |  |  |  |  |  |  |  |
| Corporate Payroll Contributions | 3,254 | 3,833 | 4,644 | 5,548 | 6,645 | 8,213 | 10,151 | 12,546 | 15,507 | 19,167 | 23,691 | 113,199 |
| Interest Reimbursement | 404 | 303 | 202 | 101 | 3,210 | 4,526 | 6,161 | 8,211 | 10,797 | 13,996 | 17,987 | 65,897 |
| Stockholder Stock Loans | 0 | 0 | 0 | 53,493 | 27,293 | 35,322 | 45,773 | 59,297 | 75,437 | 96,170 | 120,277 | 513,062 |
| Pre-Tax Dividend Income | 1,063 | 1,063 | 1,063 | 1,063 | 5,349 | 8,079 | 11,611 | 16,188 | 22,118 | 29,662 | 39,279 | 136,535 |
| After Tax Dividend Income | 0 | 0 | 396 | 9,504 | 10,127 | 12,507 | 16,184 | 21,497 | 26,802 | 34,534 | 41,373 | 172,924 |
| Interest Income at @ 6% | 0 | 191 | 427 | 750 | 0 | 0 | 0 | 0 | 0 | 0 | 0 | 1,368 |
| Total Sources of Funds | 4,721 | 5,390 | 6,732 | 70,458 | 52,623 | 68,647 | 89,880 | 117,739 | 150,661 | 193,529 | 242,606 | 1,002,984 |
| Uses of Funds |  |  |  |  |  |  |  |  |  |  |  |  |
| Stock Purchases | 0 | 0 | 0 | 81,675 | 43,867 | 55,787 | 71,782 | 92,925 | 117,220 | 149,208 | 184,507 | 796,971 |
| Administration @ 2% | 73 | 83 | 97 | 113 | 197 | 255 | 326 | 415 | 526 | 663 | 834 | 3,582 |
| Initial Stock Purchase | 1,063 | 1,063 | 1,063 | 1,063 |  |  |  |  |  |  |  | 4,250 |
| Interest On Initial Stock Purchase | 404 | 303 | 202 | 101 |  |  |  |  |  |  |  | 1,009 |
| Loan Repayment Over 10 Years |  |  |  |  |  |  |  |  |  |  |  |  |
| Stockholder Stock Loans Interest Expense @ 6% |  |  |  | 5,349 | 8,079 | 11,611 | 16,188 | 22,118 | 29,662 | 39,279 |  | 132,285 |

Specimen 12
PROJECTED ESOP INCOME & CASH FLOW STATEMENT
20% GROWTH 50% FUEL PARTICIPATION

| In $ 000 | YEAR 1 | YEAR 2 | YEAR 3 | YEAR 4 | YEAR 5 | YEAR 6 | YEAR 7 | YEAR 8 | YEAR 9 | YEAR 10 | YEAR 11 | TOTAL |
|---|---|---|---|---|---|---|---|---|---|---|---|---|
| Stockholder Stock Loans | | | | | 3,210 | 4,526 | 6,161 | 8,211 | 10,797 | 13,996 | 17,987 | 64,887 |
| Total Uses of Funds | 1,539 | 1,448 | 1,361 | 82,951 | 52,623 | 68,647 | 89,880 | 117,739 | 150,661 | 193,529 | 242,606 | 1,002,984 |
| Ending Cash Balance | 3,181 | 7,123 | 12,494 | 0 | 0 | 0 | 0 | 0 | 0 | 0 | 0 | 0 |

Specimen 13
PROJECTED ESOP INCOME & CASH FLOW STATEMENT
20% GROWTH 50% FUEL PARTICIPATION

| In $ 000 | YEAR 1 | YEAR 2 | YEAR 3 | YEAR 4 | YEAR 5 | YEAR 6 | YEAR 7 | YEAR 8 | YEAR 9 | YEAR 10 | YEAR 11 | TOTAL |
|---|---|---|---|---|---|---|---|---|---|---|---|---|
| Beginning Cash Balance | 0 | 3,181 | 7,123 | 12,494 | 0 | 0 | 0 | 0 | 0 | 0 | 0 | 0 |
| Sources of Funds | | | | | | | | | | | | |
| Corporate Payroll Contributions | 3,254 | 3,833 | 4,644 | 5,548 | 6,645 | 8,213 | 10,151 | 12,546 | 15,507 | 19,167 | 23,691 | 113,199 |
| Interest Reimbursement | 404 | 303 | 202 | 101 | 3,210 | 4,526 | 6,161 | 8,211 | 10,797 | 13,996 | 17,987 | 65,897 |
| Stockholder Stock Loans | 0 | 0 | 0 | 53,493 | 27,293 | 35,322 | 45,773 | 59,297 | 75,437 | 96,170 | 120,277 | 513,062 |
| Pre-Tax Dividend Income | 1,063 | 1,063 | 1,063 | 1,063 | 5,349 | 8,079 | 11,611 | 16,188 | 22,118 | 29,662 | 39,279 | 136,535 |
| After Tax Dividend Income | 0 | 0 | 396 | 9,504 | 10,127 | 12,507 | 16,184 | 21,497 | 26,802 | 34,534 | 41,373 | 172,924 |
| Interest Income @ 6% | 0 | 191 | 427 | 750 | 0 | 0 | 0 | 0 | 0 | 0 | 0 | 1,368 |
| Total Sources of Funds | 4,721 | 5,390 | 6,732 | 70,458 | 52,623 | 68,647 | 89,880 | 117,739 | 150,661 | 193,529 | 242,606 | 1,002,984 |
| Uses of Funds | | | | | | | | | | | | |
| Stock Purchases | 0 | 0 | 0 | 81,675 | 43,867 | 55,787 | 71,782 | 92,925 | 117,220 | 149,208 | 184,507 | 796,971 |
| Administration @ 2% | 73 | 83 | 97 | 113 | 197 | 255 | 326 | 415 | 526 | 663 | 834 | 3,582 |
| Initial Stock Purchase | 1,063 | 1,063 | 1,063 | 1,063 | | | | | | | | 4,250 |
| Interest On Initial Stock Purchase | 404 | 303 | 202 | 101 | | | | | | | | 1,009 |
| Loan Repayment Over 10 Years Stockholder Stock Loans | | | | | 5,349 | 8,079 | 11,611 | 16,188 | 22,118 | 29,662 | 39,279 | 132,285 |
| Interest Expense @ 6% Stockholder Stock Loans | | | | | 3,210 | 4,526 | 6,161 | 8,211 | 10,797 | 13,996 | 17,987 | 64,887 |
| Total Uses of Funds | 1,539 | 1,448 | 1,361 | 82,951 | 52,623 | 68,647 | 89,880 | 117,739 | 150,661 | 193,529 | 242,606 | 1,002,984 |
| Ending Cash Balance | 3,181 | 7,123 | 12,494 | 0 | 0 | 0 | 0 | 0 | 0 | 0 | 0 | 0 |

Specimen 14
ESOP PURCHASE SCHEDULE 15% GROWTH 50% FUEL PARTICIPATION

| | YEAR 4 | | | YEAR 5 | | | YEAR 6 | | |
|---|---|---|---|---|---|---|---|---|---|
| In $ 000 | Beginning Ownership | Value | 25% Purchases | Beginning Ownership | Equity Value | 10% Purchases | Beginning Ownership | Equity Value | 10% Purchases |
| Fuel Trust Investors | 25.00% | 77,125 | 20,296 | 18.42% | 69,646 | 9,949 | 15.79% | 73,260 | 12,210 |
| Leasing Company | 10.00% | 30,850 | 8,118 | 7.37% | 27,859 | 3,980 | 6.32% | 29,304 | 4,884 |
| Airline Investors | 55.00% | 169,675 | 44,651 | 40.53% | 153,222 | 21,889 | 34.74% | 161,172 | 26,862 |
| ESOP Education | 5.00% | 15,425 | 4,059 | 3.68% | 13,929 | 1,990 | 3.16% | 14,652 | 2,442 |
| ESOP | 5.00% | 15,425 | 0 | 30.00% | 113,424 | 0 | 40.00% | 185,592 | 0 |
| Total | 100% | 308,500 | 77,125 | 100% | 378,080 | 37,808 | 100% | 463,980 | 46,398 |

| | YEAR 7 | | | YEAR 8 | | | YEAR 9 | | |
|---|---|---|---|---|---|---|---|---|---|
| | Beginning Ownership | Equity Value | 10% | Beginning Ownership | Equity Value | 10% Purchases | Beginning Ownership | Equity Value | 10% Purchases |
| Fuel Trust Investors | 13.16% | 75,305 | 15,061 | 10.53% | 74,546 | 18,637 | 7.89% | 69,132 | 23,044 |
| Leasing Company | 5.26% | 30,122 | 6,024 | 4.21% | 29,819 | 7,455 | 3.16% | 27,653 | 9,218 |
| Airline investors | 28.95% | 165,672 | 33,134 | 23.16% | 164,002 | 41,000 | 17.37% | 152,090 | 50,697 |
| ESOP Education | 2.63% | 15,061 | 3,012 | 2.11% | 14,909 | 3,727 | 1.58% | 13,826 | 4,609 |
| ESOP | 50.00% | 286,160 | 0 | 60.00% | 424,914 | 0 | 70.00% | 612,969 | 0 |
| Total | 100% | 572,320 | 57,232 | 100% | 708,190 | 70,819 | 100% | 875,670 | 87,567 |

Specimen 14
ESOP PURCHASE SCHEDULE 15% GROWTH 50% FUEL PARTICIPATION

| | YEAR 10 | | | YEAR 11 | | | SUMMARY | | |
|---|---|---|---|---|---|---|---|---|---|
| | Beginning Ownership | Equity Value | 10% Purchases | Beginning Ownership | Equity Value | 10% Purchases | Ending Ownership | Equity Value | Total Purchases |
| Fuel Trust Investors | 5.28% | 56,008 | 28,004 | 2.63% | 32,865 | 32,865 | 0.00% | 0 | 160,066 |
| Leasing Company | 2.11% | 22,403 | 11,202 | 1.05% | 13,146 | 13,146 | 0.00% | 0 | 64,027 |
| Airline investors | 11.58% | 123,217 | 61,609 | 5.79% | 72,304 | 72,304 | 0.00% | 0 | 352,146 |
| ESOP Education | 1.05% | 11,202 | 5,601 | 0.53% | 6,573 | 6,573 | 0.00% | 0 | 32,013 |
| ESOP | 80.00% | 851,320 | 0 | 90.00% | 1,123,992 | 0 | 100.00% | 1,248,880 | 0 |
| Total | 100% | 1,064,150 | 106,415 | 100% | 1,248,880 | 124,888 | 100% | 1,248,880 | 608,252 |

Specimen 15
FUEL TRUST PARTICIPATION FOR STOCK
20% GROWTH 50% FUEL PARTICIPATION

| In $ 000 | YEAR 4 | YEAR 5 | YEAR 6 | YEAR 7 | YEAR 8 | YEAR 9 | YEAR 10 | YEAR 11 | TOTAL |
|---|---|---|---|---|---|---|---|---|---|
| ESOP Purchases @ 25% | 21,493 | 11,544 | 14,681 | 18,890 | 24,454 | 30,847 | 39,265 | 48,554 | 209,729 |
| Fuel for Stock @ 50% | 33,689 | 12,331 | 14,797 | 17,756 | 21,308 | 25,569 | 30,683 | 36,820 | 192,952 |
| Profit on Stock | −12,195 | −787 | −116 | 1,134 | 3,146 | 5,278 | 8,582 | 11,735 | 16,777 |

Specimen 16
FUEL TRUST RETURN ON INVESTMENT
20% GROWTH 50% FUEL PARTICIPATION

| In $ 000 | Stock Share | Beginning Balance | Less: Fuel Cost | Add: Int @ 6.00% | Add: Stock Purchases | Ending Balance | |
|---|---|---|---|---|---|---|---|
| Beginning of Trust | 25% | 33,689 | | | | 33,689 | −33,689 |
| Year 1 | | 33,689 | 5,936 | 1,843 | | 29,596 | 1843.242369 |
| Year 2 | | 29,596 | 7,931 | 1,538 | | 23,202 | 1537.804064 |
| Year 3 | | 23,202 | 9,190 | 1,116 | | 15,128 | 1116.415289 |
| Year 4 | | 15,128 | 10,631 | 589 | 21,493 | 26,580 | 22082.18852 |
| Year 5 | | 26,580 | 12,331 | 1,225 | 11,544 | 27,018 | 438 |
| Year 6 | | 27,018 | 14,797 | 1,177 | 14,681 | 28,079 | 1,061 |
| Year 7 | | 28,079 | 17,756 | 1,152 | 18,890 | 30,364 | 2,286 |
| Year 8 | | 30,364 | 21,308 | 1,183 | 24,454 | 34,693 | 4,329 |
| Year 9 | | 34,693 | 25,569 | 1,315 | 30,847 | 41,286 | 6,593 |
| Year 10 | | 41,286 | 30,683 | 1,557 | 39,265 | 51,425 | 10,139 |
| Year 11 | | 51,425 | 36,820 | 1,981 | 48,554 | 65,141 | 13,716 |
| Net to Trust | | 33,689 | 192,952 | 14,675 | 209,729 | 65,141 | 65,141 |
| Internal Rate of Return | | | | | | 10.39% | 10.39% |

Specimen 17
EQUITY INVESTOR'S RETURN ON INVESTMENT
20% GROWTH 50% FUEL PARTICIPATION

| In $ 000 | Stock Share | Beginning Balance | Stock Purchases | Ending Balance | |
|---|---|---|---|---|---|
| Beginning Balance | 5% | 5,000 | | | −5,000 |
| Year 1 | | 0 | | | 0 |
| Year 2 | | 0 | | | 0 |
| Year 3 | | 0 | | | 0 |
| Year 4 | | 0 | 4,299 | 4,299 | 4298.684211 |
| Year 5 | | 4,299 | 2,309 | 6,607 | 2,309 |
| Year 6 | | 6,607 | 2,936 | 9,544 | 2,936 |
| Year 7 | | 9,544 | 3,778 | 13,322 | 3,778 |
| Year 8 | | 13,322 | 4,891 | 18,212 | 4,891 |
| Year 9 | | 18,212 | 6,169 | 24,382 | 6,169 |
| Year 10 | | 24,382 | 7,853 | 32,235 | 7,853 |
| Year 11 | | 32,235 | 9,711 | 41,946 | 9,711 |

Specimen 17
EQUITY INVESTOR'S RETURN ON INVESTMENT
20% GROWTH 50% FUEL PARTICIPATION

| In $ 000 | Stock Share | Beginning Balance | Stock Purchases | | Ending Balance | |
|---|---|---|---|---|---|---|
| Net to Investor | | 5,000 | 0 | 0 | 41,946 | 46,946 | 41,946 |
| Internal Rate of Return | | | | | 32.28% | 32.28% |

Specimen 18
PROJECTED BALANCE SHEET
15% GROWTH 50% FUEL PARTICIPATION

| In $ 000 | YEAR 1 | YEAR 2 | YEAR 3 | YEAR 4 | YEAR 5 | YEAR 6 | YEAR 7 | YEAR 8 | YEAR 9 | YEAR 10 | YEAR 11 |
|---|---|---|---|---|---|---|---|---|---|---|---|
| Assets | | | | | | | | | | | |
| Cash | 3,040 | 18,550 | 33,370 | 43,237 | 53,045 | 64,439 | 77,626 | 92,781 | 110,210 | 130,416 | 154,800 |
| Accounts Receivable | 2,951 | 4,575 | 5,294 | 6,146 | 7,138 | 8,372 | 9,820 | 11,518 | 13,511 | 15,847 | 18,588 |
| Stock Loans Receivable | 3,188 | 2,125 | 1,063 | 0 | 0 | 0 | 0 | 0 | 0 | 0 | 0 |
| Deposits & Other Assets | 3,000 | 3,000 | 3,000 | 3,000 | 3,000 | 3,000 | 3,000 | 3,000 | 3,000 | 3,000 | 3,000 |
| Fixed Assets | 2,000 | 2,000 | 2,000 | 2,000 | 2,000 | 2,000 | 2,000 | 2,000 | 2,000 | 2,000 | 2,000 |
| Depreciation & Amortization | (286) | (776) | (1,125) | (1,375) | (1,554) | (1,732) | (1,911) | (2,000) | (2,000) | (2,000) | (2,000) |
| Total Assets | 13,893 | 29,475 | 43,601 | 53,007 | 63,629 | 76,079 | 90,535 | 107,300 | 126,720 | 149,263 | 176,388 |
| Liabilities & Equity | | | | | | | | | | | |
| Accounts Payable | 3,184 | 4,183 | 4,676 | 5,319 | 6,088 | 7,057 | 8,161 | 9,419 | 10,858 | 12,572 | 14,593 |
| Loans Payable | 9,000 | 8,000 | 7,000 | 6,000 | 5,000 | 4,000 | 3,000 | 2,000 | 1,000 | 0 | 0 |
| Capital | 15,186 | 23,118 | 31,925 | 41,688 | 52,541 | 65,022 | 79,375 | 95,881 | 114,862 | 136,691 | 161,794 |
| Retained Earnings | (13,477) | (5,826) | 0 | 0 | 0 | 0 | 0 | 0 | 0 | 0 | 0 |
| Total Liabilities & Equity | 13,893 | 29,475 | 43,601 | 53,007 | 63,629 | 76,079 | 90,535 | 107,300 | 126,720 | 149,263 | 176,388 |

Specimen 19
PROJECTED FUEL SAVINGS
15% GROWTH 50% FUEL PARTICIPATION

| In $ 000 | YEAR 1 | YEAR 2 | YEAR 3 | YEAR 4 | YEAR 5 | YEAR 6 |
|---|---|---|---|---|---|---|
| Gallons (000) | | | | | | |
| Boeing 737 | 15,419 | 20,601 | 22,877 | 25,359 | 28,189 | 32,417 |
| Total | 15,419 | 20,601 | 22,877 | 25,359 | 28,189 | 32,417 |
| Price Per Gallon | $0.7700 | $0.7700 | $0.7700 | $0.7700 | $0.7700 | $0.7700 |
| Handling Cost | $0.0300 | $0.0300 | $0.0300 | $0.0300 | $0.0300 | $0.0300 |
| Total | $0.8000 | $0.8000 | $0.8000 | $0.8000 | $0.8000 | $0.8000 |
| Fuel Purchases | 12,335 | 16,481 | 18,301 | 20,287 | 22,551 | 25,934 |
| Fuel by Component | | | | | | |
| Fuel Cost | 11,873 | 15,863 | 17,615 | 19,526 | 21,706 | 24,961 |
| Handling Cost | 463 | 618 | 686 | 761 | 846 | 973 |
| Total | 12,335 | 16,481 | 18,301 | 20,287 | 22,551 | 25,934 |
| Savings by Year | 5,936 | 7,931 | 8,807 | 9,763 | 10,853 | 12,481 |
| Cumulative Savings | 5,936 | 13,868 | 22,675 | 32,438 | 43,291 | 55,772 |

Specimen 19
PROJECTED FUEL SAVINGS
15% GROWTH 50% FUEL PARTICIPATION

| In $ 000 | YEAR 7 | YEAR 8 | YEAR 9 | YEAR 10 | YEAR 11 | TOTAL |
|---|---|---|---|---|---|---|
| Gallons (000) | | | | | | |
| Boeing 737 | 37,280 | 42,872 | 49,303 | 56,698 | 65,203 | 396,219 |
| Total | 37,280 | 42,872 | 49,303 | 56,698 | 65,203 | 396,219 |
| Price Per Gallon | $0.7700 | $0.7700 | $0.7700 | $0.7700 | $0.7700 | |
| Handling Cost | $0.0300 | $0.0300 | $0.0300 | $0.0300 | $0.0300 | |
| Total | $0.8000 | $0.8000 | $0.8000 | $0.8000 | $0.8000 | |
| Fuel Purchases | 29,824 | 34,298 | 39,442 | 45,359 | 52,162 | 316,975 |
| Fuel by Component | | | | | | |
| Fuel Cost | 28,706 | 33,011 | 37,963 | 43,658 | 50,206 | 305,088 |
| Handling Cost | 1,118 | 1,286 | 1,479 | 1,701 | 1,956 | 11,887 |
| Total | 29,824 | 34,298 | 39,442 | 45,359 | 52,162 | 316,975 |
| Savings by Year | 14,353 | 16,506 | 18,982 | 21,829 | 25,103 | 152,544 |
| Cumulative Savings | 70,125 | 86,631 | 105,612 | 127,441 | 152,544 | |

Specimen 20
PROJECTED ESOP INCOME & CASH FLOW STATEMENT
15% GROWTH 50% FUEL PARTICIPATION

| In $ 000 | YEAR 1 | YEAR 2 | YEAR 3 | YEAR 4 | YEAR 5 | YEAR 6 | YEAR 7 | YEAR 8 | YEAR 9 | YEAR 10 | YEAR 11 | TOTAL |
|---|---|---|---|---|---|---|---|---|---|---|---|---|
| Beginning Cash Balance | 0 | 3,181 | 7,123 | 12,091 | 0 | 0 | 0 | 0 | 0 | 0 | 0 | 0 |
| Sources of Funds | | | | | | | | | | | | |
| Corporate Payroll Contributions | 3,254 | 3,833 | 4,451 | 5,095 | 5,848 | 6,927 | 8,205 | 9,719 | 11,512 | 13,636 | 16,152 | 88,633 |
| Interest Reimbursement | 404 | 303 | 202 | 101 | 3,008 | 4,148 | 5,511 | 7,146 | 9,116 | 11,489 | 14,310 | 55,737 |
| Stockholder Stock Loans | 0 | 0 | 0 | 50,126 | 24,023 | 30,128 | 37,686 | 47,021 | 58,451 | 71,757 | 86,155 | 405,347 |
| Pre - Tax Dividend Income | 1,063 | 1,063 | 1,063 | 1,063 | 5,013 | 7,415 | 10,428 | 14,196 | 18,898 | 24,743 | 31,919 | 116,863 |
| After Tax Dividend Income | 0 | 0 | 183 | 9,192 | 8,114 | 9,565 | 11,616 | 14,416 | 18,017 | 21,525 | 23,190 | 115,816 |
| Interest Income @ 6% | 0 | 191 | 427 | 725 | 0 | 0 | 0 | 0 | 0 | 0 | 0 | 1,344 |
| Total Sources of Funds | 4,721 | 5,390 | 6,326 | 66,302 | 46,005 | 58,183 | 73,445 | 92,499 | 115,994 | 143,150 | 171,726 | 783,739 |
| Uses of Funds | | | | | | | | | | | | |
| Stock Purchases | 0 | 0 | 0 | 77,125 | 37,808 | 46,398 | 57,232 | 70,819 | 87,567 | 106,415 | 124,888 | 608,252 |
| Administration @ 2% | 73 | 83 | 93 | 104 | 177 | 222 | 274 | 337 | 413 | 503 | 609 | 2,887 |
| Total Stock Purchase | 1,063 | 1,063 | 1,063 | 1,063 | | | | | | | | 4,250 |
| Interest On Initial Stock Purchase | 404 | 303 | 202 | 101 | | | | | | | | 1,009 |
| Loan Repayment Over 10 Years | | | | | | | | | | | | |
| Stockholder Stock Loans | | | | | 5,013 | 7,415 | 10,428 | 14,196 | 18,898 | 24,743 | 31,919 | 112,613 |
| Interest Expense @ 6% | | | | | | | | | | | | |
| Stockholder Stock Loans | | | | | 3,008 | 4,148 | 5,511 | 7,146 | 9,116 | 11,489 | 14,310 | 54,728 |
| Total Uses of Funds | 1,539 | 1,448 | 1,357 | 78,392 | 46,005 | 58,183 | 73,445 | 92,499 | 115,994 | 143,150 | 171,726 | 783,739 |
| Ending Cash Balance | 3,181 | 7,123 | 12,091 | 0 | 0 | 0 | 0 | 0 | 0 | 0 | 0 | 0 |

Specimen 21
ESOP PURCHASE SCHEDULE 15% GROWTH 50% FUEL PARTICIPATION

| | YEAR 4 | | | YEAR 5 | | | YEAR 6 | | |
|---|---|---|---|---|---|---|---|---|---|
| In $000 | Beginning Ownership | Value | 25% Purchase | Beginning Ownership | Equity Value | 10% Purchases | Beginning Ownership | Equity Value | 10% Purchases |
| Fuel Trust Investors | 25.00% | 77,125 | 20,296 | 18.42% | 69,646 | 9,949 | 15.79% | 73,260 | 12,210 |
| Leasing Company | 10.00% | 30,850 | 8,118 | 7.37% | 27,859 | 3,980 | 6.32% | 29,304 | 4,884 |
| Airline Investors | 55.00% | 169,675 | 44,651 | 40.53% | 153,222 | 21,889 | 34.74% | 161,172 | 26,862 |
| ESOP Education | 5.00% | 15,425 | 4,059 | 3.68% | 13,929 | 1,990 | 3.16% | 14,652 | 2,442 |
| ESOP | 5.00% | 15,425 | 0 | 30.00% | 113,424 | 0 | 40.00% | 185,592 | 0 |
| Total | 100% | 308,500 | 77,125 | 100% | 378,080 | 37,808 | 100% | 463,980 | 48,386 |

-continued

Specimen 21
ESOP PURCHASE SCHEDULE 15% GROWTH 50% FUEL PARTICIPATION

|  | YEAR 7 | | | YEAR 8 | | | YEAR 9 | | |
|---|---|---|---|---|---|---|---|---|---|
|  | Beginning Ownership | Equity Value | 10% | Beginning Ownership | Equity Value | 10% Purchases | Beginning Ownership | Equity Value | 10% Purchases |
| Fuel Trust Investors | 13.16% | 75,305 | 15,061 | 10.53% | 74,546 | 18,637 | 7.89% | 89,132 | 23,044 |
| Leasing Company | 5.26% | 30,122 | 6,024 | 4.21% | 29,819 | 7,455 | 3.16% | 27,653 | 9,21e8 |
| Airline Investors | 28.95% | 165,672 | 33,134 | 23.16% | 184,002 | 41,000 | 17.37% | 152,090 | 50,697 |
| ESOP Education | 2.63% | 15,061 | 3,012 | 2.11% | 14,909 | 3,727 | 1.58% | 13,826 | 4,609 |
| ESOP | 50.00% | 286,160 | 0 | 60.00% | 424,914 | 0 | 70.00% | 612,969 | 0 |
| Total | 100% | 572,320 | 57,232 | 100% | 708,190 | 70,819 | 100% | 875,670 | 87,567 |

|  | YEAR 10 | | | YEAR 11 | | | SUMMARY | | |
|---|---|---|---|---|---|---|---|---|---|
|  | Beginning Ownership | Equity Value | 10% Purchases | Beginning Ownership | Equity Value | 10% Purchases | Ending Ownership | Equity Value | Total Purchases |
| Fuel Trust Investors | 5.28% | 56,008 | 28,004 | 2.63% | 32,865 | 32,865 | 0.00% | 0 | 160,066 |
| Leasing Company | 2.11% | 22,403 | 11,202 | 1.05% | 13,146 | 13,146 | 0.00% | 0 | 64,027 |
| Airline Investors | 11.58% | 123,217 | 61,609 | 5.79% | 72,304 | 72,304 | 0.00% | 0 | 352,146 |
| ESOP Education | 1.05% | 11,202 | 5,601 | 0.53% | 6,573 | 6,573 | 0.00% | 0 | 32,013 |
| ESOP | 80.00% | 851,320 | 0 | 90.00% | 1,123,992 | 0 | 100.00% | 1,248,880 | 0 |
| Total | 100% | 1,064,150 | 106,415 | 100% | 1,248,880 | 124,888 | 100% | 1,248,880 | 608,252 |

Specimen 22
FUEL TRUST PARTICIPATION FOR STOCK
15% GROWTH 50% FUEL PARTICIPATION

| In $ 000 | YEAR 4 | YEAR 5 | YEAR 6 | YEAR 7 | YEAR 8 | YEAR 9 | YEAR 10 | YEAR 11 | TOTAL |
|---|---|---|---|---|---|---|---|---|---|
| ESOP Purchases @ 25% | 20,296 | 9,949 | 12,210 | 15,061 | 18,637 | 23,044 | 28,004 | 32,865 | 160,066 |
| Fuel for Stock @ 50% | 32,438 | 10,853 | 12,481 | 14,353 | 16,506 | 18,982 | 21,829 | 25,103 | 152,544 |
| Profit on Stock | −12,142 | −903 | −271 | 708 | 2,131 | 4,062 | 6,175 | 7,762 | 7,522 |

Specimen 23
FUEL TRUST RETURN ON INVESTMENT
15% GROWTH 50% FUEL PARTICIPATION

| In $ 000 | Stock Share | Beginning Balance | Less: Fuel Cost | Add: Int @ 6.00% | Add: Stock Purchases | Ending Balance | |
|---|---|---|---|---|---|---|---|
| Beginning of Trust | 25% | 32,438 |  |  |  | 32,438 | −32,438 |
| Year 1 |  | 32,438 | 5,936 | 1,768 |  | 28,270 | 1768.220354 |
| Year 2 |  | 28,270 | 7,931 | 1,458 |  | 21,797 | 1458.280728 |
| Year 3 |  | 21,797 | 8,807 | 1,044 |  | 14,033 | 1043.608593 |
| Year 4 |  | 14,033 | 9,763 | 549 | 20,296 | 25,115 | 20845.15601 |
| Year 5 |  | 25,115 | 10,853 | 1,181 | 9,949 | 25,393 | 278 |
| Year 6 |  | 25,393 | 12,481 | 1,149 | 12,210 | 26,272 | 878 |
| Year 7 |  | 26,272 | 14,353 | 1,146 | 15,061 | 28,126 | 1,854 |
| Year 8 |  | 28,126 | 16,506 | 1,192 | 18,637 | 31,449 | 3,323 |
| Year 9 |  | 31,449 | 18,982 | 1,317 | 23,044 | 36,829 | 5,380 |
| Year 10 |  | 36,829 | 21,829 | 1,555 | 28,004 | 44,559 | 7,730 |
| Year 11 |  | 44,559 | 25,103 | 1,920 | 32,865 | 54,241 | 9,683 |
| Net to Trust |  | 32,438 | 152,544 | 14,281 | 160,066 | 54,241 | 54,241 |
| Internal Rate of Return |  |  |  |  |  | 8.35% | 8.35% |

Specimen 24
EQUITY INVESTOR'S RETURN ON INVESTMENT
15% GROWTH 50% FUEL PARTICIPATION

| In $ 000 | Stock Share | Beginning Balance | | | Stock Purchases | Ending Balance | |
|---|---|---|---|---|---|---|---|
| Beginning Balance | 5% | 5,000 | | | | | −5,000 |
| Year 1 | | 0 | | | | | 0 |
| Year 2 | | 0 | | | | | 0 |
| Year 3 | | 0 | | | | | 0 |
| Year 4 | | 0 | | | 4,059 | 4,059 | 4059.210526 |
| Year 5 | | 4,059 | | | 1,990 | 6,049 | 1,990 |
| Year 6 | | 6,049 | | | 2,442 | 8,491 | 2,442 |
| Year 7 | | 8,491 | | | 3,012 | 11,503 | 3,012 |
| Year 8 | | 11,503 | | | 3,727 | 15,231 | 3,727 |
| Year 9 | | 15,231 | | | 4,609 | 19,839 | 4,609 |
| Year 10 | | 19,839 | | | 5,601 | 25,440 | 5,601 |
| Year 11 | | 25,440 | | | 6,573 | 32,013 | 6,573 |
| Net to Trust | | 5,000 | 0 | 0 | 32,013 | 37,013 | 32,013 |
| Net to Investor | | | | | | 28.41% | 28.41% |

Specimen 25
PROJECTED BALANCE SHEET
10% GROWTH 50% FUEL PARTICIPATION

| In $ 000 | YEAR 1 | YEAR 2 | YEAR 3 | YEAR 4 | YEAR 5 | YEAR 6 | YEAR 7 | YEAR 8 | YEAR 9 | YEAR 10 | YEAR 11 |
|---|---|---|---|---|---|---|---|---|---|---|---|
| Assets | | | | | | | | | | | |
| Cash | 3,040 | 18,550 | 32,527 | 42,086 | 50,606 | 59,833 | 69,869 | 80,660 | 92,277 | 104,888 | 119,578 |
| Accounts Receivable | 2,951 | 4,575 | 5,063 | 5,623 | 6,246 | 6,869 | 7,557 | 8,319 | 9,162 | 10,095 | 11,129 |
| Stock Loans Receivable | 3,188 | 2,125 | 1,063 | 0 | 0 | 0 | 0 | 0 | 0 | 0 | 0 |
| Deposits & Other Assets | 3,000 | 3,000 | 3,000 | 3,000 | 3,000 | 3,000 | 3,000 | 3,000 | 3,000 | 3,000 | 3,000 |
| Fixed Assets | 2,000 | 2,000 | 2,000 | 2,000 | 2,000 | 2,000 | 2,000 | 2,000 | 2,000 | 2,000 | 2,000 |
| Depreciation & Amortization | (286) | (776) | (1,125) | (1,375) | (1,554) | (1,732) | (1,911) | (2,000) | (2,000) | (2,000) | (2,000) |
| Total Assets | 13,893 | 29,475 | 42,527 | 51,334 | 60,299 | 69,969 | 80,516 | 91,979 | 104,438 | 117,983 | 133,707 |
| Liabilities & Equity | | | | | | | | | | | |
| Accounts Payable | 3,184 | 4,183 | 4,499 | 4,859 | 5,326 | 5,756 | 6,257 | 6,799 | 7,387 | 8,026 | 8,721 |
| Loans Payable | 9,000 | 8,000 | 7,000 | 6,000 | 5,000 | 4,000 | 3,000 | 2,000 | 1,000 | 0 | 0 |
| Capital | 15,186 | 23,118 | 31,542 | 40,475 | 49,973 | 60,213 | 71,259 | 83,179 | 96,051 | 109,957 | 124,986 |
| Retained Earnings | (13,477) | (5,826) | (514) | 0 | 0 | 0 | 0 | 0 | 0 | 0 | 0 |
| Total Liabilities & Equity | 13,893 | 29,475 | 42,527 | 51,334 | 60,299 | 69,969 | 80,516 | 91,979 | 104,438 | 117,983 | 133,707 |

Specimen 26
PROJECTED INCOME & CASH FLOW STATEMENT
10% GROWTH 50% FUEL PARTIPATION

| In $ 000 | YEAR 1 | YEAR 2 | YEAR 3 | YEAR 4 | YEAR 5 | YEAR 6 | YEAR 7 | YEAR 8 | YEAR 9 | YEAR 10 | YEAR 11 | TOTAL |
|---|---|---|---|---|---|---|---|---|---|---|---|---|
| Revenue | | | | | | | | | | | | |
| Passenger | 67,951 | 105,355 | 116,593 | 129,477 | 143,842 | 158,183 | 174,041 | 191,587 | 211,008 | 232,513 | 256,337 | 1,786,887 |
| Cargo | 2,718 | 4,214 | 4,664 | 5,179 | 5,754 | 6,327 | 6,962 | 7,663 | 8,440 | 9,301 | 10,253 | 71,475 |
| Other | 162 | 240 | 264 | 291 | 320 | 345 | 372 | 401 | 433 | 468 | 506 | 3,802 |
| Total Revenue | 70,832 | 109,809 | 121,521 | 134,946 | 149,916 | 164,855 | 181,375 | 199,652 | 219,881 | 242,282 | 267,096 | 1,862,165 |
| Expenses | | | | | | | | | | | | |
| Payroll | 13,017 | 15,334 | 17,029 | 18,646 | 20,472 | 22,734 | 25,258 | 28,077 | 31,226 | 34,746 | 38,682 | 265,220 |
| Benefits & Taxes | 3,429 | 4,032 | 4,428 | 4,848 | 5,323 | 5,911 | 6,587 | 7,300 | 8,119 | 9,034 | 10,057 | 69,047 |
| Flight Operations | 3,467 | 4,238 | 3,760 | 4,037 | 4,349 | 4,688 | 5,057 | 5,458 | 5,893 | 6,367 | 6,881 | 54,196 |
| Fuel | 12,335 | 16,481 | 17,506 | 18,561 | 19,736 | 21,278 | 22,952 | 24,770 | 26,746 | 28,895 | 31,230 | 240,491 |
| Maintenance | 7,885 | 10,834 | 11,853 | 12,945 | 14,177 | 15,285 | 16,487 | 17,794 | 19,213 | 20,756 | 22,434 | 169,663 |
| Aircraft Rental | 10,920 | 14,040 | 14,820 | 14,820 | 16,380 | 17,160 | 18,720 | 20,280 | 21,840 | 23,400 | 24,960 | 197,340 |
| Inflight | 2,750 | 4,099 | 4,628 | 5,225 | 5,901 | 6,362 | 6,863 | 7,406 | 7,997 | 8,640 | 9,338 | 69,208 |
| Customer Service | 10,108 | 13,640 | 14,958 | 16,379 | 17,982 | 19,387 | 20,912 | 22,569 | 24,369 | 26,326 | 28,455 | 215,084 |
| Reservations | 709 | 1,050 | 1,187 | 1,364 | 1,518 | 1,636 | 1,765 | 1,905 | 2,057 | 2,222 | 2,402 | 17,816 |
| Marketing | 9,007 | 13,890 | 15,384 | 17,094 | 19,004 | 20,488 | 22,100 | 23,851 | 25,754 | 27,822 | 30,072 | 224,466 |
| Administration | 2,970 | 2,981 | 2,660 | 2,937 | 3,246 | 3,499 | 3,775 | 4,074 | 4,399 | 4,752 | 5,136 | 40,428 |
| Total Expenses | 76,597 | 100,619 | 108,212 | 116,857 | 128,066 | 138,428 | 150,457 | 163,484 | 177,614 | 192,960 | 209,647 | 1,562,962 |
| Operating Profit | (5,766) | 9,190 | 13,309 | 18,089 | 21,830 | 26,426 | 30,918 | 36,167 | 42,267 | 49,322 | 57,449 | 299,203 |
| Less: Expenses paid by others | | | | | | | | | | | | |
| Fuel Trust | 5,936 | 7,931 | 8,425 | 8,933 | 9,498 | 10,240 | 11,046 | 11,821 | 12,872 | 13,905 | 15,030 | 115,736 |
| State Quality Jobs Credit 5.0% | 651 | 767 | 851 | 932 | 1,024 | 1,137 | 1,263 | 1,404 | 1,561 | 1,737 | 349 | 11,327 |
| State Jobs Training Program | 191 | 238 | 245 | 253 | 261 | 274 | 287 | 302 | 317 | 333 | | 3,047 |
| B&I Loan Interest Expense @ 9% | 1,012 | 18,126 | 22,830 | 28,207 | 32,612 | 38,077 | 43,514 | 49,794 | 57,017 | 65,297 | 72,828 | 429,313 |
| Pre-Start Expenditures (Net) | (914) | (819) | (724) | (629) | (534) | (439) | (344) | (249) | (154) | (59) | | (4,869) |
| Depreciation/Amortization | (3,036) | | | | | | | | | | | (3,036) |
| ESOP Stock Loan Interest Income 6% | (286) | (490) | (350) | (250) | (179) | (178) | (179) | (89) | | | | (2,000) |
| Interest Income @ 6% | 404 | 303 | 202 | 101 | | | | | | | | 1,009 |
| Pre-Contribution Earnings | 0 | 91 | 556 | 954 | 1,221 | 1,258 | 1,295 | 1,334 | 1,374 | 1,416 | 1,458 | 10,958 |
| Fuel Trust Contribution | (2,820) | 17,211 | 22,514 | 28,383 | 33,120 | 38,717 | 44,286 | 50,789 | 58,237 | 66,654 | 74,266 | 431,376 |
| ESOP P/R Contribution 25.0% | (5,936) | (7,931) | (8,425) | (8,933) | (9,498) | (10,240) | (11,046) | (11,921) | (12,872) | (13,905) | (15,030) | (115,236) |
| ESOP Interest Deduction | (3,254) | (3,833) | (4,257) | (4,662) | (5,118) | (5,683) | (6,315) | (7,019) | (7,807) | (8,687) | (9,670) | (66,305) |
| ESOP Principal Deduction | (404) | (303) | (202) | (101) | (2,762) | (3,761) | (4,893) | (6,153) | (7,558) | (9,124) | (10,866) | (46,126) |
| Taxable Income | (1,063) | (1,063) | (1,063) | (1,063) | (4,603) | (6,728) | (9,288) | (12,317) | (15,891) | (20,090) | (25,001) | (98,167) |
| Income Taxes @ 38.0% | (13,477) | 4,081 | 8,568 | 13,625 | 11,139 | 12,304 | 12,746 | 13,380 | 14,110 | 14,848 | 13,718 | 105,042 |
| Net After Tax Income | 0 | 3,571 | (3,256) | (5,178) | (4,233) | (4,676) | (4,844) | (5,084) | (5,362) | (5,642) | (5,213) | (39,916) |
| Accounts Receivable | (13,477) | 7,651 | 5,312 | 8,448 | 6,906 | 7,629 | 7,903 | 8,295 | 8,748 | 9,206 | 8,505 | 65,126 |
| B&I Loan | (2,951) | (1,624) | (488) | (559) | (624) | (622) | (688) | (762) | (843) | (933) | (1,034) | (11,129) |
| B&I Loan Repayment | 10,000 | | | | | | | | | | | 10,000 |
| Capital Contribution | (1,000) | (1,000) | (1,000) | (1,000) | (1,000) | (1,000) | (1,000) | (1,000) | (1,000) | (1,000) | | (10,000) |
| Fuel Trust Contribution | 5,000 | | | | | | | | | | | 5,000 |
| ESOP Capital Contribution | 5,936 | 7,931 | 8,425 | 8,933 | 9,498 | 10,240 | 11,046 | 11,921 | 12,872 | 13,905 | 15,030 | 115,736 |
| ESOP Stock Loan | 4,250 | | | | | | | | | | | 4,250 |
| ESOP Stock Loan Repayment | (4,250) | | | | | | | | | | | (4,250) |
| | 1,063 | 1,063 | 1,063 | 1,063 | | | | | | | | 4,250 |

-continued

Specimen 26
PROJECTED INCOME & CASH FLOW STATEMENT
10% GROWTH 50% FUEL PARTIPATION

| In $ 000 | YEAR 1 | YEAR 2 | YEAR 3 | YEAR 4 | YEAR 5 | YEAR 6 | YEAR 7 | YEAR 8 | YEAR 9 | YEAR 10 | YEAR 11 | TOTAL |
|---|---|---|---|---|---|---|---|---|---|---|---|---|
| Deposits & other Assets | (3,000) | | | | | | | | | | | (3,000) |
| Other Assets | (2,000) | | | | | | | | | | | (2,000) |
| Depreciation/Amortization | 286 | 490 | 350 | 250 | 179 | 178 | 179 | 89 | | | | 2,000 |
| Accounts Payable | 3,184 | 999 | 316 | 360 | 468 | 430 | 501 | 542 | 588 | 639 | 695 | 8,721 |
| ESOP After Tax Dividends | 0 | 0 | 0 | (7,934) | (6,906) | (7,629) | (7,903) | (8,295) | (8,748) | (9,206) | (8,505) | (65,126) |
| Cash Flow | 3,040 | 15,510 | 13,977 | 9,559 | 8,520 | 9,226 | 10,037 | 10,791 | 11,617 | 12,611 | 14,690 | 119,578 |
| Cumulative Cash Flow | 3,040 | 18,550 | 32,527 | 42,086 | 50,606 | 59,833 | 69,869 | 80,660 | 92,277 | 104,888 | 119,578 | |

Specimen 27
PROJECTED FUEL SAVINGS
10% GROWTH 50% FUEL PARTICIPATION

| In $ 000 | YEAR 1 | YEAR 2 | YEAR 3 | YEAR 4 | YEAR 5 | YEAR 6 |
|---|---|---|---|---|---|---|
| Gallons (000) | | | | | | |
| Boeing 737 | 15,419 | 20,601 | 21,882 | 23,202 | 24,670 | 26,597 |
| Total | 15,419 | 20,601 | 21,882 | 23,202 | 24,670 | 26,597 |
| Price Per Gallon | $0.7700 | $0.7700 | $0.7700 | $0.7700 | $0.7700 | $0.7700 |
| Handling Cost | $0.0300 | $0.0300 | $0.0300 | $0.0300 | $0.0300 | $0.0300 |
| Total | $0.8000 | $0.8000 | $0.8000 | $0.8000 | $0.8000 | $0.8000 |
| Fuel Purchases | 12,335 | 16,481 | 17,506 | 18,561 | 19,736 | 21,278 |
| Fuel by Component | | | | | | |
| Fuel Cost | 11,873 | 15,863 | 16,849 | 17,865 | 18,996 | 20,480 |
| Handling Cost | 463 | 618 | 656 | 696 | 740 | 798 |
| Total | 12,335 | 16,481 | 17,506 | 18,561 | 19,736 | 21,278 |
| Savings by Year | 5,936 | 7,931 | 8,425 | 8,933 | 9,498 | 10,240 |
| Cumulative Savings | 5,936 | 13,868 | 22,292 | 31,225 | 40,723 | 50,963 |

| In $ 000 | YEAR 7 | YEAR 8 | YEAR 9 | YEAR 10 | YEAR 11 | TOTAL |
|---|---|---|---|---|---|---|
| Gallons (000) | | | | | | |
| Boeing 737 | 28,690 | 30,963 | 33,433 | 36,118 | 39,038 | 300,613 |
| Total | 28,690 | 30,963 | 33,433 | 36,118 | 39,038 | 300,613 |
| Price Per Gallon | $0.7700 | $0.7700 | $0.7700 | $0.7700 | $0.7700 | |
| Handling Cost | $0.0300 | $0.0300 | $0.0300 | $0.0300 | $0.0300 | |
| Total | $0.8000 | $0.8000 | $0.8000 | $0.8000 | $0.8000 | |
| Fuel Purchases | 22,952 | 24,770 | 26,746 | 28,895 | 31,230 | 240,491 |
| Fuel by Component | | | | | | |
| Fuel Cost | 22,091 | 23,842 | 25,743 | 27,811 | 30,059 | 231,472 |
| Handling Cost | 861 | 929 | 1,003 | 1,084 | 1,171 | 9,018 |
| Total | 22,952 | 24,770 | 26,746 | 28,895 | 31,230 | 240,491 |
| Savings by Year | 11,046 | 11,921 | 12,872 | 13,905 | 15,030 | 115,736 |
| Cumulative Savings | 62,009 | 73,929 | 86,801 | 100,707 | 115,736 | |

Specimen 28
PROJECTED ESOP INCOME & CASH FLOW STATEMENT
10% GROWTH 50% FUEL PARTICIPATION

| In $ 000 | YEAR 1 | YEAR 2 | YEAR 3 | YEAR 4 | YEAR 5 | YEAR 6 | YEAR 7 | YEAR 8 | YEAR 9 | YEAR 10 | YEAR 11 | TOTAL |
|---|---|---|---|---|---|---|---|---|---|---|---|---|
| Beginning Cash Balance | 0 | 3,181 | 7,123 | 11,718 | 0 | 0 | 0 | 0 | 0 | 0 | 0 | 0 |
| Sources of Funds | | | | | | | | | | | | |
| Corporate Payroll Contributions | 3,254 | 3,833 | 4,257 | 4,662 | 5,118 | 5,683 | 6,315 | 7,019 | 7,807 | 8,687 | 9,670 | 66,305 |
| Interest Reimbursement | 404 | 303 | 202 | 101 | 2,762 | 3,761 | 4,893 | 6,153 | 7,558 | 9,124 | 10,866 | 46,126 |
| Stockholder Stock Loans | 0 | 0 | 0 | 46,029 | 21,253 | 25,594 | 30,293 | 35,738 | 41,990 | 49,118 | 56,521 | 306,535 |
| Pre - Tax Dividend Income | 1,063 | 1,063 | 1,063 | 1,063 | 4,603 | 6,728 | 9,288 | 12,317 | 15,891 | 20,090 | 25,001 | 98,167 |
| After Tax Dividend Income | 0 | 0 | 0 | 7,934 | 6,906 | 7,629 | 7,903 | 8,295 | 8,748 | 9,206 | 8,505 | 65,126 |
| Interest Income @ 6% | 0 | 191 | 427 | 703 | 0 | 0 | 0 | 0 | 0 | 0 | 0 | 1,321 |
| Total Sources of Funds | 4,721 | 5,390 | 5,949 | 60,491 | 40,642 | 49,395 | 58,690 | 69,522 | 81,993 | 96,224 | 110,564 | 583,581 |
| Uses of Funds | | | | | | | | | | | | |
| Stock Purchases | 0 | 0 | 0 | 70,950 | 33,120 | 38,717 | 44,286 | 50,789 | 58,237 | 66,654 | 74,286 | 437,039 |
| Administration @ 2% | 73 | 83 | 89 | 95 | 158 | 189 | 224 | 263 | 307 | 356 | 411 | 2,249 |
| Initial Stock Purchase | 1,063 | 1,063 | 1,063 | 1,063 | | | | | | | | 4,250 |
| Interest On Initial Stock Purchase | 404 | 303 | 202 | 101 | | | | | | | | 1,009 |
| Loan Repayment Over 10 Years Stockholder Stock Loans | | | | | 4,603 | 6,728 | 9,288 | 12,317 | 15,891 | 20,090 | 25,001 | 93,917 |
| Interest Expense @ 6% Stockholder Stock Loans | | | | | 2,762 | 3,761 | 4,893 | 6,153 | 7,558 | 9,124 | 10,866 | 45,116 |
| Total Uses of Funds | 1,539 | 1,448 | 1,354 | 72,209 | 40,642 | 49,395 | 58,690 | 69,522 | 81,993 | 96,224 | 110,564 | 583,581 |
| Ending Cash Balance | 3,181 | 7,123 | 11,718 | 0 | 0 | 0 | 0 | 0 | 0 | 0 | 0 | 0 |

Specimen 29
ESOP PURCHASE SCHEDULE 10% GROWTH 50% FUEL PARTICIPATION

| In $ 000 | YR 4 Beginning Ownership | YR 4 Equity Value | YR 4 25% Purchases | YR 5 Beginning Ownership | YR 5 Equity Value | YR 5 10% Purchases | YR 6 Beginning Ownership | YR 6 Equity Value | YR 6 10% Purchases |
|---|---|---|---|---|---|---|---|---|---|
| Fuel Trust Investors | 25.00% | 70,950 | 18,671 | 18.42% | 61,011 | 6,716 | 15.79% | 61,132 | 10,189 |
| Leasing Company | 10.00% | 28,380 | 7,468 | 7.37% | 24,404 | 3,486 | 6.32% | 24,453 | 4,075 |
| Airline Investors | 55.00% | 156,090 | 41,076 | 40.53% | 134,223 | 19,175 | 34.74% | 134,491 | 22,415 |
| ESOP Education | 5.00% | 14,190 | 3,734 | 3.68% | 12,202 | 1,743 | 3.16% | 12,226 | 2,038 |
| ESOP | 5.00% | 14,190 | 0 | 30.00% | 99,360 | 0 | 40.00% | 184,868 | 0 |
| Total | 100% | 283,800 | 70,950 | 100% | 331,200 | 33,120 | 100% | 387,170 | 38,717 |

| | YR 7 Beginning Ownership | YR 7 Equity Value | YR 7 10% Purchases | YR 8 Beginning Ownership | YR 8 Equity Value | YR 8 10% Purchases | YR 9 Beginning Ownership | YR 9 Equity Value | YR 9 10% Purchases |
|---|---|---|---|---|---|---|---|---|---|
| Fuel Trust Investors | 13.16% | 58,271 | 11,654 | 10.53% | 53,462 | 13,366 | 7.89% | 45,977 | 15,326 |
| Leasing Company | 5.26% | 23,308 | 4,862 | 4.21% | 21,365 | 5,346 | 3.16% | 18,391 | 6,130 |
| Airline Investors | 28.95% | 128,196 | 25,639 | 23.16% | 117,617 | 29,404 | 17.37% | 101,148 | 33,716 |
| ESOP Education | 2.63% | 11,654 | 2,331 | 2.11% | 10,692 | 2,673 | 1.58% | 9,195 | 3,065 |
| ESOP | 50.00% | 221,430 | 0 | 60.00% | 304,734 | 0 | 70.00% | 407,659 | 0 |
| Total | 100% | 442,860 | 44,286 | 100% | 507,890 | 50,789 | 100% | 582,370 | 58,237 |

| | YR 10 Beginning Ownership | YR 10 Equity Value | YR 10 10% Purchases | YR 11 Beginning Ownership | YR 11 Equity Value | YR 11 10% Purchases | SUMMARY Ending Ownership | SUMMARY Equity Value | SUMMARY Total Purchases |
|---|---|---|---|---|---|---|---|---|---|
| Fuel Trust Investors | 5.26% | 35,081 | 17,541 | 2.63% | 19,549 | 19,549 | 0.00% | 0 | 115,010 |
| Leasing Company | 2.11% | 14,032 | 7,016 | 1.05% | 7,820 | 7,820 | 0.00% | 0 | 46,004 |
| Airline Investors | 11.58% | 77,178 | 38,589 | 5.79% | 43,008 | 43,008 | 0.00% | 0 | 253,023 |
| ESOP Education | 1.05% | 7,016 | 3,508 | 0.53% | 3,910 | 3,910 | 0.00% | 0 | 23,002 |
| ESOP | 80.00% | 533,232 | 0 | 90.00% | 668,574 | 0 | 100.00% | 742,860 | 0 |
| Total | 100% | 666,540 | 66,654 | 100% | 742,660 | 74,286 | 100% | 742,860 | 437,039 |

Specimen 30
FUEL TRUST RETURN ON INVESTMENT
10% GROWTH 50% FUEL PARTICIPATION

| In $ 000 | Stock Share | Beginning Balance | Less: Fuel Cost | Add: Int @ 6.00% | Add: Stock Purchases | Ending Balance | |
|---|---|---|---|---|---|---|---|
| Beginning of Trust | 25% | 31,225 | | | | 31,225 | −31,225 |
| Year 1 | | 31,225 | 5,936 | 1,695 | | 26,984 | 1695.41306 |
| Year 2 | | 26,984 | 7,931 | 1,381 | | 20,434 | 1381.104996 |
| Year 3 | | 20,434 | 8,425 | 973 | | 12,983 | 973.2903579 |
| Year 4 | | 12,983 | 8,933 | 511 | 18,671 | 23,232 | 19182.02233 |
| Year 5 | | 23,232 | 9,498 | 1,109 | 8,716 | 23,559 | 327 |
| Year 6 | | 23,559 | 10,240 | 1,106 | 10,189 | 24,614 | 1,055 |
| Year 7 | | 24,614 | 11,046 | 1,145 | 11,654 | 26,368 | 1,754 |
| Year 8 | | 26,368 | 11,921 | 1,224 | 13,366 | 29,037 | 2,669 |
| Year 9 | | 29,037 | 12,872 | 1,356 | 15,326 | 32,847 | 3,810 |
| Year 10 | | 32,847 | 13,905 | 1,554 | 17,541 | 38,036 | 5,189 |
| Year 11 | | 38,036 | 15,030 | 1,831 | 19,549 | 44,386 | 6,351 |
| Net to Trust | | 31,225 | 115,736 | 13,887 | 115,010 | 44,386 | 44,386 |
| Internal Rate of Return | | | | | | 5.97% | 5.97% |

Specimen 31
FUEL TRUST RETURN ON INVESTMENT
10% GROWTH 50% FUEL PARTICIPATION

| In $ 000 | Stock Share | Beginning Balance | Less: Fuel Cost | Add: Int @ 6.00% | Add: Stock Purchases | Ending Balance | |
|---|---|---|---|---|---|---|---|
| Beginning of Trust | 25% | 31,225 | | | | 31,225 | −31,225 |
| Year 1 | | 31,225 | 5,936 | 1,695 | | 26,984 | 1695.41306 |
| Year 2 | | 26,984 | 7,931 | 1,381 | | 20,434 | 1381.104996 |

-continued

Specimen 31

| | | | | | | |
|---|---|---|---|---|---|---|
| Year 3 | 20,434 | 8,425 | 973 | | 12,983 | 973.2903579 |
| Year 4 | 12,983 | 8,933 | 511 | 18,671 | 23,232 | 19182.02233 |
| Year 5 | 23,232 | 9,498 | 1,109 | 8,716 | 23,559 | 327 |
| Year 6 | 23,559 | 10,240 | 1,106 | 10,189 | 24,614 | 1,055 |
| Year 7 | 24,614 | 11,046 | 1,145 | 11,654 | 26,368 | 1,754 |
| Year 8 | 26,368 | 11,921 | 1,224 | 13,366 | 29,037 | 2,669 |
| Year 9 | 29,037 | 12,872 | 1,356 | 15,326 | 32,847 | 3,810 |
| Year 10 | 32,847 | 13,905 | 1,554 | 17,541 | 38,036 | 5,189 |
| Year 11 | 38,036 | 15,030 | 1,831 | 19,549 | 44,386 | 6,351 |
| Net to Trust | 31,225 | 115,736 | 13,887 | 115,010 | 44,386 | 44,386 |
| Internal Rate of Return | | | | | 5.97% | 5.97% |

EQUITY INVESTOR'S RETURN ON INVESTMENT
10% GROWTH 50% FUEL PARTICIPATION

| In $ 000 | Stock Share | Beginning Balance | | Stock Purchases | Ending Balance | |
|---|---|---|---|---|---|---|
| Beginning Balance | 5% | 5,000 | | | | −5,000 |
| Year 1 | | 0 | | | | 0 |
| Year 2 | | 0 | | | | 0 |
| Year 3 | | 0 | | | | 0 |
| Year 4 | | 0 | | 3,734 | 3,734 | 3734.210526 |
| Year 5 | | 3,734 | | 1,743 | 5,477 | 1,743 |
| Year 6 | | 5,477 | | 2,038 | 7,515 | 2,038 |
| Year 7 | | 7,515 | | 2,331 | 9,846 | 2,331 |
| Year 8 | | 9,846 | | 2,673 | 12,519 | 2,673 |
| Year 9 | | 12,519 | | 3,065 | 15,584 | 3,065 |
| Year 10 | | 15,584 | | 3,508 | 19,092 | 3,508 |
| Year 11 | | 19,092 | | 3,910 | 23,002 | 3,910 |
| Net to Trust | | 5,000 | 0 | 0 | 23,002 | 28,002 | 23,002 |
| Net to Investor | | | | | | 23.80% | 23.80% |

Specimen 32
PROJECTED BALANCE SHEET
5% GROWTH 50% FUEL PARTICIPATION

| In $ 000 | YEAR 1 | YEAR 2 | YEAR 3 | YEAR 4 | YEAR 5 | YEAR 6 | YEAR 7 | YEAR 8 | YEAR 9 | YEAR 10 | YEAR 11 |
|---|---|---|---|---|---|---|---|---|---|---|---|
| Assets | | | | | | | | | | | |
| Cash | 3,040 | 18,550 | 31,799 | 40,704 | 47,702 | 55,122 | 62,883 | 71,043 | 79,493 | 88,474 | 98,878 |
| Accounts Receivable | 2,951 | 4,575 | 4,767 | 4,993 | 5,216 | 5,586 | 5,983 | 6,407 | 6,862 | 7,349 | 7,870 |
| Stock Loans Receivable | 3,188 | 2,125 | 1,063 | 0 | 0 | 0 | 0 | 0 | 0 | 0 | 0 |
| Deposits & Other Assets | 3,000 | 3,000 | 3,000 | 3,000 | 3,000 | 3,000 | 3,000 | 3,000 | 3,000 | 3,000 | 3,000 |
| Fixed Assets | 2,000 | 2,000 | 2,000 | 2,000 | 2,000 | 2,000 | 2,000 | 2,000 | 2,000 | 2,000 | 2,000 |
| Depreciation & Amortization | (286) | (776) | (1,125) | (1,375) | (1,554) | (1,732) | (1,911) | (2,000) | (2,000) | (2,000) | (2,000) |
| Total Assets | 13,893 | 29,475 | 41,504 | 49,321 | 56,364 | 63,976 | 71,955 | 80,451 | 89,355 | 98,823 | 109,749 |
| Liabilities & Equity | | | | | | | | | | | |
| Accounts Payable | 3,184 | 4,183 | 4,230 | 4,341 | 4,452 | 4,736 | 4,971 | 5,284 | 5,548 | 5,893 | 6,190 |
| Loans Payable | 9,000 | 8,000 | 7,000 | 6,000 | 5,000 | 4,000 | 3,000 | 2,000 | 1,000 | 0 | 0 |
| Capital | 15,186 | 23,118 | 31,049 | 38,981 | 46,912 | 55,240 | 63,985 | 73,166 | 82,807 | 92,930 | 103,559 |
| Retained Earnings | (13,477) | (5,826) | (775) | 0 | 0 | 0 | 0 | 0 | 0 | 0 | 0 |
| Total Liabilities & Equity | 13,893 | 29,475 | 41,504 | 49,321 | 56,364 | 63,976 | 71,955 | 80,451 | 89,355 | 98,823 | 109,749 |

Specimen 33
PROJECTED INCOME & CASH FLOW STATEMENT
5% GROWTH 50% FUEL PARTICIPATION

| In $ 000 | YEAR 1 | YEAR 2 | YEAR 3 | YEAR 4 | YEAR 5 | YEAR 6 | YEAR 7 | YEAR 8 | YEAR 9 | YEAR 10 | YEAR 11 | TOTAL |
|---|---|---|---|---|---|---|---|---|---|---|---|---|
| Revenue | | | | | | | | | | | | |
| Passenger | 67,951 | 105,355 | 109,769 | 114,964 | 120,120 | 128,648 | 137,782 | 147,565 | 158,042 | 169,263 | 181,281 | 1,440,739 |
| Cargo | 2,718 | 4,214 | 4,391 | 4,599 | 4,805 | 5,146 | 5,511 | 5,903 | 6,322 | 6,771 | 7,251 | 57,630 |
| Other | 162 | 240 | 249 | 258 | 267 | 280 | 294 | 309 | 325 | 341 | 358 | 3,083 |
| Total Revenue | 70,832 | 109,809 | 114,408 | 119,821 | 125,192 | 134,075 | 143,588 | 153,776 | 164,688 | 176,374 | 188,890 | 1,501,452 |
| Expenses | | | | | | | | | | | | |
| Payroll | 13,017 | 15,334 | 15,832 | 16,351 | 16,884 | 18,260 | 19,748 | 21,358 | 23,099 | 24,981 | 27,017 | 211,881 |
| Benefits & Taxes | 3,429 | 4,032 | 4,164 | 4,300 | 4,440 | 4,748 | 5,135 | 5,553 | 6,006 | 6,495 | 7,024 | 55,325 |
| Flight Operations | 3,467 | 4,238 | 3,540 | 3,585 | 3,631 | 3,813 | 4,004 | 4,204 | 4,414 | 4,635 | 4,866 | 44,397 |
| Fuel | 12,335 | 16,481 | 16,481 | 16,481 | 16,481 | 17,305 | 18,170 | 19,079 | 20,033 | 21,034 | 22,086 | 195,966 |
| Maintenance | 7,885 | 10,834 | 11,159 | 11,494 | 11,839 | 12,431 | 13,052 | 13,705 | 14,390 | 15,110 | 15,865 | 137,766 |
| Aircraft Rental | 10,920 | 14,040 | 14,040 | 14,040 | 14,040 | 15,600 | 15,600 | 17,160 | 17,160 | 18,720 | 18,720 | 170,040 |
| Inflight | 2,750 | 4,099 | 4,357 | 4,639 | 4,928 | 5,174 | 5,433 | 5,705 | 5,990 | 6,289 | 6,604 | 55,967 |
| Customer Service | 10,108 | 13,640 | 14,083 | 14,543 | 15,016 | 15,767 | 16,555 | 17,383 | 18,252 | 19,165 | 20,123 | 174,635 |
| Reservations | 709 | 1,050 | 1,118 | 1,212 | 1,267 | 1,331 | 1,397 | 1,467 | 1,541 | 1,618 | 1,699 | 14,408 |
| Marketing | 9,007 | 13,890 | 14,483 | 15,178 | 15,869 | 16,663 | 17,496 | 18,371 | 19,289 | 20,254 | 21,267 | 181,767 |
| Administration | 2,970 | 2,981 | 2,505 | 2,608 | 2,710 | 2,846 | 2,988 | 3,138 | 3,295 | 3,459 | 3,632 | 33,132 |
| Total Expenses | 76,597 | 100,619 | 101,761 | 104,430 | 107,107 | 113,938 | 119,579 | 127,122 | 133,468 | 141,760 | 148,904 | 1,275,285 |
| Operating Profit | (5,766) | (9,190) | (12,647) | (15,391) | (18,085) | (20,137) | (24,009) | (26,654) | (31,220) | (34,614) | (39,986) | (226,167) |
| Less: Expenses paid by others | | | | | | | | | | | | |
| Fuel Trust Contribution | 5,936 | 7,931 | 7,931 | 7,931 | 7,931 | 8,328 | 8,744 | 9,182 | 9,641 | 10,123 | 10,629 | 94,309 |
| State Quality Jobs Credit 5.00% | 651 | 767 | 792 | 818 | 844 | 913 | 987 | 1,068 | 1,155 | 1,249 | 349 | 9,243 |
| State Jobs Training Program | 191 | 238 | 245 | 253 | 261 | 274 | 287 | 302 | 317 | 333 | | 3,047 |
| Net Operating Profit | 1,012 | 18,126 | 21,615 | 24,393 | 27,121 | 29,651 | 34,028 | 37,205 | 42,333 | 46,318 | 50,964 | 332,766 |
| B&I Loan Interest Expenses @ 9.5% | (914) | (819) | (724) | (629) | (534) | (439) | (344) | (249) | (154) | (59) | | (4,869) |
| Pre-Start Expenditure (Net) | (3,036) | | | | | | | | | | | (3,036) |
| Depreciation/Amortization | (286) | (490) | (350) | (250) | (179) | (178) | (179) | (89) | | | | (2,000) |
| ESOP Loan Interest Income @ 6.0% | 255 | 191 | 128 | 64 | | | | | | | | 638 |
| Interest Income @ 6.0% | 0 | 91 | 556 | 954 | 1,221 | 1,431 | 1,654 | 1,886 | 2,131 | 2,385 | 2,654 | 14,964 |
| Pre-Contribution Earnings | (2,969) | 17,099 | 21,225 | 24,531 | 27,629 | 30,465 | 35,158 | 38,753 | 44,309 | 48,644 | 53,618 | 338,464 |
| Fuel Trust Contribution | (5,936) | (7,931) | (7,931) | (7,931) | (7,931) | (8,328) | (8,744) | (9,182) | (9,641) | (10,123) | (10,629) | (94,309) |
| ESOP P/R Contribution 25.0% | (3,254) | (3,833) | (3,958) | (4,088) | (4,221) | (4,565) | (4,937) | (5,339) | (5,775) | (6,245) | (6,754) | (52,970) |
| ESOP Interest Deduction | (255) | (191) | (128) | (64) | | | | | | | | (37,329) |
| ESOP Principal Deduction | (1,063) | (1,063) | (1,063) | (1,063) | (2,335) | (3,170) | (4,068) | (5,068) | (6,140) | (7,324) | (8,586) | (80,944) |
| Taxable Income | (13,477) | 4,081 | 8,145 | 11,386 | 9,250 | 8,729 | 9,672 | 8,987 | 9,772 | 8,698 | 7,668 | 72,911 |
| Income Taxes @ 38% | 0 | 3,571 | (3,095) | (4,327) | (3,515) | (3,317) | (3,675) | (3,415) | (3,713) | (3,305) | (2,914) | (27,706) |
| Net After Tax Income | (13,477) | 7,651 | 5,050 | 7,059 | 5,735 | 5,412 | 5,997 | 5,572 | 6,058 | 5,393 | 4,754 | 45,205 |
| Accounts Receivable | (2,951) | (1,624) | (192) | (226) | (224) | (370) | (396) | (425) | (455) | (487) | (521) | (7,870) |
| B&I Loan | 10,000 | | | | | | | | | | | 10,000 |
| B&I Loan Repayment | (1,000) | (1,000) | (1,000) | (1,000) | (1,000) | (1,000) | (1,000) | (1,000) | (1,000) | (1,000) | | (10,000) |
| Capital Contribution | 5,000 | | | | | | | | | | | 5,000 |
| Fuel Trust Contribution | 5,936 | 7,931 | 7,931 | 7,931 | 7,931 | 8,328 | 8,744 | 9,182 | 9,641 | 10,123 | 10,629 | 94,309 |

-continued

Specimen 33
PROJECTED INCOME & CASH FLOW STATEMENT
5% GROWTH 50% FUEL PARTICIPATION

| In $ 000 | YEAR 1 | YEAR 2 | YEAR 3 | YEAR 4 | YEAR 5 | YEAR 6 | YEAR 7 | YEAR 8 | YEAR 9 | YEAR 10 | YEAR 11 | TOTAL |
|---|---|---|---|---|---|---|---|---|---|---|---|---|
| ESOP Capital Contribution | 4,250 | | | | | | | | | | | 4,250 |
| ESOP Stock Loan | (4,250) | | | | | | | | | | | (4,250) |
| ESOP Stock Loan Repayment | 1,063 | 1,063 | 1,063 | 1,063 | | | | | | | | 4,250 |
| Deposits & Other Assets | (3,000) | | | | | | | | | | | (3,000) |
| Fixed Assets | (2,000) | | | | | | | | | | | (2,000) |
| Depreciation/Amortization | 286 | 490 | 350 | 250 | 179 | 178 | 179 | 89 | 264 | 345 | 297 | 2,000 |
| Accounts Payable | 3,184 | 999 | 47 | 111 | 111 | 284 | 234 | 314 | | | | 6,190 |
| ESOP After Tax Dividends | 0 | 0 | 0 | (6,284) | (5,735) | (5,412) | (5,997) | (5,572) | (6,058) | (5,393) | (4,754) | (45,205) |
| Cash Flow | 3,040 | 15,510 | 13,250 | 8,905 | 6,997 | 7,420 | 7,761 | 8,160 | 8,450 | 8,981 | 10,404 | 98,878 |
| Cumulative Cash Flow | 3,040 | 18,550 | 31,779 | 40,704 | 47,702 | 55,122 | 62,883 | 71,043 | 79,493 | 88,474 | 98,878 | 98,878 |

Specimen 34
PROJECTED FUEL SAVINGS
5% GROWTH 50% FUEL PARTICIPATION

| In $ 000 | YEAR 1 | YEAR 2 | YEAR 3 | YEAR 4 | YEAR 5 | YEAR 6 |
|---|---|---|---|---|---|---|
| Gallons (000) | | | | | | |
| Boeing 737 | 15,419 | 20,601 | 20,601 | 20,601 | 20,601 | 21,631 |
| Total | 15,419 | 20,601 | 20,601 | 20,601 | 20,601 | 21,631 |
| Price Per Gallon | $0.7700 | $0.7700 | $0.7700 | $0.7700 | $0.7700 | $0.7700 |
| Handling Cost | 0.0300 | 0.0300 | 0.0300 | 0.0300 | 0.0300 | 0.0300 |
| Total | $0.8000 | $0.8000 | $0.8000 | $0.8000 | $0.8000 | $0.8000 |
| Fuel Purchases | 12,335 | 16,481 | 16,481 | 16,481 | 16,481 | 17,305 |
| Fuel by Component | | | | | | |
| Fuel by Cost | 11,873 | 15,863 | 15,863 | 15,863 | 15,863 | 16,656 |
| Handling Cost | 463 | 618 | 618 | 618 | 618 | 649 |
| Total | 12,335 | 16,481 | 16,481 | 16,481 | 16,481 | 17,305 |
| Saving by Year | 5,936 | 7,931 | 7,931 | 7,931 | 7,391 | 8,328 |
| Cumulative Savings | 5,936 | 13,868 | 21,799 | 29,731 | 37,662 | 45,990 |

| In $ 000 | YEAR 7 | YEAR 8 | YEAR 9 | YEAR 10 | YEAR 11 | TOTAL |
|---|---|---|---|---|---|---|
| Gallons (000) | | | | | | |
| Boeing 737 | 22,713 | 23,848 | 25,041 | 26,293 | 27,608 | 244,958 |
| Total | 22,713 | 23,848 | 25,041 | 26,293 | 27,608 | 244,958 |
| Price Per Gallon | $0.7700 | $0.7700 | $0.7700 | $0.7700 | $0.7700 | |
| Handling Cost | 0.0300 | 0.0300 | 0.0300 | 0.0300 | 0.0300 | |
| Total | $0.8000 | $0.8000 | $0.8000 | $0.8000 | $0.8000 | |
| Fuel Purchases | 18,170 | 19,079 | 20,033 | 21,034 | 22,086 | 195,966 |
| Fuel by Component | | | | | | |
| Fuel by Cost | 17,489 | 18,363 | 19,281 | 20,246 | 21,258 | 188,618 |
| Handling Cost | 681 | 715 | 751 | 789 | 828 | 7,349 |
| Total | 18,170 | 19,079 | 20,033 | 21,034 | 22,086 | 195,996 |
| Saving by Year | 8,744 | 9,182 | 9,641 | 10,123 | 10,629 | 94,309 |
| Cumulative Savings | 54,735 | 63,916 | 73,557 | 83,680 | 94,309 | |

Specimen 35
PROJECTED ESOP INCOME & CASH FLOW STATEMENT
5% GROWTH 50% FUEL PARTICIPATION

| In $ 000 | YEAR 1 | YEAR 2 | YEAR 3 | YEAR 4 | YEAR 5 | YEAR 6 | YEAR 7 | YEAR 8 | YEAR 9 | YEAR 10 | YEAR 11 | TOTAL |
|---|---|---|---|---|---|---|---|---|---|---|---|---|
| Beginning Cash Balance | 0 | 3,184 | 7,128 | 11,7432 | 0 | 0 | 0 | 0 | 0 | 0 | 0 | 0 |
| Sources of Funds | | | | | | | | | | | | |
| Corporate Payroll Contributions | 3,254 | 3,833 | 3,958 | 4,088 | 4,221 | 4,565 | 4,937 | 5,339 | 5,775 | 6,245 | 6,754 | 52,970 |
| Interest Reimbursement | 255 | 191 | 128 | 64 | 2,335 | 3,170 | 4,068 | 5,068 | 6,140 | 7,324 | 8,586 | 37,329 |
| Stockholder Stock Loans | 0 | 0 | 0 | 38,919 | 17,804 | 20,642 | 24,404 | 28,050 | 32,714 | 37,277 | 42,416 | 242,227 |
| Pre - Tax Dividend Income | 1,063 | 1,063 | 1,063 | 1,063 | 3,892 | 5,672 | 7,737 | 10,177 | 12,982 | 16,253 | 19,981 | 80,944 |
| After Tax Dividend Income | 0 | 0 | 0 | 6,284 | 5,735 | 5,412 | 5,997 | 5,572 | 6,058 | 5,393 | 4,754 | 45,205 |
| Interest Income @ 6% | 0 | 191 | 428 | 686 | 0 | 0 | 0 | 0 | 0 | 0 | 0 | 1,305 |
| Total Sources of Funds | 4,572 | 5,278 | 5,576 | 51,102 | 33,987 | 39,462 | 47,143 | 54,206 | 63,670 | 72,493 | 82,492 | 459,980 |
| Uses of Funds | | | | | | | | | | | | |
| Stock Purchases | 0 | 0 | 0 | 61,325 | 27,629 | 30,465 | 35,158 | 38,753 | 44,309 | 48,644 | 53,618 | 339,901 |
| Administration @ 2% | 70 | 80 | 82 | 83 | 131 | 155 | 180 | 208 | 238 | 271 | 307 | 1,806 |
| Inital Stock Purchase | 1,063 | 1,063 | 1,063 | 1,063 | | | | | | | | 4,250 |
| Interest On Initial Stock Purchase | 255 | 191 | 128 | 64 | | | | | | | | 638 |
| Loan Repayment Over 10 Years | | | | | 3,892 | 5,672 | 7,737 | 10,177 | 12,982 | 16,253 | 19,981 | 76,694 |
| Stockholder Stock Loans | | | | | | | | | | | | |
| Interest Expense @ 6% | | | | | 2,335 | 3,170 | 4,068 | 5,068 | 6,140 | 7,324 | 8,586 | 36,692 |
| Stockholder Stock Loans | | | | | | | | | | | | |
| Total Uses of Funds | 1,388 | 1,334 | 1,272 | 62,534 | 33,987 | 39,462 | 47,143 | 54,206 | 63,670 | 72,493 | 82,492 | 459,980 |
| Ending Cash Balance | 3,184 | 7,128 | 11,432 | 0 | 0 | 0 | 0 | 0 | 0 | 0 | 0 | 0 |

Specimen 36
ESOP Purchase Schedule 5% Growth 50% Fuel Participation

|  | YR 4 | | | YR 5 | | | YR 6 | | |
|---|---|---|---|---|---|---|---|---|---|
| In $ 000 | Beginning Ownership | Equity Value | 25% Purchases | Ownership Beginning | Equity Value | 10% Purchases | Beginning Ownership | Equity Value | 10% Purchases |
| Fuel Trust Investors | 25.00% | 61,325 | 16,138 | 18.42% | 50,896 | 7,271 | 15.79% | 48,103 | 8,017 |
| Equity Investors | 10.00% | 24,530 | 6,455 | 7.37% | 20,358 | 2,908 | 6.32% | 19,241 | 3,207 |
| Airline Investors | 55.00% | 134,915 | 35,504 | 40.53% | 111,970 | 15,996 | 34.74% | 105,826 | 17,638 |
| ESOP Education | 5.00% | 12,265 | 3,228 | 3.68% | 10,179 | 1,454 | 3.16% | 9,621 | 1,603 |
| ESOP | 5.00% | 12,265 | 0 | 30.00% | 82,887 | 0 | 40.00% | 121,860 | 0 |
| Total | 100% | 245,300 | 61,325 | 100% | 276,290 | 27,629 | 100% | 304,650 | 30,465 |

|  | YR 7 | | | YR 8 | | | YR 9 | | |
|---|---|---|---|---|---|---|---|---|---|
|  | Beginning Ownership | Equity Value | 10% Purchases | Beginning Ownership | Equity Value | 10% Purchases | Beginning Ownership | Equity Value | 10% Purchases |
| Fuel Trust Investors | 13.16% | 46,261 | 9,252 | 10.53% | 40,793 | 10,198 | 7.89% | 34,981 | 11,660 |
| Leasing Company | 5.26% | 18,504 | 3,701 | 4.21% | 16,317 | 4,079 | 3.16% | 13,992 | 4,684 |
| Airline Investors | 28.95% | 101,773 | 20,355 | 23.16% | 89,744 | 22,436 | 17.37% | 76,958 | 25,653 |
| ESOP Education | 2.63% | 9,252 | 1,850 | 2.11% | 8,159 | 2,040 | 1.58% | 6,996 | 2,332 |
| ESOP | 50.00% | 175,790 | 0 | 80.00% | 232,518 | 0 | 70.00% | 310,163 | 0 |
| Total | 100% | 351,560 | 35,158 | 100% | 387,530 | 38,753 | 100% | 443,090 | 44,309 |

|  | YR 10 | | | YR 11 | | | SUMMARY | | |
|---|---|---|---|---|---|---|---|---|---|
|  | Beginning Ownership | Equity Value | 10% Purchases | Beginning Ownership | Equity Value | 10% Purchases | Ending Ownership | Equity Value | Total Purchases |
| Fuel Trust Investors | 5.26% | 25,602 | 12,801 | 2.83% | 14,110 | 14,110 | 0.00% | 0 | 89,448 |
| Leasing Company | 2.11% | 10,241 | 6,120 | 1.05% | 5,644 | 5,544 | 0.00% | 0 | 35,779 |
| Airline Investors | 11.58% | 56,325 | 28,162 | 5.79% | 31,042 | 31,042 | 0.00% | 0 | 196,785 |
| ESOP Education | 1.05% | 5,120 | 2,560 | 0.53% | 2,822 | 2,822 | 0.00% | 0 | 17,890 |
| ESOP | 80.00% | 389,152 | 0 | 90.00% | 482,562 | 0 | 100.00% | 536,180 | 0 |
| Total | 100% | 486,440 | 48,644 | 100% | 536,180 | 53,618 | 100% | 536,180 | 339,901 |

Specimen 38
FUEL TRUST PARTICIPATION FOR STOCK
5% GROWTH 50% FUEL PARTICIPATION

| In $ 000 | YEAR 4 | YEAR 5 | YEAR 6 | YEAR 7 | YEAR 8 | YEAR 9 | YEAR 10 | YEAR 11 | TOTAL |
|---|---|---|---|---|---|---|---|---|---|
| ESOP Purchases @ 25% | 16,138 | 7,271 | 8,017 | 9,252 | 10,198 | 11,660 | 12,801 | 14,110 | 89,448 |
| Fuel for Stock @ 50% | 29,731 | 7,931 | 8,328 | 8,744 | 9,182 | 9,641 | 10,123 | 10,629 | 94,309 |
| Profit on Stock | −13,593 | −661 | −311 | 508 | 1,016 | 2,020 | 2,678 | 3,481 | −4,861 |

Specimen 39
FUEL TRUST RETURN ON INVESTMENT
5% GROWTH 50% FUEL PARTICIPATION

| In $ 000 | Stock Share | Beginning Balance | Less: Fuel Cost | Add: Int @ 6.00% | Add: Stock Purchases | Ending Balance |
|---|---|---|---|---|---|---|
| Beginning of Trust | 25% | 29,731 | | | | 29,731 |
| Year 1 | | 29,731 | 5,936 | 1,606 | | 25,400 |
| Year 2 | | 25,400 | 7,931 | 1,286 | | 18,755 |
| Year 3 | | 18,755 | 7,931 | 887 | | 11,711 |
| Year 4 | | 11,711 | 7,931 | 465 | 16,138 | 20,382 |
| Year 5 | | 20,382 | 7,931 | 985 | 7,271 | 20,706 |
| Year 6 | | 20,706 | 8,328 | 993 | 8,017 | 21,388 |
| Year 7 | | 21,388 | 8,744 | 1,021 | 9,252 | 22,917 |
| Year 8 | | 22,917 | 9,182 | 1,100 | 10,198 | 25,033 |
| Year 9 | | 25,033 | 9,641 | 1,213 | 11,660 | 28,265 |
| Year 10 | | 28,265 | 10,123 | 1,392 | 12,801 | 32,335 |
| Year 11 | | 32,335 | 10,629 | 1,621 | 14,110 | 37,438 |
| Net to Trust | | 29,731 | 94,309 | 12,568 | 89,448 | 37,438 |
| Internal Rate of Return | | | | | | 3.90% |

Specimen 40
EQUITY INVESTOR'S RETURN ON INVESTMENT
5% GROWTH 50% FUEL PARTICIPATION

| in $ 000 | Stock Share | Beginning Balance | | Stock Purchases | Ending Balance |
|---|---|---|---|---|---|
| Beginning Balance | 5% | 5,000 | | | |
| Year 1 | | 0 | | | |
| Year 2 | | 0 | | | |
| Year 3 | | 0 | | | |
| Year 4 | | 0 | | 3,228 | 3,228 |
| Year 5 | | 3,228 | | 1,454 | 4,682 |
| Year 6 | | 4,682 | | 1,603 | 6,285 |
| Year 7 | | 6,285 | | 1,850 | 8,136 |
| Year 8 | | 8,136 | | 2,040 | 10,175 |
| Year 9 | | 10,175 | | 2,332 | 12,507 |
| Year 10 | | 12,507 | | 2,560 | 15,068 |
| Year 11 | | 15,068 | | 2,822 | 17,890 |
| Net to Investor | | 5,000 | 0   0 | 17,890 | 22,890 |
| Internal Rate of Return | | | | | 19.68% |

Whereas, the present invention has been described in relation to the drawings attached hereto, it should be understood that other and further modifications, apart from those shown or suggested herein, may be made within the spirit and scope of this invention.

The invention claimed is:

1. A method comprising the steps of:
electronically inputting, to a computer system, data defining parameters of an employee stock ownership plan;
electronically processing said data with said computer system to trigger;
obtaining, to an extent determined by the computer system, with an equity-issuing commercial entity, a commodity to meet ongoing requirements over a specified period of time, the commodity having a commodity cost;
obtaining, to an extent determined by the computer system, with the employee stock ownership plan, incremental funding from said commercial entity through a contribution of its profits and a contribution equaling a percentage of payroll, and purchasing, with said employee stock ownership plan, said commercial entity equity incrementally over a predetermined time period by utilizing said profit and percentage of payroll contributions;
purchasing, to an extent determined by the computer system, with a commodity trust, the commodity requirements of said commercial entity and causing to be transferred said commodity to said commercial entity in exchange for a predetermined percentage of the commodity cost, and holding, with said commodity trust, a substantial equity interest in said commercial entity in trust in the name of an investor entity; and
incrementally selling, to an extent determined by the computer system, with the investor entity, said commercial entity equity to said employee stock ownership plan over said predetermined time periods as said equity is earned by the investor entity and released from the trust.

2. The method set forth in claim 1, wherein said step of selling is carried out with said investor entity investment held in trust pursuant to a trust agreement having performance criteria for said commercial entity.

3. The method set forth in claim 2, wherein said step of selling is carried out with said commercial entity equity conveyed to said employee stock ownership plan pursuant to a binding call at a price determined periodically, through independent valuation.

4.) The method of claim 1, further comprising the steps of:
monitoring, with said computer system, performance of the equity-issuing commercial entity;
tracking, with said computer system, at least one of said contributions and deductible dividends in transit to the employee stock ownership plan; and
monitoring, with said computer system, securitized advances made by the commodity trust to said commercial entity to enable said commercial entity to purchase said commodity.

5. The method of claim 2, further comprising the steps of:
monitoring, with said computer system, performance of the equity-issuing commercial entity;
tracking, with said computer system, at least one of said contributions and deductible dividends in transit to the employee stock ownership plan; and
monitoring, with said computer system, securitized advances made by the commodity trust to said commercial entity to enable said commercial entity to purchase said commodity.

6. The method of claim 1, further comprising the steps of:
monitoring, with said computer system, performance of the equity-issuing commercial entity;
tracking, with said computer system, at least one of said contributions and deductible dividends in transit to the employee stock ownership plan; and
monitoring, with said computer system, securitized advances made by the commodity trust to said commercial entity to enable said commercial entity to purchase said commodity.

7. The method of claim 1, further including the step of:
tracking, with said computer system, said contributions and deductible dividends that are in transit to the employee stock ownership plan to securitize the purchase of shares of stock of the commercial entity.

8. The method of claim 2, further including the step of:
tracking, with said computer system, of said contributions and deductible dividends that are in transit to the employee stock ownership plan to securitize the purchase of shares of stock of the commercial entity.

9. The method of claim 3, further including the step of:
tracking, with said computer system, said contributions and deductible dividends that are in transit to the employee stock ownership plan to securitize the purchase of shares of stock of the commercial entity.

10. The method of claim 1, further comprising the steps of:
monitoring, with said computer system, said selling said commercial entity equity; and
tracking, with said computer system, at least one of contributions and deductible dividends that are in transit to the employee stock ownership plan to securitize the purchase of shares of common stock of the commercial entity.

11. The method of claim 2, further comprising the steps of:
monitoring, with said computer system, said selling said commercial entity
equity; and
tracking, with said computer system, at least one of contributions and deductible dividends that are in transit to the employee stock ownership plan to securitize the purchase of shares of common stock of the commercial entity.

12. The method of claim 3, further comprising the steps of:
monitoring, with said computer system, said selling said commercial entity equity; and tracking, with said computer system, at least one of contributions and deductible dividends that are in transit to the employee stock ownership plan to securitize the purchase of shares of common stock of the commercial entity.

13. Apparatus comprising:
a computer system comprising a memory and a processor, controlled to receive input data defining parameters of an employee stock ownership plan and process said data to trigger the operations of:
determining how much of a commodity to obtain through an equity issuing commercial entity, the commodity to meet ongoing requirements over a specified period of time, the commodity having a commodity cost;
determining how much incremental funding the employee stock ownership plan should obtain, from said commercial entity through a contribution of its profits and a contribution equaling a percentage of payroll, and triggering purchasing, with said employee stock ownership plan, said commercial entity equity incrementally over a predetermined time period by utilizing said profit and percentage of payroll contributions;
triggering purchasing, with a commodity trust, the commodity requirements of said commercial entity and facilitating transferring said commodity to said commercial entity in exchange for a predetermined percentage of the commodity cost, and facilitating holding, with said commodity trust, a substantial equity interest in said commercial entity in trust in the name of an investor entity; and
triggering incremental selling, by the investor entity, said commercial entity equity to said employee stock ownership plan over said predetermined time periods as said equity is earned by the investor entity and released from the trust.

14. The apparatus of claim 13, wherein said operation of selling is carried out with said investor entity investment held in trust pursuant to a trust agreement having performance criteria for said commercial entity, and wherein said data includes said performance criteria.

15. The apparatus of claim 13, wherein said operation of selling is carried out with said commercial entity equity conveyed to said employee stock ownership plan pursuant to a binding call at a price determined periodically, through independent valuation, under control of said computer system.

16. The apparatus of claim 13, wherein said operations further include:
monitoring performance of the equity-issuing commercial entity;
tracking at least one of said contributions and deductible dividends in transit to the employee stock ownership plan; and
monitoring securitized advances made by the commodity trust to said commercial entity to enable said commercial entity to purchase said commodity.

17. The apparatus of claim 14, wherein said operations further include:
monitoring performance of the equity-issuing commercial entity;
tracking at least one of said contributions and deductible dividends in transit to the employee stock ownership plan; and
monitoring securitized advances made by the commodity trust to said commercial entity to enable said commercial entity to purchase said commodity.

18. The apparatus of claim 13, wherein said operations further include:
monitoring performance of the equity-issuing commercial entity;
tracking at least one of said contributions and deductible dividends in transit to the employee stock ownership plan; and
monitoring securitized advances made by the commodity trust to said commercial entity to enable said commercial entity to purchase said commodity.

19. The apparatus of claim 13, wherein said operations further include:
tracking said contributions and deductible dividends that are in transit to the employee stock ownership plan to securitize the purchase of shares of stock of the commercial entity.

20. The apparatus of claim 14, wherein said operations further include:
tracking said contributions and deductible dividends that are in transit to the employee stock ownership plan to securitize the purchase of shares of stock of the commercial entity.

21. The apparatus of claim 13, wherein said operations further include:

tracking said contributions and deductible dividends that are in transit to the employee stock ownership plan to securitize the purchase of shares of stock of the commercial entity.

22. The apparatus of claim 13, wherein said operations further include:

monitoring said selling said commercial entity equity; and tracking at least one of contributions and deductible dividends that are in transit to the employee stock ownership plan to securitize the purchase of shares of common stock of the commercial entity.

23. The apparatus of claim 14, wherein said operations further include:

monitoring said selling said commercial entity equity; and tracking at least one of contributions and deductible dividends that are in transit to the employee stock ownership plan to securitize the purchase of shares of common stock of the commercial entity.

24. The apparatus of claim 13, wherein said operations further include:

monitoring said selling said commercial entity equity; and tracking at least one of contributions and deductible dividends that are in transit to the employee stock ownership plan to securitize the purchase of shares of common stock of the commercial entity.

25. The apparatus of claim 13, wherein said commodity is fuel.

* * * * *